United States Patent
Ofek et al.

(10) Patent No.: US 6,385,706 B1
(45) Date of Patent: May 7, 2002

(54) APPARATUS AND METHODS FOR COPYING A LOGICAL OBJECT TO A PRIMARY STORAGE DEVICE USING A MAP OF STORAGE LOCATIONS

(75) Inventors: Yuval Ofek, Framingham; Zoran Cakeljic, Newton; Philip Tamer, Framingham, all of MA (US)

(73) Assignee: EMX Corporation, Hopkinton, MA (US)

(*) Notice: Subject to any disclaimer, the term of this patent is extended or adjusted under 35 U.S.C. 154(b) by 0 days.

(21) Appl. No.: 09/223,896

(22) Filed: Dec. 31, 1998

(51) Int. Cl.[7] .............................................. G06F 12/00
(52) U.S. Cl. ........................ 711/162; 711/112; 711/202; 707/204
(58) Field of Search ........................ 711/112–113, 162, 711/202; 707/204

(56) References Cited

U.S. PATENT DOCUMENTS

| | | | |
|---|---|---|---|
| 5,535,381 A | | 7/1996 | Kopper et al. ................. 714/20 |
| 5,649,196 A | | 7/1997 | Woodhill et al. ............ 707/204 |
| 5,673,381 A | | 9/1997 | Huai et al. ....................... 714/1 |
| 5,720,026 A | | 2/1998 | Uemura et al. .................. 714/6 |
| 5,751,997 A | | 5/1998 | Kullick et al. ............... 711/162 |
| 5,778,395 A | | 7/1998 | Whiting et al. .............. 707/204 |
| 5,813,017 A | | 9/1998 | Morris et al. ................ 707/204 |
| 5,835,954 A | * | 11/1998 | Duyanovich et al. ........ 711/162 |
| 5,852,713 A | | 12/1998 | Shannon et al. ................ 714/6 |
| 5,873,103 A | | 2/1999 | Trede et al. .................. 707/204 |
| 5,925,119 A | | 7/1999 | Maroney ...................... 710/126 |
| 5,926,649 A | * | 7/1999 | Ma et al. ...................... 395/826 |
| 5,950,015 A | * | 9/1999 | Korst et al. .................. 395/873 |
| 6,023,710 A | | 2/2000 | Steiner et al. ............... 707/204 |
| 6,047,294 A | * | 4/2000 | Deshayes et al. ............ 707/204 |
| 6,052,341 A | | 4/2000 | Bingham et al. .............. 369/34 |
| 6,061,822 A | | 5/2000 | Meyer .......................... 714/758 |
| 6,141,773 A | * | 10/2000 | St. Pierre et al. ............. 714/20 |

FOREIGN PATENT DOCUMENTS

EP        0910019 A        4/1999

OTHER PUBLICATIONS

U.S. application No. 09/224,637, Ofek et al., filed Dec. 31, 1998.
U.S. application No. 09/224,638, Ofek et al., filed Dec. 31, 1998.
U.S. application No. 09/224,896, Cakeljic et al., filed Dec. 31, 1998.
U.S. application No. 09/224,897, Ofek et al., filed Dec. 31, 1998.
U.S. application No. 09/223,897, Ofek et al., filed Dec. 31, 1998.

* cited by examiner

Primary Examiner—Matthew M. Kim
Assistant Examiner—Pierre M Vital
(74) Attorney, Agent, or Firm—Wolf, Greenfield & Sacks, P.C.

(57) ABSTRACT

Method and apparatus for restoring copies of a logical object to a primary computer storage device are disclosed. A copy of the logical object is provided, physical blocks of memory in the primary storage device are allocated, a map of the data blocks will be copied to the physical blocks of the primary storage devices created. The copying may then occur using the created map. The copy of the logical object may be an abstract bloc set, which includes data blocks of the logical object potentially out of order and metadata identifying relative position of the data blocks.

23 Claims, 35 Drawing Sheets

APPARATUS AND METHODS FOR COPYING A LOGICAL OBJECT TO A PRIMARY STORAGE DEVICE USING A MAP OF STORAGE LOCATIONS

FIELD OF THE INVENTION

This invention relates to data storage for computers, and more particularly to an apparatus and methods for copying a logical object to a primary storage device using a map of a storage locations.

DISCUSSION OF THE RELATED ART

Virtually all computer applications (or programs) rely on storage. This storage can be used for both storing the computer code and for storing data manipulated by the code. (The term "data" refers to any information, including formatting information, executable code and data for manipulation by an application program.)

Storage technology has developed in a variety of different directions. Accordingly, a wide variety of storage systems are available. It has become impractical, therefore, for the person writing the computer application to also be responsible for detailed control over how data is stored on the storage system.

For this (and other) reasons, application programs typically run on an operating system (e.g., Unix, Windows, MS DOS, Linux, and the many variations of each). Once again, however, the operating system may be used with a variety of storage systems.

It would be highly inefficient to have to change the operating system, or the application programs, every time a change is made to physical storage. As a result, various layers of abstraction have evolved for viewing how data is actually stored in the storage system.

FIG. 1 illustrates one way of viewing the layers of abstraction. At the top level 10, the application program may assume that data is stored in a manner that has very little to do with how the data is placed onto the physical device. For example, the application may view the storage system as containing a number of directories and data files within the directories. Thus, in an application written for use in the Unix operating system, the application will assume that files are stored according to the Unix directory structure (including hierarchical directories and files located within the directories). This assumed organization of physical storage may have very little to do with how that data is actually stored onto the actual storage devices. This view may be referred to as the "logical view" because of the separation between the logical view of data from the application level is divorced from any view of how the data is physically stored. A logical entity, such as a file, database or other construct, may be referred to at the logical level as a "logical object."

The application level 10 interfaces with the file system level 12. The file system level is concerned with how files are stored on disks and how to make everything work efficiently and reliably. Thus, the file system level may be responsible for storing directory structure, and for breaking up files into constituent data blocks for storage onto a physical storage system. For example, in most implementations of Unix, each file has an associated I-node. This node may contain accounting and protection information and, additionally, a set of pointers to data blocks.

Relatively early in the development of computer systems, disk drives became a fundamental device for storage. Accordingly, computer operating systems have been developed assuming that memory will rely on input/output ("I/O") to a disk drive. The file system 12, therefore, may assume one or more "volumes" which correspond to a physical storage unit such as a disk drive (or any other unit of storage), with data stored in blocks on the disk drive.

The demand for storage to be available for use by applications has sky rocketed. As a result, a number of separate physical devices may be required to accommodate the total amount of storage required for a system. In addition, storage systems are often changed or reconfigured.

To insulate the operating system from any changes within the physical device storage system, some mechanism is often employed to flexibly map a standard (volume) view of physical storage onto an actual physical storage system. The logical volume manager ("LVM") 14 of FIG. 1 can help achieve this function by mapping the file system view of data storage into an intermediate layer.

Finally, the actual storage reading and writing (and, potentially, additional mapping onto physical storage devices) occurs within the physical storage system level 16, as illustrated in FIG. 1. Thus, for example, the logical volume manager may map the file system level view of data into volume sizes corresponding to fixed physical storage segment sizes for storage on a physical device (e.g., block sizes). The physical storage system level may then map the logical volume manager level volumes onto physical storage segments (e.g., hyper-volumes discussed below).

Logical volume managers have been implemented for use with the HP-UX by HP and by VERITAS operating systems, as examples. The Symmetrix line of storage systems, available from EMC Corporation, of Hopkinton, Massachusetts, is one system capable of mapping hyper-volumes onto physical devices. (The Symmetrix product line of integrated cached disk arrays is described in numerous publications form EMC Corporation, including the Symmetrix model 55xx product manual, p-n200-810-550, rev.f, February, 1996.)

In the above examples, the mapping of application level data into actual physical storage occurs across four levels: application level to file system level; file system level to LVM level; LVM level to physical storage system level; and physical storage system level to the actual physical storage devices. More or fewer levels of mapping can be done. In some systems, for example, only one level of mapping is performed, e.g., mapping from the application level directly onto actual physical storage devices. In many systems, the mapping stage at the LVM level is omitted. Similarly, in many systems, no mapping is done at the physical storage level (e.g., data is stored directly onto actual devices corresponding to the format of the preceding level and without any further mapping onto physical storage components.)

FIG. 2A illustrates an example of the mapping that may be performed by the logical volume manager 14 and the physical storage system 16, to store data onto actual physical devices. The application/file system's view of the storage system contemplates three separate storage devices—volume A 20, volume B 21, and volume C 22. Thus, as far as the file system level 12 can discern, the system consists of three separate storage devices 20–22. Each separate storage device may be referred to as a "virtual volume," or "virtual disk." This reflects that the operating system's view of the storage device structure may not correspond to the actual physical storage system implementing the structure (hence, "virtual"). Unlike the application level 10, however, the file system 12 perspective is as if the file system 12 were dealing with raw physical devices or volumes.

As far as the file system level is concerned, the virtual volumes may be divided up into "partitions," which are continuous segments of storage. These partitions are, in-fact, "virtual" partitions, because the partition may actually be stored across a variety of physical storage segments (e.g., hyper-volumes).

In FIG. 2A, the data is physically stored on the physical storage devices 24–26. In this particular example, although there are three physical devices 24–26 and three volumes 20–22, there is not a one to one mapping of the virtual volumes to physical devices. In this particular example, the data in volume A 20 is actually stored on physical devices 24–26, as indicated at 20a, 20b and 20c. In this example, volume B is stored entirely on physical device 24, as indicated at 22a, 22b. Finally, volume C is stored on physical device 24 and physical device 26 as indicated at 21a, 21b.

In this particular example, the boxes 20a–20c, 21a–21b and 22a–22b represent contiguous segments of storage within the respective physical devices 24–26. These contiguous segments of storage may, but need not, be of the same size. The segments of storage may be referred to as "hyper-volumes," and correspond to segments of physical storage that can be used as components when constructing a virtual volume for use by the file system. A hypervolume may be comprised of a number of "data blocks." A data block is a unit of storage (e.g., a 512 byte block) that is written or read at one time from the physical storage device.

Array management software ruing on a general purpose processor (or some other mechanism such as a custom hardware circuit) 23 translates requests from a host computer (not shown) (made assuming the logical volume structure 20–22) into requests that correspond to the way in which the data is actually stored on the physical devices 24–26. In practice, the array management software 23 may be implemented as a part of a unitary storage system that includes the physical devices 24–26, may be implemented on a host computer, or may be done in some other manner.

In FIG. 2A the array management software 23 performs the functions of both the logical volume manager 14 (if present) and the physical storage level 16, by mapping the file system's virtual volumes 20–22 into segments that can be stored onto physical devices 24–26. The array management software 23 also performs the functions of the physical storage system level 16, by determining where to store the hyper-volumes 20A–20C, 21A–21B and 22A–22B.

The physical storage devices shown in the example of FIG. 2A are disk drives. A disk drive may include one or more disks of a recording media (such as a magnetic recording medium or an optical recording medium). Information can be written and read from this storage medium for storage purposes. The recording medium is typically in the form of a disk that rotates. The disk generally includes a number of tracks on which the information is recorded and from which the information is read. Each track may include more than one "data block." A data block is a unit of data that can be read as a single unit. A data block may be a 512 by the block of data, an 8 k segment on a 32 k track, or some other structure. In these examples, the size of the block is fixed. In other cases, the block may be of variable size, such as a CKD record. In a disk drive that includes multiple disks, the disks are conventionally stacked so that corresponding tracks of each disk overlie each other. In this case, specification of a single track on which information is stored within the disk drive includes not only specification of an individual track on a disk, but also which of the multiple disks the information is stored on.

To identify an individual data block, an address may include a specification of the disk, (which may consist of several "platters"), a specification of the track within the disk (or "cylinder"), a specification of the head (or which of the platters comprising the "disk") and a specification of the particular data block within the track. The specification of the position of the data block within the track may, for example, be addressed as an offset, e.g., this is the third data block appearing on the track. Thus, an address of ddc-ccch:offset may specify a block—disk dd, cylinder cccc, head h and the specified offset. The physical storage devices for use with the present invention may, however, be formed in any other geometry, addressed in any other manner or even constitute a different type of storage mechanism.

FIG. 2B illustrates one example of mapping between the top level of abstraction—the application level—to the actual physical storage level. An application level file 200 includes visual information. This information is in the form of a conventional file and includes a series of bits.

When the application level file is mapped onto physical storage, the application level file may be converted into segments of the individual bits, e.g., segment 203. Thus, a segment of the application level file 203 is mapped (for example according to the general mapping structure described above with reference to FIG. 1) onto actual physical storage devices 204–206. In this example, the first segment of bits in 203 in the application level file 200 is mapped onto physical storage device 204, at a portion 208 of the physical storage device 204. As shown in FIG. 2B, the individual segments of bits in the application level file 200 may be mapped anywhere among a plurality of actual physical storage devices. The granularity of the segments of bits (e.g., segment 203) may correspond to one of a variety of different levels. For example, the granularity of the segments may be a 512 byte data block. In another embodiment, the granularity may correspond to the amount of data stored in a track of the physical storage device 204–206 (when the physical storage devices are disk drives).

FIG. 2C illustrates an example of a logical object 27 that includes six data blocks or logical block elements 27a–27f. The logical object itself may be any data structure or collection of data. For example, the logical object could be a database table, a portion of a file system file, or a complete file system file, or any other identifiable logical object. Each of the data blocks 27a–27f may be a fixed size data block, or a varying size data block such as a CKD record.

In the example of FIG. 2C, the logical object is stored on a physical storage device 28. In this example, the storage device includes a number of columns, each representing a track of a disk.

Each row of the physical storage device represents a physical data or block element within the applicable column/track. For example, row 28a, column 28b, stores a data block corresponding to the logical block element 27b. Track 28b would store physical data blocks that have the contents of logical block elements 27a and 27b. As can be seen from FIG. 2C, the logical block elements can be stored in any order on the physical devices.

While the physical storage device 28 is illustrated as a contiguous array, this need not be the case. For example, each of the tracks, such as column 28b, may be stored on a different disk drive or be part of a different hypervolume.

In a system including an array of physical disk devices, such as disk devices 24–26 of FIG. 2A, each device typically performs error detection and/or correction for the data stored on the particular physical device. Accordingly, each individual physical disk device detects when it does not have valid data to provide and, where possible, corrects the errors. Even where error correction is permitted for data stored on the physical device, however, a catastrophic failure of the device would result in the irrecoverable loss of data.

Accordingly, storage systems have been designed which include redundant storage capacity. A variety of ways of storing data onto the disks in a manner that would permit recovery have developed. A number of such methods are generally described in the RAIDbook, A Source Book For Disk Array Technology, published by the RAID Advisory Board, St. Peter, Minn. (5th Ed., February, 1996). These systems include "RAID" storage systems. RAID stands for Redundant Array of Independent Disks.

FIG. 3A illustrates one technique for storing redundant information in a RAID system. Under this technique, a plurality of physical devices 31–33 include identical copies of the data. Thus, the data M1 can be "mirrored" onto a portion 31a of physical device 31, a portion 32a of physical device 32 and a portion 33a of physical device 33. In this case, the aggregate portions of the physical disks that store the duplicated data 31a, 32a and 33a may be referred to as a "mirror group." The number of places in which the data M1 is mirrored is generally selected depending on the desired level of security against irrecoverable loss of data.

In a mirror group, the copies are "linked." That is, any update to one mirror causes an update to each other mirror in the group.

FIG. 3A shows three physical devices 31–33 which appear to be located in close proximity, for example within a single storage system unit. For very sensitive data, however, one or more of the physical devices that hold the mirrored data may be located at a remote facility.

"RAID 1" is an example of data redundancy through mirroring of data. In a RAID 1 architecture, a number of different mechanisms may be used for determining how to access and update data to improve, for example, performance of the storage system. In any event, a RAID 1 architecture certainly has the ability to recover lost data. Unfortunately, the RAID 1 architecture multiplies the cost of physical storage by the number of "mirrors" included in the mirror group.

FIG. 3B illustrates a solution that requires less added storage. In FIG. 3B, data is stored at locations 34a–34d. In this particular example, the physical device 33 includes parity information P1 at 35a, 35b. The parity information is generated by a simple exclusive-OR ("XOR") of the corresponding bits of data. Thus, the parity information P1 would be generated by XORing the corresponding bits of the data D1 and data D2.

A variety of mechanisms are known for distributing the parity information on the physical devices. In the example shown in FIG. 3B, all of the parity information is stored on a single physical device 33. In other cases, the parity information may be distributed across the physical devices.

FIG. 4 illustrates the concept that, within a given disk array, there is no need for all of the data to follow the same redundancy rule. In FIG. 4, a first group of storage segments on physical devices 40–42 form a mirror group 44. In the mirror group 44, the entire contents of a single logical volume (HV-A) are mirrored on three different physical devices 40–42.

In FIG. 4, a single virtual volume is stored on the fourth physical device 43, without any redundancy information, as indicated at 46.

Finally, a last group of data segments 45, on all four physical devices 40–43, implement a parity redundancy scheme. In this particular example, the parity information is stored in segments of memory on two different physical devices 42–43, as indicated at 47a and 47b.

The storage system of FIG. 4 contains redundant information that permits recovery from errors, including use of a mirror for data located at a remote facility, that also permits recoveries from catastrophic failure.

FIG. 5 illustrates one system for additional backup, which may be used or adapted in accordance with certain aspects of the present invention. In FIG. 5, a computer or client 50 performs its operations using storage system 52. The client 50 may be any conventional computing system, such as a network client available from Sun Microsystems, and running the Solaris operating system (a version of Unix), an HP client running HP-UX (a Hewlett-Packard client, running a Hewlett-Packard version of the Unix operating system) or an IBM client running the AIX operating system (an IBM version of Unix) or any other system with an associated operating system. The storage system 52 may be any conventional storage system, including a Symmetrix storage system, described above. The client 50 may be connected to many other devices over a network 56.

A backup storage system 54 is also attached to the network 56. The backup storage system 54 includes a backup storage device (which may be disk drives, tape storage or any other storage mechanism), together with a system for placing data into the storage and recovering the data from that storage.

To perform a backup, the client 50 copies data from the storage system 52 across the network 56 to the backup storage system 54. This process can be explained in greater detail with reference to FIG. 1. The storage system 52 may correspond to the actual physical storage 16 of FIG. 1. For the client 50 to write the backup data over the network 56 to the backup storage system 54, the client 50 first converts the backup data into file data—i.e. gets the data from the physical storage system level 16, and converts the data into application level format (e.g. a file) through the logical volume manager level 14, the file system level 12 and the application level 10. Thus, an actual data file may be communicated over the network 56 to the backup storage device 54. When the backup storage device 54 receives the data file, the backup storage system 54 can take the application level 10 data file, convert it to its appropriate file system level 12 format for the backup storage system, which can then be converted through a logical volume manager 14 level and into physical storage 16.

This form of backing up data may be referred to as "logical-logical" backup. That is, the logical data is backed up on the backup storage device 54. The data to be backed up is presented independent of the manner in which it is physically stored on storage system 52 at the physical storage system level 16, independent of the file system level mechanisms on the client 50, and independent of how data is stored on the backup storage device 54.

The EDM (EMC Data Manager) line of products is capable of logical-logical backup over a network, as described in numerous publications available from EMC, including the EDM User Guide (Network) "Basic EDM Manual".

FIG. 6 illustrates one embodiment of an alternative structure for backup of data which may also be used in accordance with the present invention. In the embodiment of FIG. 6, a direct connection 60 is established between the storage system 52 and the backup storage system 54. In this embodiment, the backup storage system may be a system as generally described in EMC Data Manager: Symmetrix Connect User Guide, P/N 200-113-591, Rev. C, December 1997, available from EMC Corporation of Hopkinton, Mass. The direct connection 60 may be a high speed data channel, such as a SCSI cable or one or more fiber-channel cables. In this system, a user may be permitted to backup data over the network 56, or the direct connection 60.

While the method and apparatus of the present invention may be described with reference to the systems and concepts described above and in the discussion of the related art, this is not intended to be limiting. The present invention has broader application. Certain aspects of the invention may be applied to any storage system. Accordingly, the invention is only limited by the claims set forth below.

Whether the restore and backup process is done at a logical level or at a physical level, backups in the prior art require copying a complete file (or in some instances even more, such as an entire partition) for the backup. Methods of backing up and restoring data on the system of FIG. 6 are described in co-pending and commonly owned U.S. patent application Ser. No. 09/052,579, entitled "Logical Restore From A Physical Backup In A Computer Storage System," filed Mar. 31, 1998, and naming John Deshayes and Madhav Mutalik as inventors, and which is hereby incorporated herein by reference in its entirety.

FIG. 7 shows a storage system 70 that may be used as the storage system 52 of FIG. 6. The client 50 may be connected to the storage device using a channel or bus 71. The channel for communication with the client 50 can be any suitable connection such as a Small Computer System Interface ("SCSI") or Enterprise Systems Connection Architecture ("ESCON"). While only one communication channel 71 into the storage system 70 is shown in FIG. 7, other channels may be included. (While the method and apparatus of the present invention may be described with reference to the storage system of FIG. 6 and the physical storage system (and associated features and methods) of FIG. 7, this is not intended to be limiting. The present invention has broader application. Certain aspects of the invention may be applied to any storage system.)

Within the storage system 70 is a host adapter 72. In this particular embodiment, the host adapter 72 is responsible for managing and translating read and write requests from the host computer (e.g., client 52 or backup storage system 54), which are based on the virtual disk structure (e.g., from the file system or logical volume manager level), into one or more requests corresponding to how data is stored on the actual physical storage devices 76a–76d of the storage system 70. Thus, in this embodiment, the host adapter 72 implements at least some of the array management software 23 functions of FIG. 2. The host adapter 72 can be implemented in any of a number of ways, including using a general purpose processor or a custom hardware implementation. In addition, multiple host adapters may be included to facilitate having additional I/O channels for the storage system 70.

The host adapter 72 communicates with the other components of the storage system 70 using bus 73. The bus 73 may be any suitable communication element, including use of SCSI, ESCON, and other bus protocols.

Access to the physical storage devices 76a–76d is controlled through the use of disk adapters 75a–75d. The disk adapter 75a–75d can also be implemented using a general purpose processor or custom hardware design. In the embodiment illustrated in FIG. 7, a disk adapter is provided for each physical storage device. A disk adapter can, of course, have more than one storage device attached to it. In addition, disk adapters may include secondary connections to the physical storage devices of another disk adapter. This permits recovery from failure of one disk adapter by shifting its functions to the second disk adapter.

In the embodiment of FIG. 7, reading and writing to the physical storage device 76a–76d through the disk adapters 75a–75d is facilitated through use of a cache 74. The cache 74 may be a random access memory having greater speed than the disk drives. When reading data, if the data is being temporarily stored in the cache, the read request can be fulfilled more quickly by taking the data from the cache 74. Similarly, when writing data, the data to be written can be stored in the cache. The other components of the system can proceed, while the data is written from the cache to the applicable physical storage device.

Any of a variety of mechanisms can be used to implement and manage the cache. An example of such a mechanism is included in U.S. Pat. No. 5,537,568, entitled "System for dynamically controlling cache manager maintaining cache index and controlling sequential data access," issued on Jul. 16, 1996. Similarly, writes may be accomplished through the cache using any of a variety of mechanisms and strategies. One mechanism for writing from the cache is to store the data to be written in the cache, and mark a "write pending" bit. When the write pending bit is encountered, the applicable data can be written to the disk. This technique is described generally in U.S. Pat. No. 5,341,493, entitled "Disk storage system with write preservation during power failure," issued on Aug. 23, 1994.

The cache may be divided into more than one area. For example, the cache may include an area 74a for storing data being read or written from physical storage devices 76a–76d. The cache may further include a "mailbox" area 74b. The mailbox area 74b may be used to facilitate communications among the disk adapters 75a–75d and with the host adapter 72. For example, each disk adapter may have its own area within the mailbox 74b. Each of the disk adapters 75a–75d can post or read information from the applicable mailbox area 74b, to communicate status and other information.

A remote adapter 78 may also be attached to the bus 73 of the storage system 70. The remote adapter may be employed for communication with remote data facilities ("RDF"), for example, connection to another storage device to maintain a mirror redundancy group. One form of RDF link and method of implementation is described in various publications available from EMC Corporation, including SYMMETRIX Remote Data Facility Product Manual, P/N 200-999-554, rev. B, June 1995. RDF embodiments are also described in U.S. Pat. No. 5,544,347 (Yanai) which is hereby incorporated herein by reference in its entirety. It should be appreciated, however, that the present invention is not limited to the use of RDF or to a system that employs SYMMETRIX disk arrays, and can be employed with any of numerous other types of storage systems.

A service processor 77 may be coupled to the bus 73 of the storage system 70. The service processor 77 may include a display, keyboard and other I/O devices to permit an operator to use the service processor 77 for configuring the components of the storage system 70 and for running or initiating diagnosis and maintenance facilities.

SUMMARY OF THE INVENTION

According to one embodiment of the present invention, a computer system is disclosed. According to this embodiment, the computer system includes a host domain that has at least one host computer. The computer system also includes a storage domain, coupled to the host domain, that comprises a plurality of primary storage devices, a secondary storage device and a switched network coupled to the primary storage nodes and to the secondary storage node.

According to another embodiment of the present invention, a computer system is disclosed that includes a plurality of host computers, each of the host computers constituting a different platform. The computer system further includes a plurality of primary storage devices, each being associated with at least one of the host computers. The system also includes a secondary storage device, coupled to a plurality of the primary storage devices, the secondary storage device being configured to receive backup data from each of the host computers.

According to another embodiment of the present invention, a method of transferring data from a primary storage node to a secondary storage node is disclosed. According to this embodiment, a connection is automatically established from one of the primary storage elements to a secondary storage element, for transferring data to the secondary storage element. Data is transferred from the primary storage element directly to the secondary storage element over the first connection.

According to another embodiment of the present invention, a method of sending a copy of data from a storage element of a computer system is disclosed. According to this embodiment, the data is first formulated into an abstract block set. The abstract block set is transmitted. In this and other embodiments, the steps of formulating and transmitting may be performed sequentially or concurrently.

According to another embodiment of the present invention, a method of storing a logical object is disclosed. According to this embodiment, the logical object is formulated into an abstract block set and stored.

According to another embodiment of the present invention, a storage device is disclosed. According to this embodiment, the storage device includes a memory and means for transmitting an abstract block set from the memory.

According to another embodiment of the present invention, a secondary storage system is disclosed. According to this embodiment, the secondary storage system includes a secondary storage media and means for storing an abstract block set on the secondary storage media.

According to another embodiment of the present invention, a computer readable media storing a logical object is disclosed. According to this embodiment, the media includes a plurality of data blocks, each storing on the readable media a portion of data from the logical object, and a metadata segment, stored on the readable media, to identify the order of data blocks in the logical object.

According to another embodiment of the present invention, a method of generating a backup for a logical object is disclosed. According to this embodiment, data blocks of the logical object that have changed since an earlier point in time are identified. The identified data blocks are stored as a differential abstract block set.

According to another embodiment of the present invention, a storage device is disclosed. According to this embodiment, the storage device includes a memory, means for identifying data blocks that have changed since an earlier point in time and means for transmitting a differential abstract block set from the memory.

According to another embodiment of the present invention, a method of forming an updated abstract block set is disclosed. According to this embodiment, a full abstract block set is provided. A differential abstract block set is also provided. The full abstract block set and the differential abstract block set are combined to form the updated abstract block set.

According to another embodiment of the present invention, a method of forming an updated backup of a logical object is disclosed. According to this embodiment, a first backup of the logical object is provided. A differential backup of the logical object is also provided, the differential backup including a plurality of backup data blocks that have changed since the first backup was formed. The backup data blocks are added to the first backup and metadata identifying an order of data blocks in the updated backup is added.

According to another embodiment of the present invention, a secondary storage device is disclosed. According to this embodiment, the storage device includes a secondary storage media and a controller programmed to combine a first backup and a differential abstract block set to form a full abstract block set.

According to another embodiment of the present invention, a method of copying a logical object is disclosed. According to this embodiment, a set of storage segments of a computer storage device are identified, each of the identified segments including data from at least one physical block of a logical object. The identified storage segments are copied. According to this embodiment, at least one of the copied storage segments includes a plurality of the physical data blocks. Thus, the size of the storage segment is not necessarily the same as the size of individual physical data blocks.

According to another embodiment of the present invention, a method of creating a backup of a logical object is disclosed. According to this embodiment, a set of backup segments is received, each backup segment including at least one physical block of a logical object. The received storage elements are stored, at least one of the storage segments including a plurality of the physical data blocks.

According to another embodiment of the present invention, a computer readable media storing a backup copy of a logical object is disclosed. According to this embodiment, a plurality of data segments are stored on the readable media, each data segment including at least one datablock of the logical object, and at least one of the data segments including a plurality of the logical data blocks. This embodiment further includes a metadata segment, stored on the readable media, to identify data blocks of the logical object in the data segments. In this embodiment, the data segment may, for example, be a track including a plurality of fixed size blocks.

According to another embodiment of the present invention, a computer storage system is disclosed. According to this embodiment, the system includes a computer storage device that includes a plurality of physical storage segments (which, in one embodiment, is a track) each storing at least one datablock. The system further includes means for identifying a set of storage elements, each storage segment of the set including at least one physical block of a logical object and means for transmitting the identified storage segments.

According to another embodiment of the present invention, a method of backing up a logical object at a fixed point in time is disclosed. According to this embodiment, a set of storage segments that include logical data blocks of the logical object are identified. These storage segments are copied to a backup storage device, out of order from the order of storage segments or logical data blocks appearing in the logical object. During the copying step, if a storage segment that includes a physical block of the logical object is to be modified, that storage segment is immediately backed up. In this and other embodiments, the storage segments may (but need not) correspond in size to the size of data blocks.

According to another embodiment of the present invention, a computer storage system is disclosed. According to this embodiment, the system includes a computer storage device that has a plurality of storage segments. The system further includes means for identifying a set of the storage segments that includes logical objects, logical data blocks; means for copying the identified storage segments, out of order from the order of logical data blocks and the logical object; and means for immediately copying storage segments to the backup storage device if an attempt is made to modify a physical block of the storage segment.

According to another embodiment of the present invention, a method of copying a logical object to a primary storage device is disclosed. According to this embodiment, a copy of the logical object is provided. Physical blocks of memory in the primary storage device are allocated for storing the logical object. A map of the data blocks of the copy of the logical object to the physical blocks of the primary storage device is created. The data blocks are copied to the physical blocks, based on the map.

According to another embodiment of the present invention, a method of copying a logical object to a primary storage device is disclosed. According to this embodiment, an abstract block set copy of the logical object is provided. Physical blocks of memory are allocated in the primary storage device to store the logical object. The data blocks of the copy of the logical object are mapped to the physical blocks of the primary storage device and the data blocks are copied to the physical blocks based on the mapping.

According to another embodiment of the present invention, a computer storage device is disclosed. According to this embodiment, the device includes a memory including a plurality of physical data blocks. The device further includes means for storing the data blocks of an abstract block set to the physical data blocks, based on a mapping of the data blocks to a set of the physical data blocks.

According to another embodiment of the present invention, a method of copying a logical object is disclosed. According to this embodiment, a set of storage segments that includes the logical data blocks are identified. The storage segments may correspond to the logical data blocks, or may be of a different size. The identified storage segments are copied to a second storage device, out of order from the order of logical data blocks in the logical object.

According to another embodiment of the present invention, a method of copying a logical object is disclosed. According to this embodiment, a set of storage segments that includes the logical data blocks of the logical object are identified. The identified storage segments are copied to a second computer storage device in parallel. Metadata is provided to identify the order of data stored in the identified storage segments in the logical object.

According to another embodiment of the present invention, a method of backing up a logical object that includes a plurality of logical blocks is disclosed. According to this embodiment, a first and a second backup media are provided. In one embodiment, each backup media is a digital storage tape. Logical blocks are written to the first and the second backup media in parallel.

According to another embodiment of the present invention, a secondary storage device is disclosed. According to this embodiment, the secondary storage device includes a plurality of storage components and means for writing portions of an abstract block set to the storage components, in parallel.

According to another embodiment of the present invention, a method of restoring a logical object is disclosed. According to this embodiment, a first and a second portion of a copy of the logical object are provided. Data blocks stored in the first portion and data blocks stored in the second portion are read in parallel. The logical object is restored from the read data blocks.

According to another embodiment of the present invention, a secondary storage device is disclosed. According to this embodiment, the secondary storage device includes means for reading data from a plurality of storage components, in parallel, and means for providing the read data to another device as an abstract block set.

Each of the above disclosed inventions and embodiments may be useful and applied separately and independently, or may be applied in combination. Description of one aspect of the inventions are not intended to be limiting with respect to other aspects of the inventions.

DETAILED DESCRIPTION

Figure 5:
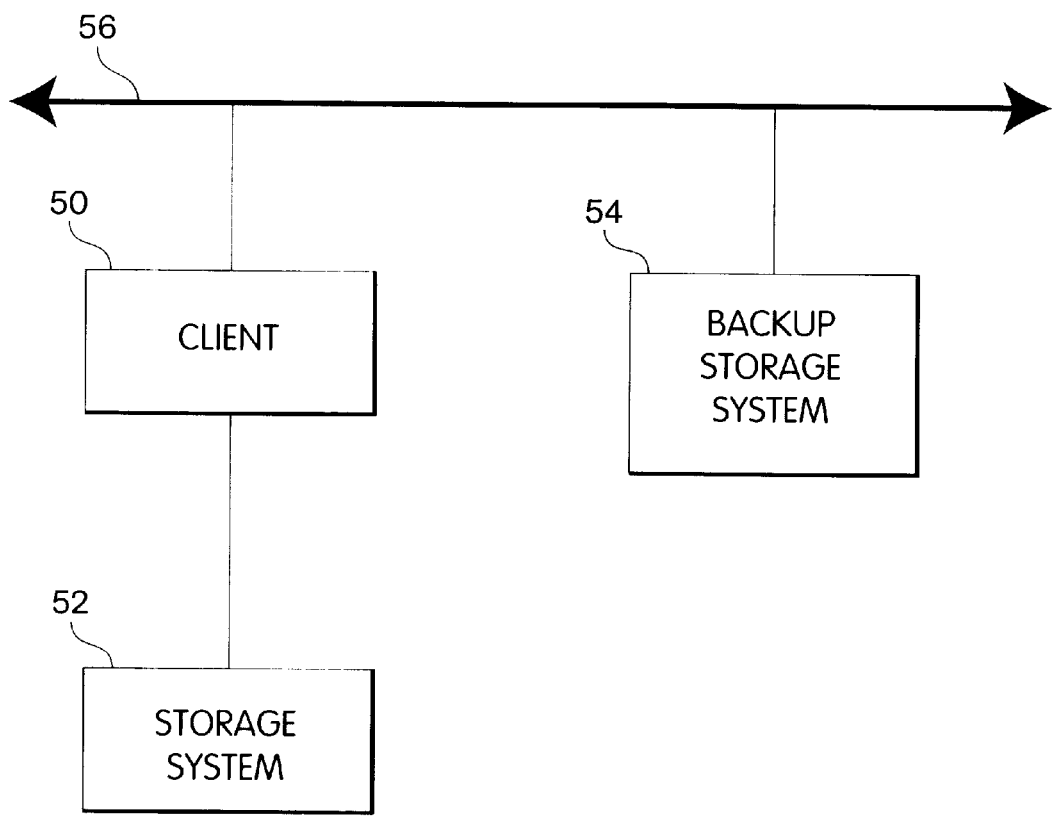
FIG. 5 illustrates an example of a backup storage system.
Figure 6:
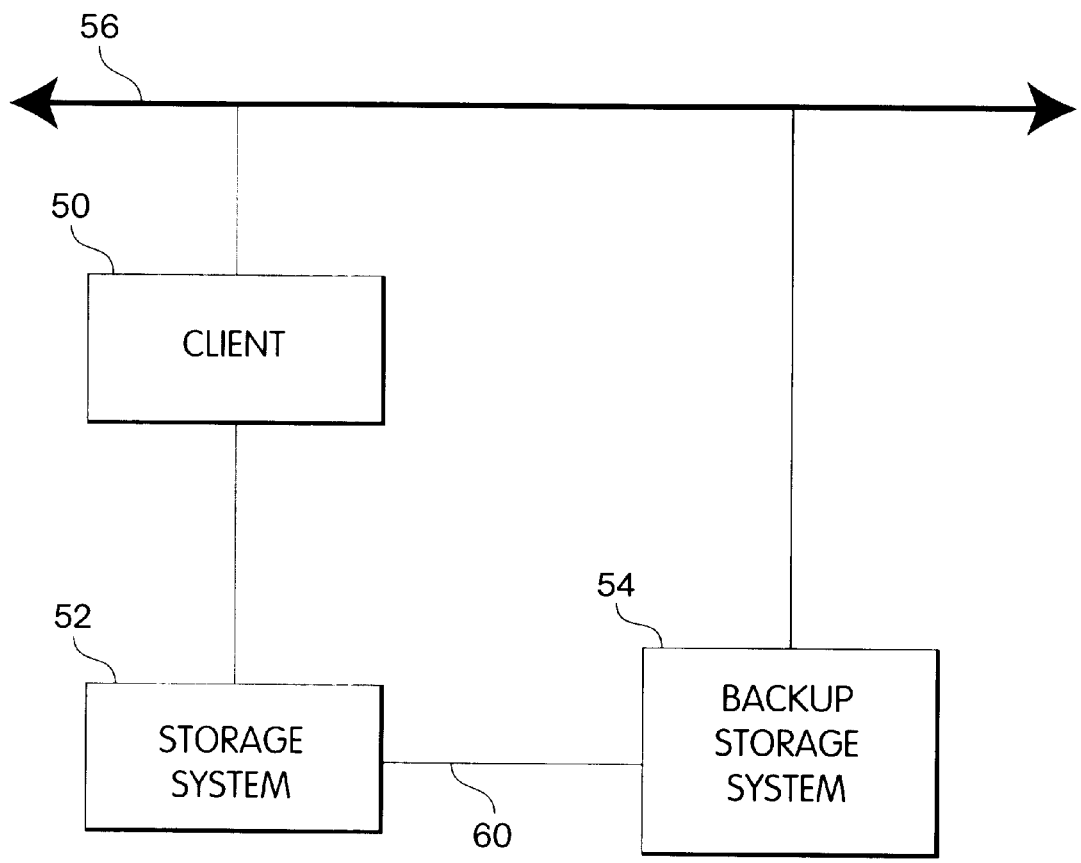
FIG. 6 illustrates one embodiment of a backup storage system that includes a mechanism for direct backup of data on the primary storage system.

The architectures illustrated in FIG. 5 and FIG. 6 may be viewed as focusing on a network model for storage, or a "network-centric" system. In such a system, the focus of data transfer is movement of logical data across a network. Moreover, the storage system 52 and backup storage system 54 are typically associated with a single client or host 50 architecture.

An alternative model focuses on a separation of the client or host domain and the storage domain.

Figure 8:
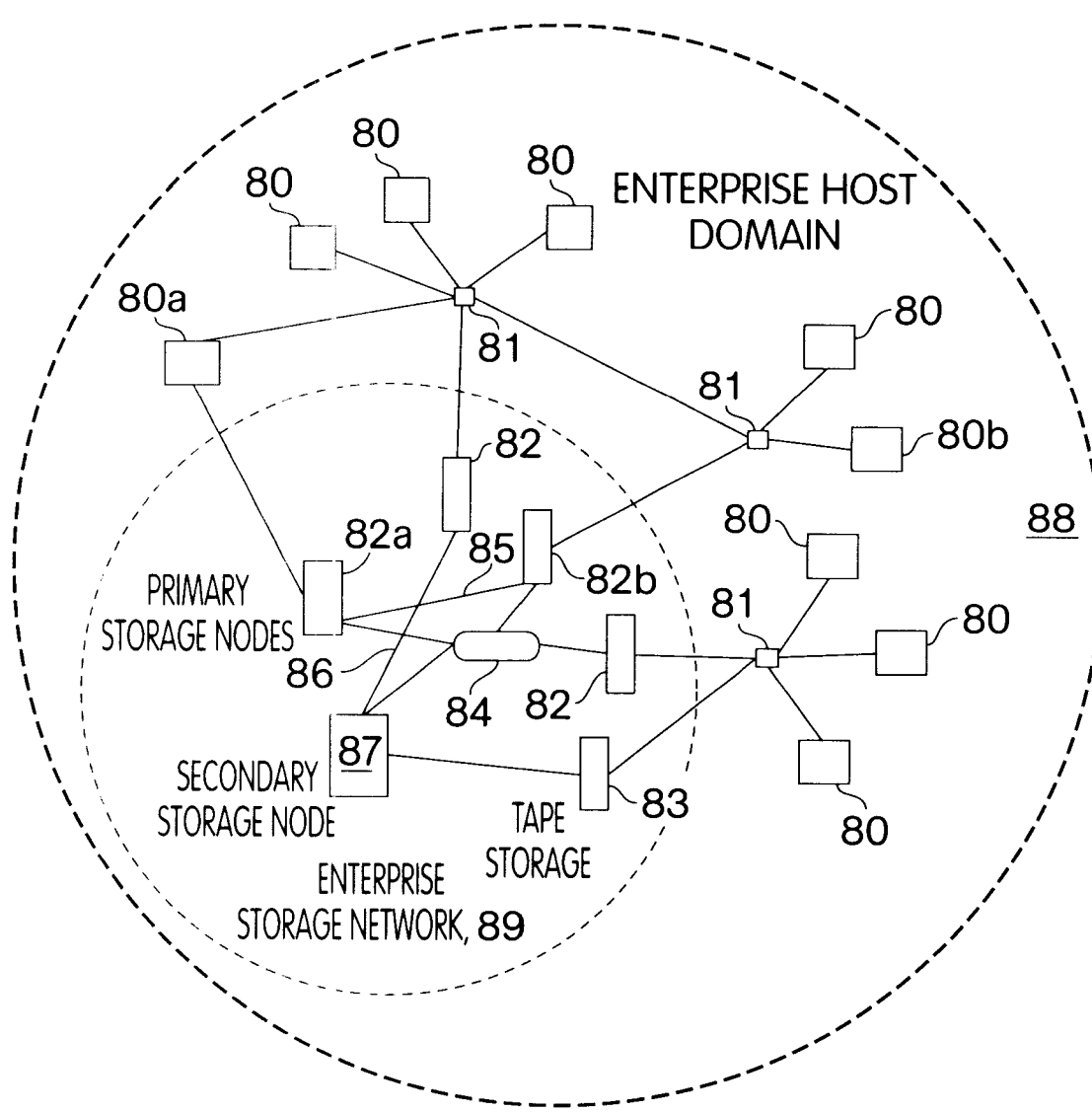
FIG. 8 illustrates one example of a computer storage system structured to have an enterprise host domain and an enterprise storage domain or network, according to one embodiment of the present invention.

FIG. 8 illustrates one example of a system which segregates the host domain from the storage domain. In FIG. 8, a number of host computers 80 are included in an enterprise host domain 80a. The host computers can be any type of computers, operating systems and data management applications. For example, one host computer 80 may be a Hewlett Packard 9000 computer system running an HP-UX Operating System. Another host computer 80 can be a Sun Spark Station running a Solaris operating system. The combination of a host, operating system and applicable data management application is referred to as a "platform." Each of the host computers 80 may constitute a different platform interfacing with the storage network 89.

The host computers 80 in the enterprise host domain 88 may be connected over a network. This network may include switching nodes 81, although any other form of network may be used.

Figure 7:
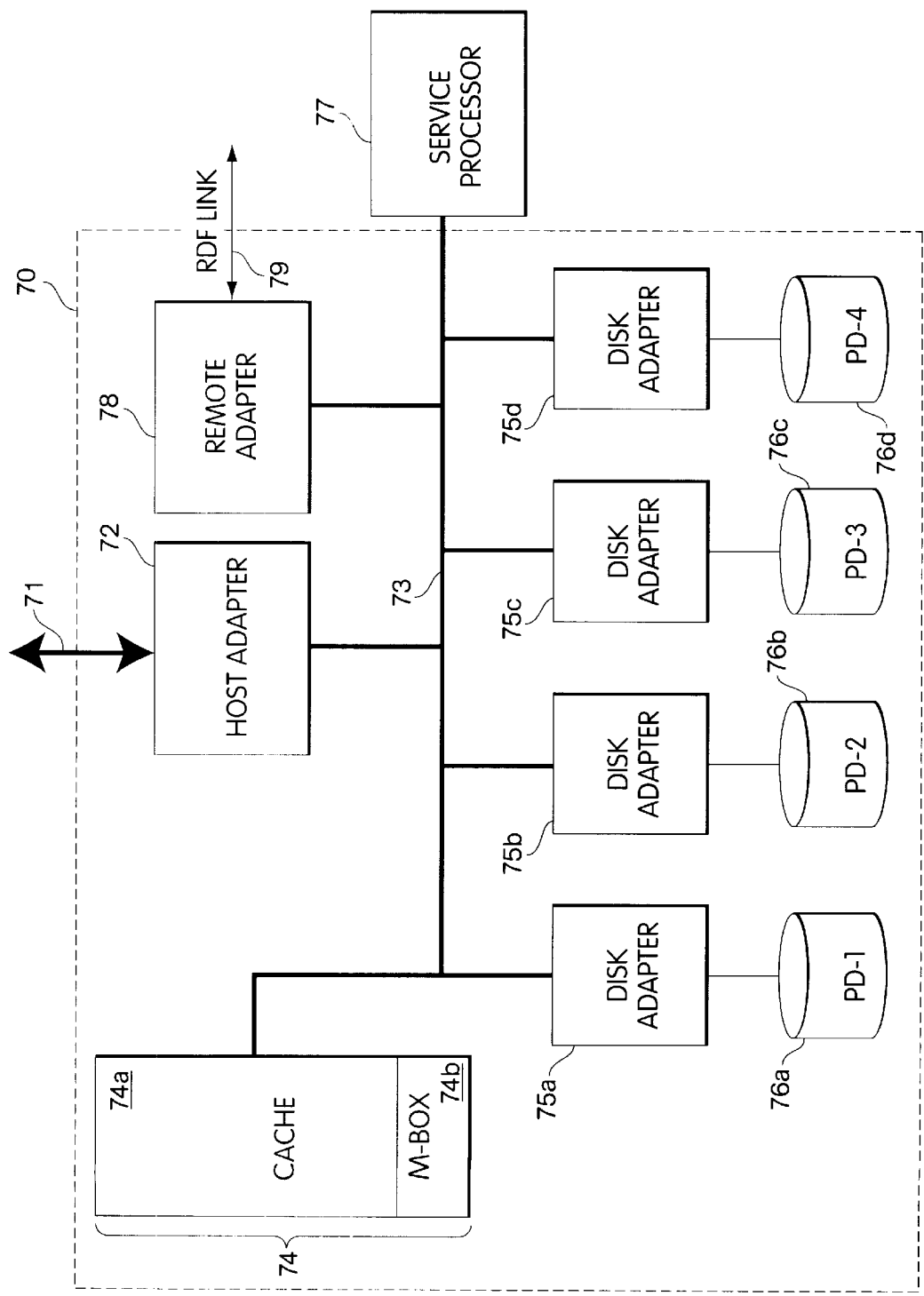
FIG. 7 illustrates an example of a storage system.

In the embodiment of FIG. 8, the host computers 80 are coupled to the enterprise storage 89 through a network or directly to primary storage nodes 82. A primary storage node is a memory device that can store significant amount of data for use by the host 80. For example, a Symmetrix system, such as the one described above with respect to FIG. 7, may be used as a primary storage node, although this is not intended as limiting.

In the embodiment of FIG. 8, each host computer is coupled to a subset of primary storage nodes 82, for use as a main memory for that host computer. For example, host computer 80a is coupled directly to primary storage node 82a. The host computer 80a may rely on primary storage node 82a for most of its memory intensive functions, such as for accessing a very large database.

The primary storage nodes 82 may also be coupled together through a network. In the example of FIG. 8, the network includes link 85 and switch network 84. The switch network 84 may, for example, be a fiber channel network. The link 85 may be an RDF link over an ESCON line.

The network between primary storage nodes may serve two purposes. The network may permit transfer of data between primary storage nodes. For example, a database being manipulated by host 80a, and stored in primary storage node 82a, may be transmitted to primary storage node 82b for use by host 80b. By transmitting the database across the enterprise storage network (using link 85 or switching network 84), the computational resources of the host 80a, 80b, and the available bandwidth in the enterprise host domain network, can be preserved.

Figure 9:
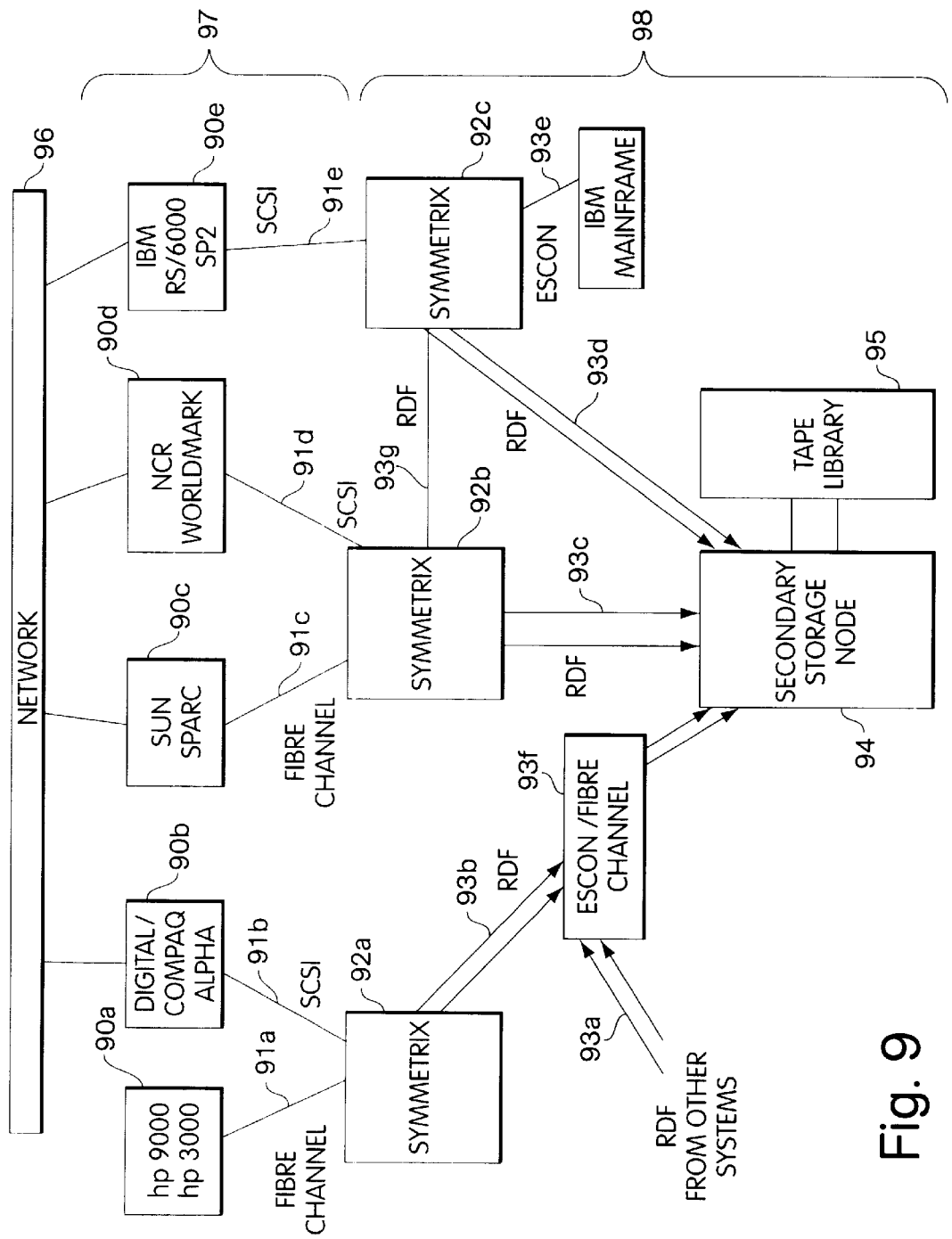
FIG. 9 illustrates another example of a computer system including an enterprise host domain and an enterprise storage domain, according to one embodiment of the present invention.

The enterprise storage network 89 may also include a secondary storage node 87. The secondary storage node may be used for backup functions, hierarchical storage management, virtual disks and other functions. Thus, the secondary storage node 87 may be coupled to a tape storage unit 83. The secondary storage node 87 would coordinate sophisticated transfer of data from the primary storage nodes 82 to the tapes stored in a tape storage unit 83. (Other embodiments may use additional or alternative media for secondary storage.) FIG. 9 illustrates one embodiment of a computer network constructed according to one aspect of one embodiment of the present invention. In this embodiment, an enterprise host domain 97 is provided. The enterprise host domain 97 includes a variety of host computers 90a–90e. The host computers may include different platforms and different corresponding mechanisms for accessing and storing data in the memory. For example, host computer 90a is a Hewlett Packard HP 9000 computer. Host computer 90c is a Sun Spark Station which may be running a Solaris Operating System. The host computers may communicate with each other across a network 96. Such a network can be one of many computer networks known and applied for connecting computers.

In the embodiment of FIG. 9, each host computer 90a–90e is connected to a primary storage node 92a–92c. In this embodiment, each primary storage node 92a–92c is an iterative cached disk array, such as a Symmetrix memory system such as the one described above with respect to FIG. 7, although this is not intended to be limiting. Thus, for example, host computer 90a interfaces primarily with storage node 92a. Similarly, host computer 90b uses primary storage node 92a as a primary source of its data.

In the embodiment of FIG. 9, the host computer 90a is connected to the primary storage node 92a over a high speed fiber channel 91a. The host 90b, however, is connected to the primary storage node 92a over a standard SCSI connection. Each of the hosts 90a and 90b are coupled to the same primary storage node 92a. Other mechanisms could be used to connect the host computers 90a–90e to the primary storage nodes 92a–92c. For example, a complete switched network could be employed, for any of the host computers to access any of the primary storage nodes 92a–92c.

Each of the primary storage nodes 92a–92c may also be coupled together using a network. In the example of FIG. 9, the only link among the primary storage nodes is an ESCON remote data facility (ESCON "RDF") link 93g. Such a link may be used for transferring of data or maintaining a mirror of data either on-line or as a periodically updated mirror. Such a link may be implemented as described in U.S. Pat. No. 5,544,347 (Yanai), which is incorporated herein by reference in its entirety. Each of the primary storage nodes 92a–92c may be coupled together using any other mechanism. For example, an RDF link could be used to fully connect each of the primary storage nodes 92a–92c. In the alternative, a switch network could be used, assuming that the network is of sufficiently high speed to support the data operations among the primary storage nodes 92a–92c.

The storage network 98 in the embodiment of FIG. 9 further includes a secondary storage node 94. The secondary storage node is used for backup (and other) functions, for example by storing and restoring information to and from a tape library 95.

In the embodiment of FIG. 9, each of the primary storage nodes is connected or connectable (by a network) to the secondary storage node 94. In this example, primary storage nodes 92b and 92c are coupled to secondary storage node 94 each using an RDF link (93c and 93d respectively) which may be implemented as described above.

The primary storage node 92a is connected (together with other primary storage nodes, not shown) to the secondary storage node 94 over a switched network, which will permit each of the systems to access the secondary storage node 94.

Using an RDF (or other) link that permits high speed transfer of data over long distances, the primary storage nodes 92a–92c and the secondary storage device 94 may be physically located at great distances apart.

Of course, other topologies and other mechanisms may be used without departing from the scope of the invention.

Many of the applications for computers now focuses as much or more on memory than on the ability of the system to perform computations. For example, access to very large databases has become an extremely important and valuable application for computers.

In the past, the focus of computer systems has been on interconnecting host computers each having their own associated memory, or providing network access to a single memory. This focus demands host computer and network resources.

In the storage-centric model, however, the storage component of the computer system is elevated to a status of equal importance. In such a model, the storage components of the system are capable interacting with each other with less involvement from the host domain. For example, it may be desirable to permit mirroring across one or more primary storage nodes. Similarly, data objects may need to be copied from one primary storage node to another primary storage node. Where additional levels of backup are desirable, the primary storage nodes may also transfer data to a secondary storage node for backup purposes. The primary storage nodes may, correspondingly receive data from the secondary storage nodes for restore. In a storage centric model, some or all of the resource intensive functions in such a system can be moved out of the host domain. Certain embodiments following this model can preserve host domain resources, increase scalability of memory (by adding to the storage domain without as much concern about affect on host domain resources) and reduce dependence on the particular platforms of the hosts in the host domain.

Figure 10:
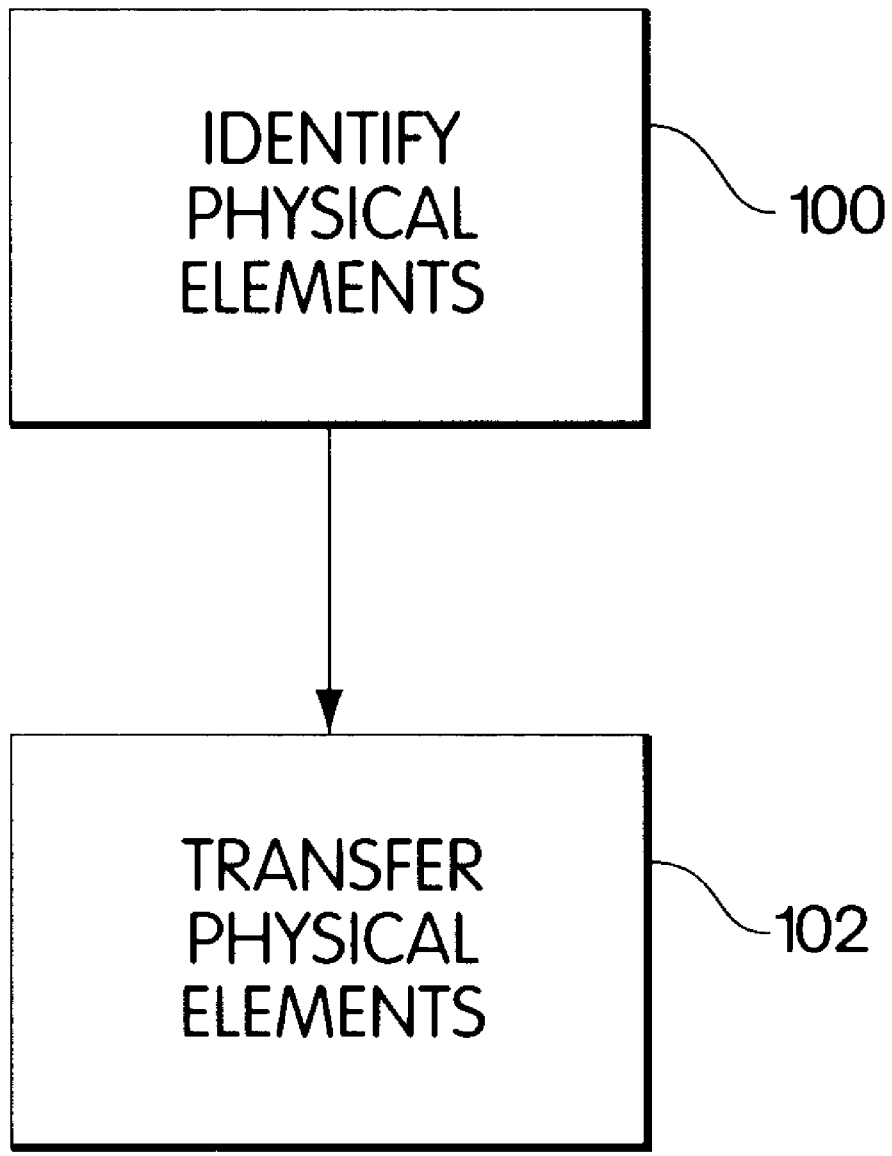
FIG. 10 illustrates one embodiment of a method of copying or backing up a logical object.

FIG. 10 illustrates, at a very basic level, how data is moved in one such system. At a step 100, the physical elements (e.g., data blocks) that need to be copied, backed up or restored are identified. At a step 102, those physical elements are transferred.

For example, for a copy, the physical elements that are to be copied are identified at step 100. In addition, the location of where the elements are to be copied to are identified. For a copy between primary storage nodes, this may involve identifying the copy from locations and the copied to locations. For a backup, this involves identifying the copy from locations and may be as simple as determining what tape or other backup storage element will receive the backup data.

For a copy between primary storage nodes, the physical elements are transferred from the identified copy from locations to the identified copy to locations. For a backup, the physical elements are copied to tapes. (Although reference is made to tapes as secondary storage, this is not intended to be limiting. Any other storage media may be used).

The step 100 can, however, be extremely complicated. In many cases, it is not desirable to copy the entire contents of a primary storage node. Rather, only a subset of the physical elements in the primary storage node may need to be copied. As one example, consider backing up a database stored in primary storage node 92a of FIG. 9. This database may occupy only a small portion of the total data stored in the primary storage device 92a—in fact, there may be an extremely large segment of data accessible primarily by the host computer 90b which host 90a may not even be capable of reading (because it is a different platform than the host computer 90a).

In short, it may be desirable to backup a logical object stored within a primary storage node. In this case, the step 100 requires mapping the logical object onto the physical elements in the primary storage node 92a in order to identify the physical elements that need to be copied from 92a. As described above with reference to FIG. 2C, these physical elements may be located in disparate locations within the primary storage device.

The step 102 may similarly be complicated. Even after all of the physical elements in the primary storage device have been identified, simply transferring the physical elements is insufficient. The relationship between the physical elements may need to be preserved for the copied or backed-up logical object to be read by the host computer coupled to the receiving primary storage node. One mechanism for use of mapping a logical object to physical elements and preserving the logical relationship between those physical elements is discussed below. This is not intended as limiting with respect to other aspects of the present invention.

In any event, under a storage-centric model of computer storage, it may be desirable to permit as much of the data transfer process (e.g., the one shown in FIG. 10) to be performed within the storage network—and without requiring resources from the host domain. Accordingly, the primary storage nodes and the secondary storage nodes in the network may include sufficient intelligence to handle aspects of the data transfer process. For example, the primary storage nodes may be capable, at a minimum, of managing the transfer of identified physical elements in a logical object even when those physical elements are stored in disparate locations within the primary storage device. In a storage centric model of a computer system, it may be desirable to move some (or as much as possible, in some cases) of the data transfer functions to be performed using resources among primary and secondary storage nodes within the storage domain.

The computer system may include a storage management application ("SMAPP") for managing manipulation of storage within the storage domain. The SMAPP can be implemented using software on the host computers, primary storage nodes, a separate storage controller or in some combination of these, as described below with reference to FIGS. 11A and B, below.

The storage management application can be implemented using three primary components—a management component, server component and client component.

The management component controls configuration of the backup, control and monitoring of the backup and copying processes in the storage domain. The management component also tracks location of copies of logical objects in the storage system including, for example, what tape or tapes contain backups of each particular logical object.

The server component controls the hardware functions of the memory process, such as acts of mounting and dismounting tapes, opening and closing, reading and writing tapes and other memory media.

The client component of the SMAPP handles manipulation and identification of the backup or copy-from source. For example, the client component is responsible for identifying the applicable logical object (e.g., file system, file or database) and determining what operating system level (or logical volume manager level) physical elements are involved. (As described above, an additional layer of mapping may be performed within the storage domain at the primary storage element of 111. For example, if the primary storage element 111 is a Symmetrix product as described above, the identified physical tracks may be re-mapped within the primary storage element 111.)

Figure 11A:
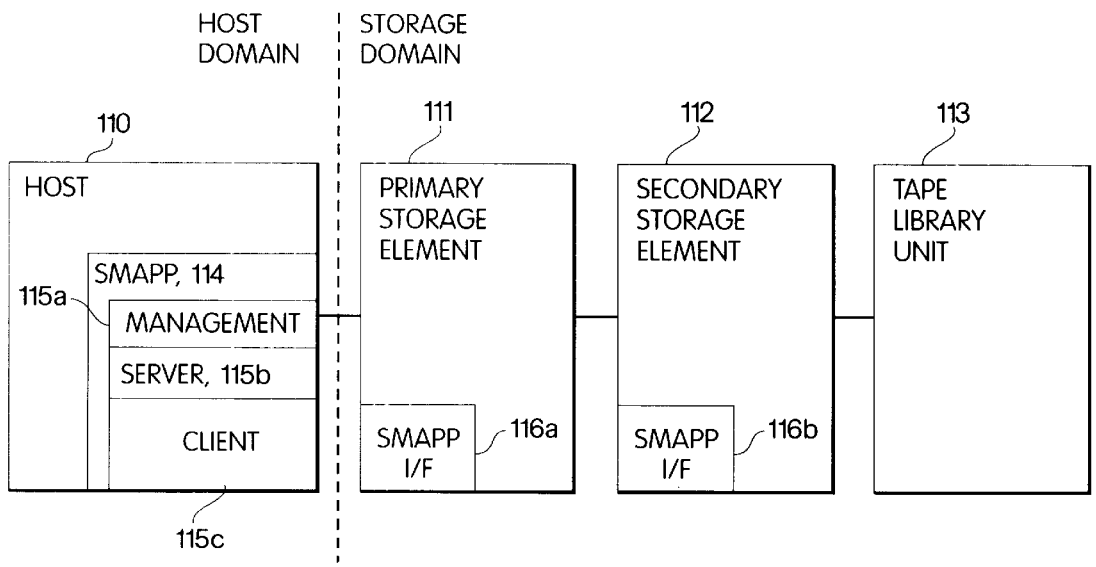
FIG. 11A illustrates one example of some of the components of a computer system that includes a host domain and a storage domain, according to one embodiment of the present invention.

FIG. 11A illustrates one example of a portion of a computer system having a host domain and a storage domain. In the example, only one host 110 is shown in the host domain. In addition, only three components are shown in the storage domain. These are the primary storage element 111 (which may be, for example, a Symmetrix disk array), a secondary storage element 112 and a tape library unit 113. As described above, additional storage elements may be included, coupled together by a network. For simplicity, the example of FIG. 11A shows only one element from each of three different storage levels—host, primary storage element and secondary storage element.

In the example of FIG. 11A, a storage management application ("SMAPP") 114 is primarily a resident on the host computer 110. Thus, the host computer would include an Application Programming Interface ("API") which would permit management of copying, backup and restore (and other) operations. In addition, the storage management application 114 on the host 110 includes a server component 115b. Again, the host would include an API permitting management of server operations. Finally, the storage management application 114, in this example, includes a client component 115c. The client component would be responsible for identifying and manipulating logical objects and identifying (from the operating system or logical volume management level view of) the physical elements that comprise the logical object.

For simplicity, the operation of performing a backup from the primary storage element 111 to the secondary storage element 112 will be described. A similar process would apply for setting up mirroring or copying functions between primary storage elements in a network.

In this example, the primary storage element includes an SMAPP interface 116a. Similarly, the secondary storage element 112 includes an SMAPP interface 116b. The copying of a logical object from the primary storage element 111 to the secondary storage element 112 in the embodiment shown in FIG. 11A may proceed as follows. First, a "virtual circuit" or "connection" is set up between the primary storage element 111 and the secondary storage element 112. This may be a virtual circuit established through a network coupling the primary storage element to the secondary storage element 112 (including a single RDF link between the primary storage element 111 and the secondary storage 112, for example). In addition to establishing a physical connection between the nodes, the virtual circuit identifies a session for copying a series of data (comprising, e.g., the logical object) over the identified connection.

Thus, the management component 115a on the SMAPP 114 on the host computer 110 may begin a backup session by instructing the primary storage element to establish a virtual circuit with the secondary storage element 112. The actual establishment of the virtual circuit may then be performed by the SMAPP interface 116a of the primary storage element 111 in combination with the SMAPP interface 116b of the secondary storage element 112.

The client component 115c of the host computer 110 identifies a logical object for backup. The client component 115c then maps that logical object to the operating system (or a logical volume manager level) set of physical elements. This mapping may be performed in one step. The client component 115c of the host 110 may then identify the elements for copying to the primary storage element 111, as communicated through the SMAPP interface 116a.

The server component 115b of the host 110 would identify and mount the appropriate tapes in the tape library unit 113. In this particular example, the server component 115b performs these commands by passing them to the SMAPP interface 116b of the secondary storage element 112, through the SMAPP interface 116a of the primary storage element 111, which then mounts the tapes.

The actual performance of the backup process may proceed, without further control by the host 110 of the host domain (except, in some embodiments, monitoring the process and managing the backup media, e.g., controlling changing of tapes in a tape drive). The primary storage element 111 may copy the identified physical segments to the secondary storage element 112.

Figure 11B:
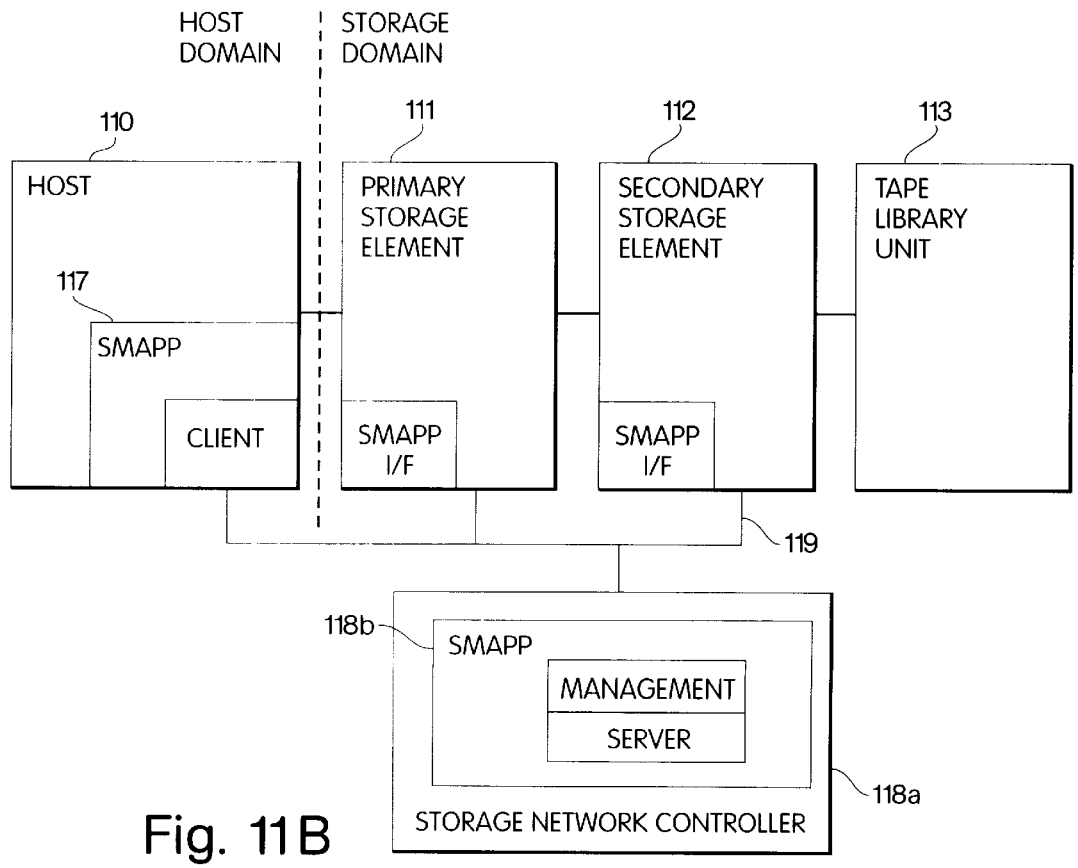
FIG. 11B illustrates another embodiment of components of a computer system that is divided into a host domain and a storage domain, according to one embodiment of the present invention.

FIG. 11B illustrates an alternative structure for control of the storage domain of a computer system according to the present invention. In this example, a storage network controller 118a is connected to the host 110, primary storage element 111 and secondary storage element 112 through a network 119. This network, for example, may follow the TCP/IP protocol. The storage network controller 118a may be any hardware, or hardware and software, combination capable of performing the requisite functions. For example, the storage network controller 118a may be a computer running a windows NT operating system, with suitable application software for performing the SMAPP functions.

In this example, a significant portion of the SMAPP software is resident on the storage network controller 118a. Thus, the SMAPP 118b of the storage network controller 118a includes a management component and a server component. Thus, management of the hardware and media can be performed by the storage network controller 118a, independent of the host computer 110.

In this example, the host 110 includes an SMAPP 117 to perform client functions. Thus, logical to physical mapping is still performed in the host domain by the host computer 110. As the client component of the SMAPP 117 is responsible for identifying logical objects and performing logical to physical mapping, this can be a sensible arrangement. The logical to physical mapping depends on the particular host platform and the host necessarily has elements capable of performing the requisite mapping.

In other embodiments, however, the client component can be included in the storage network controller 118a, or in a separate device capable of performing logical to physical mapping for one or more platforms. Where this is done, the identification and transfer of data for copying and backup purposes can be performed completely separately from the host domain. In many systems, however, it will be more efficient to use the memory mapping mechanisms (client component) on the host computer.

Other arrangements of the SMAPP software are possible. For example, the components of the SMAPP software may be distributed across the primary storage elements in the storage domain, the secondary storage element or elements in the host domain or some combination thereof.

Figure 12:
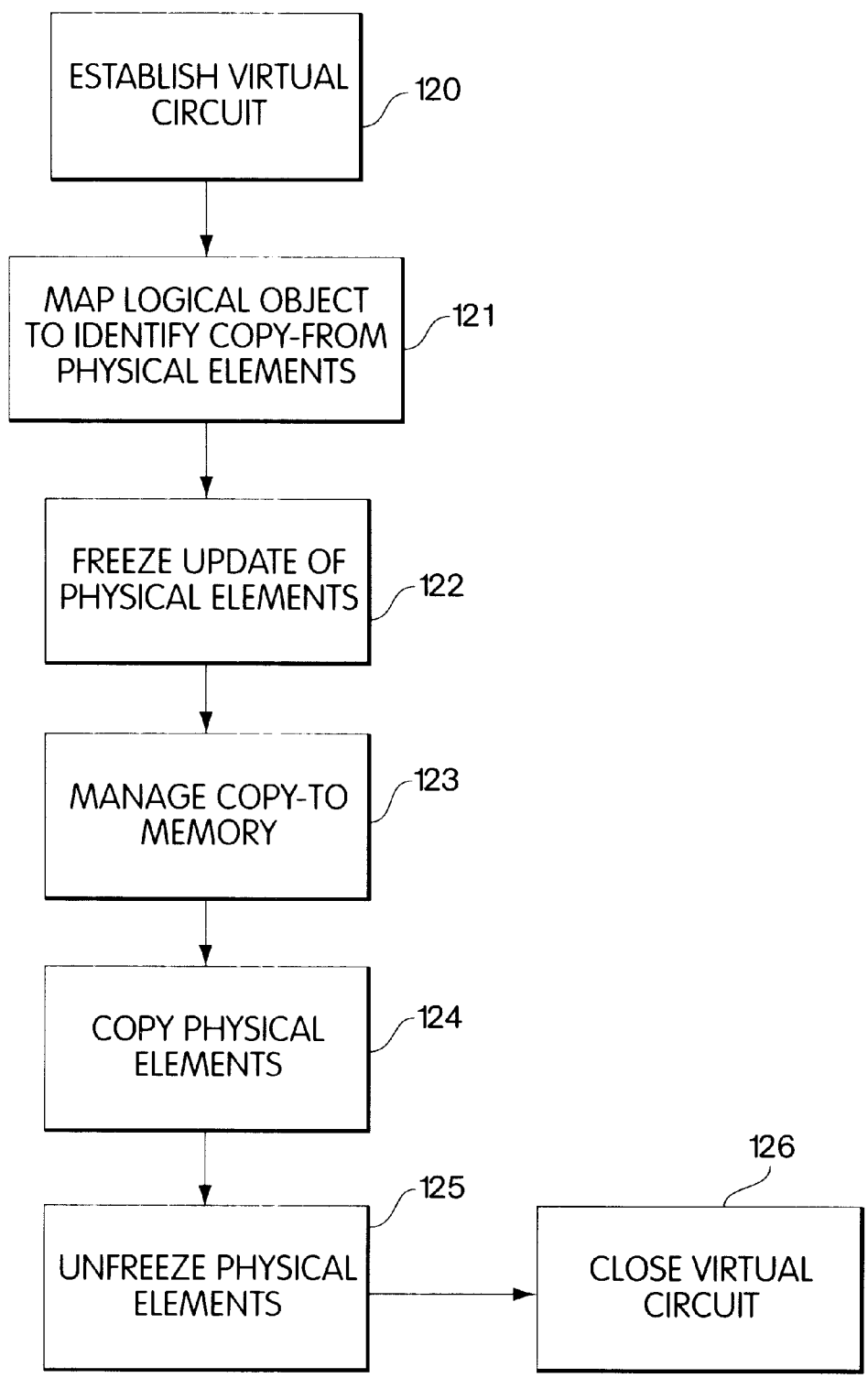
FIG. 12 illustrates one embodiment of a method for copying or backing up data in a computer storage system.

FIG. 12 illustrates one embodiment of a method for transferring a logical object according to a system such as the one shown in FIGS. 11A and 11B. At a step 120, a virtual circuit is established. As described above, this may correspond to establishing a physical connection between the element being copied from (e.g., a primary storage element) to the storage element being copied to (e.g., a secondary storage element). In addition, this step 120 corresponds to establishing a session for performing the copying over the connection. As described above, the establishment and managing of the virtual circuit can be performed by an SMAPP component resident on a host computer, storage network controller, or other device.

At a step 121, the logical object is mapped to identify the physical elements being copied from. For performing a backup, this would correspond to mapping an identified logical object at the application level to a set of physical elements at the storage level.

To restore from a tape, this would correspond to identifying the logical locations of the segments of memory on the tape. If the tape contains a logical bit file, this step is straightforward. No actual mapping needs to take place. In other circumstances, such as the abstract block sets described below, a table or other structure may identify the mapping of portions of the physical elements to their order in the logical object. The actual mapping from the logical level to the physical level may have been performed at the time of the backup and saved.

At a step 122, update to physical elements is prevented. For example, if a database is being backed up from a primary storage element to tape, updates of the logical object should be prevented so that the backup can correspond to a single point in time. Of course, if the copying is from a backup tape to a primary storage element, the freezing of updating the physical elements is rather simple—the tape will not be written while it is being read from in the restore. In one embodiment, a method for concurrent copying described below may be used to prevent the update of physical elements during the copying process.

At a step 123, the copy-to memory is managed. For a backup from a primary storage element to tape, this may correspond to mounting and disbounding the appropriate tapes, as well as managing the tape library, catalog information, as well as writing appropriate tape headers and trailers. Where the information is being copied to another primary storage element, this may correspond to managing the receiving physical elements of the primary storage element being copied to. In addition, it may involve setting up an appropriate storage area to receive the information.

At a step 124, the actual physical elements are copied. The copying may be done in the appropriate order for the logical object, such as when an ordinary data file is sent at the application level between two host computers. In the context of a backup, one such system is described in U.S. patent application No. 09/107,679, which is incorporated herein in its entirety. In an alternative embodiment, the physical data blocks may be copied out of order, together with appropriate metadata identifying the correct order of the physical elements in the logical object. An embodiment of this type of system is described below.

At a step 125, the physical elements of the logical object, in the copy-from memory, are unfrozen—allowing updates of the logical object. The backup is complete and the physical elements can be unfrozen.

Finally, at a step 126, the virtual circuit may be closed.

Logical Object Translation to Abstract Block Sets

As described above, there are at least two different ways of passing data blocks of a logical object to a storage element—transfering the blocks in order as a logical object (as is done over a network between host computers) and a pure physical copy (which may not preserve the logical relationship among the data). Each of these possibilities has advantages and disadvantages. For example, copying each data block of a logical object in order preserves the relationship between data blocks. On the other hand, copying the blocks in order may result in delays as the storage elements sequentially retrieve the data blocks or sort the data blocks for writing, as a part of the copy process. On the other hand, pure copying of physical elements can be unnecessarily slow if unused physical elements are copied. In addition, the logical relationship between the data blocks that are copied may be lost.

An alternative is to use an abstract block set structure, as described more fully below. This type of structure is useful not only in the storage network architecture as described above, but has greater applicability. For example, the abstract block set concept may be employed in any system where logical objects are copied from one storage element to another storage element. The abstract block set can also be used to particular advantage when used for backing up and restoring data from a secondary storage device, such as a tape drive.

The abstract block set permits storage of the data blocks in any order. The abstract block set includes information about the ordering of those elements.

Figure 13:
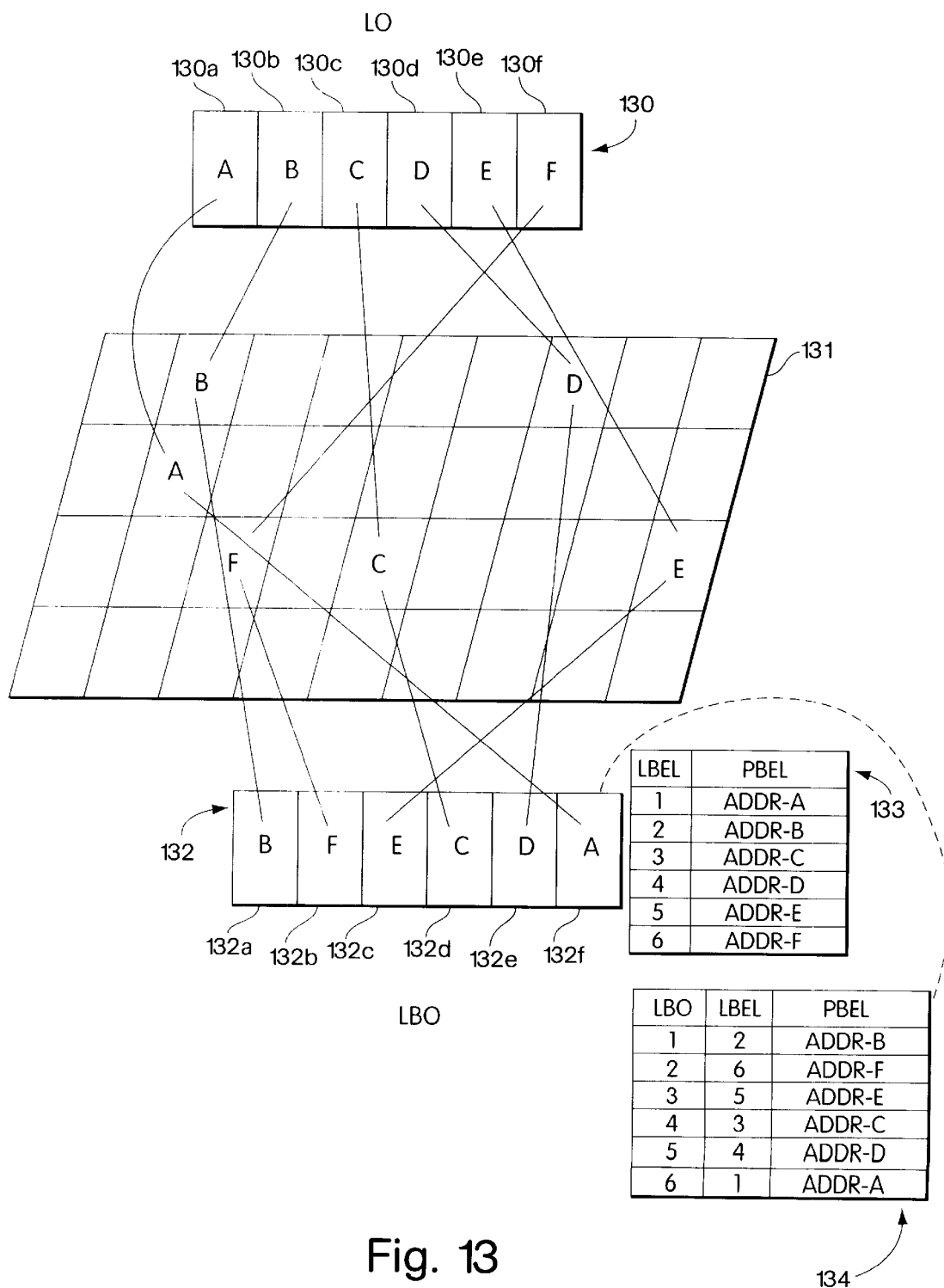
FIG. 13 illustrates one example of mapping a logical object onto a physical storage device and formation of an abstract block set for copying or backup, according to one embodiment of the present invention.

FIG. 13 illustrates one example of an abstract block set. From the application perspective, a logical object 130 includes a number of data blocks 130a–130f (ordinarily a logical object may include substantially more data blocks, FIG. 13 being by way of illustration only). The data blocks having a logical relationship or order, as illustrated by labels A–F in the logical object 130.

The logical object is stored in a physical memory 131, as generally described above with reference to FIG. 2C. Each column may be viewed as a track (although this is not intended as limiting), and each row as a row of blocks within the tracks. As shown in FIGS. 2C and 13, the logical data blocks may be scattered throughout the physical memory 131.

An abstract block set 132 may be constructed from the data blocks 130a–130f. In the abstract block set 132, the data blocks are not necessarily stored in the same order as they appear in the logical object. In this example, they are in a random or pseudo-random order. (As a practical matter, the order of data blocks may reflect the way that the data blocks are stored in a physical storage 131. For example, if data blocks A and B are stored on one track they would probably be read and written to abstract block set 132 in the order they appear on that same track. The abstract block set 132 appearing in FIG. 13 is for illustration only.) Because the logical data blocks are not in order in the abstract block set 132, it may not be possible to reconstruct the logical object given only the data blocks 132a–132f.

Accordingly, the abstract block set 132 includes metadata 133. The metadata is any recorded information that provides a mechanism to reconstruct the order of logical data blocks as they appear in the logical object 130.

In the example of FIG. 13, the metadata 133 includes an ordering of logical block elements (the column labeled LBEL) with the physical element location. Thus, logical block element 1 has metadata corresponding to the address of that logical data block in the physical memory 131—the physical element address. Using the metadata illustrated at 133, each of the stored data blocks 132a–132f in the stored abstract block set 132 would need to include a label with the corresponding physical address. Thus, for example, to locate the first logical data block 130a of the logical object 130, one could examine the metadata 133 and determine that the first abstract block set (as shown in the first column of the metadata 133) has a physical address ADDR-A. This data block could then be found in the abstract block set 132 by examining the physical addresses of the data blocks 132a–132f (the physical addresses appearing within the data blocks 132a–f), until the appropriate block is found.

Of course, there are a variety of other formats that could be used for the metadata. As one example, a label other than the physical address could be used. As another the metadata 133 could just describe the order of the logical block elements in the abstract block set 132. In this case, the second column of the first row of the metadata 133 could indicate that the first logical data block (corresponding to A) is stored as the sixth block in the abstract block set 132.

For each of these alternatives, the first column of the metadata 133 is not required. The order of the elements in the second column corresponds to their location within the logical object 130; the address for the first logical block element appears first in the table, the address for the second logical data block appears as the second entry in the second column, etc.

Metadata 134 illustrates another way of storing the metadata associated with the logical block 132. In this table of metadata, a first column corresponds to the ordering of data blocks as they appear in the abstract block set (as above, unnecessary as the order that the rows appear implies this information—the first row is the first block in the abstract block set). The second column indicates the position of the data block within the logical object 130. Thus, the first entry in the first row of the metadata 134 corresponds to the data block 132a of the abstract block set 132. This is the second data block 130b of the logical object 130. Accordingly, the second column has a "2" indicating that this data block 132a is the second data block of the logical object 130. The last column of the metadata 134 provides the physical address for the applicable data block in the physical memory 131.

Using the metadata shown at 134, there would be no need to store the physical address of the data block with (or other tag) with the data blocks as stored with the abstract block set 132.

As above, using the metadata 134, it is not strictly necessary to store the physical address within physical memory 131 of the applicable data block. This may, however, be useful information to include within the metadata 134. In many cases, restores will be made to the same memory locations from which the information was backed up. In this case, it will be easier to restore to those addresses in the physical memory 131—that information was not available. Otherwise, a logical to physical mapping step may be required to determine again where the appropriate addresses are for the restored data blocks.

Other formats of metadata may be used. For example, metadata may be tracked for extents (sequences of blocks) rather than individual blocks.

Figure 14:
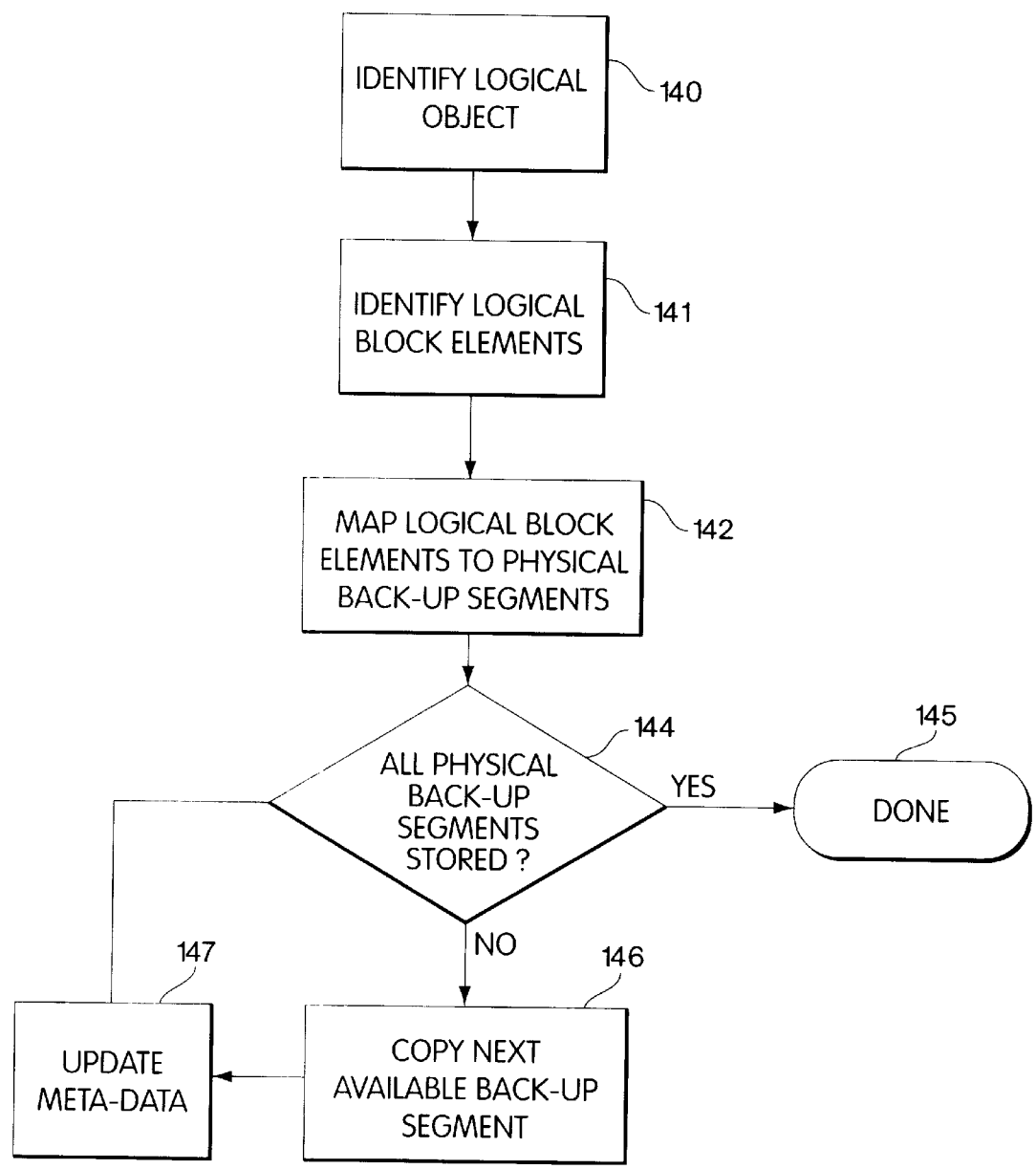
FIG. 14 illustrates one embodiment of a method for forming an abstract block set.

FIG. 14 illustrates one embodiment of a method for copying a logical object to form an abstract block set as described above. At a step 140, the logical object is identified. As described above, the logical object can be any logical entity, such as a database, a segment of a database, file, or file system.

At a step 141, the logical block elements or logical data blocks of the logical object are identified. This may precede as generally described above.

At step 142, the logical block elements are mapped to physical backup segments. The physical backup segments may correspond to the physical elements that store the logical data blocks. In the event that the abstract block set is to include metadata of the form illustrated at table 133, the mapping step 142 may include formulating that information into whatever format the metadata is stored in.

As described above, the steps 140–142 may be performed by a client component of a storage management application. In some systems, this may require the resources of a host computer.

The remainder of the copying process may proceed without significant involvement of the client component of the storage management application.

At a step 144, is to determine whether all physical backup segments have been copied. If so the copying process is complete at step 145.

If not all of the physical backup segments have been copied, the next available backup segment is copied at step 146. As described above, this copying need not be performed in the order appearing in the logical object identified at step 140.

In the event that the metadata is being stored as shown at table 134 of FIG. 13, then the metadata may be updated after the applicable backup segment has been copied into the medium holding the abstract block set. For this form of metadata (but not the form shown at 133 of FIG. 13). This may not occur until the applicable backup segment is copied to the medium storing the abstract block set because, until that time, the order of appearance for the applicable physical backup segment is not known.

Figure 15:
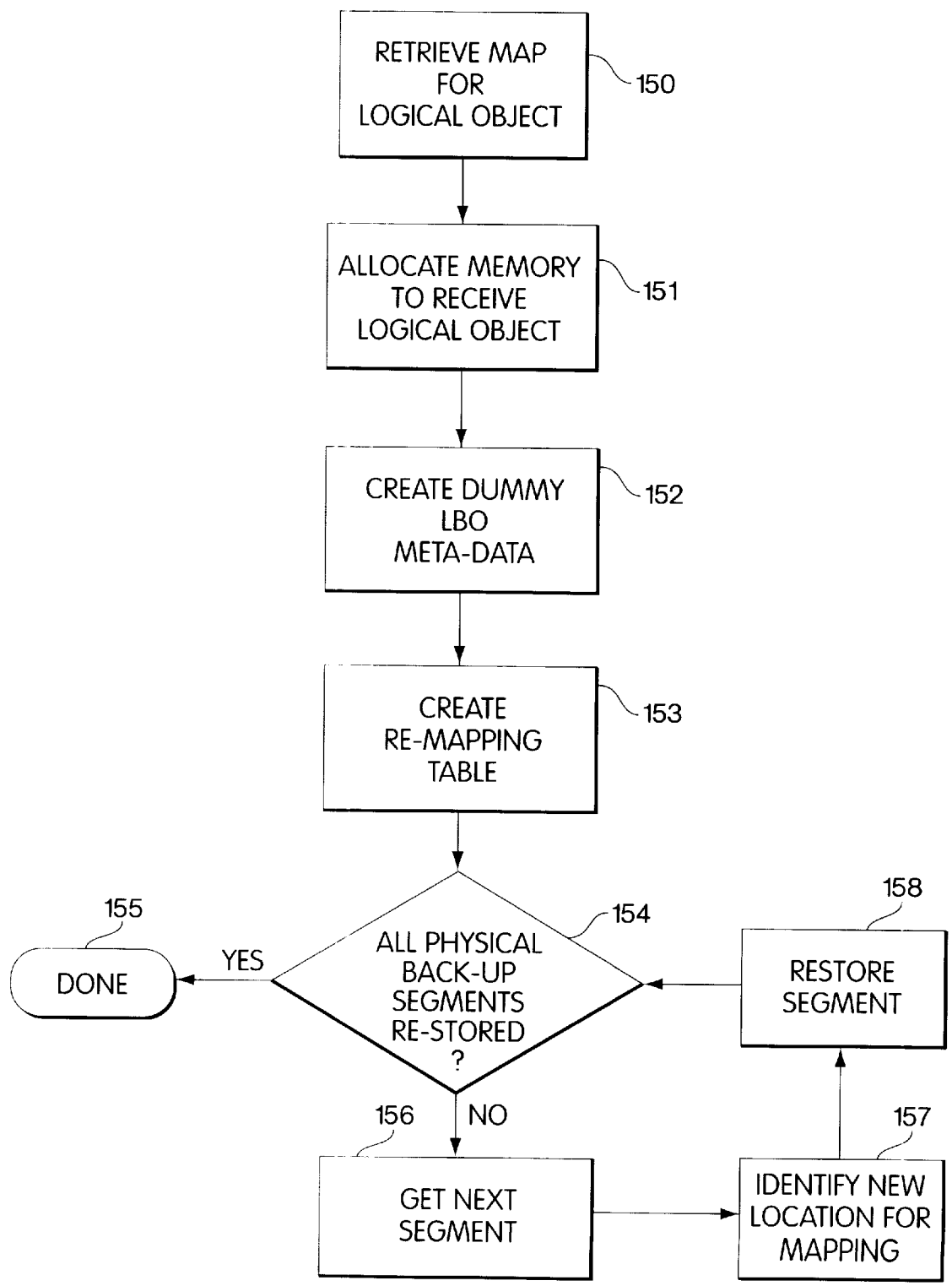
FIG. 15 illustrates one embodiment of a method for copying or restoring a logical object from an abstract block set.

FIG. 15 illustrates one embodiment of a method for restoring an abstract block set to a memory system, such as the primary storage node described above.

At a step 150, the metadata for the abstract block set is retrieved. This may be in the form of a map for the abstract block set such as those illustrated at 134 of FIG. 13 or may be a set of labels associated with the individual data blocks stored in the abstract block set, such as in table 133 of FIG. 13.

At a step 151, memory is allocated in the target storage device for receiving the logical object. The amount and configuration of the memory required to receive the logical object can be determined from the metadata for the abstract block set. Thus, the metadata will include sufficient information to determine the characteristics of storage required. For example, in the event that the abstract block set indicates use of fixed size blocks, the total number of (fixed size) blocks required to store the logical object can be determined by the number of entries and a metadata table or maybe separately stored as a part of the metadata for the abstract block set.

At a step 152, dummy metadata is created for the newly allocated physical memory for the logical object to be restored. The result can be a new table such as the one shown at 133 of FIG. 13.

At a step 153, a re-mapping table is created. The re-mapping table specifies a correspondence between the data blocks of the abstract block set is the source of data and the allocated data blocks in the physical memory. An example of a re-mapping table is described with reference to FIG. 16. Although shown in tabular form, the data can be stored in other forms and formats.

At a step 154, it is determined whether all of the physical backup segments have been restored from. If so, the restore is complete at a step 155.

If not, at a step 156, the next physical backup segment is retrieved. At a step 157, the location and the newly allocated memory for receiving the logical object is determined. This can be done by examining the re-mapping table created at step 153. In addition, the retrieval of segments done at step 156 need not be in any specific order. The re-mapping table permits restoration of the entire logical object even when the data blocks are provided in a random order.

At a step 158, the data from the physical backup segment is restored to the appropriate locations. Steps 154–158 then continue until all of the data blocks have been properly restored.

Figure 16:
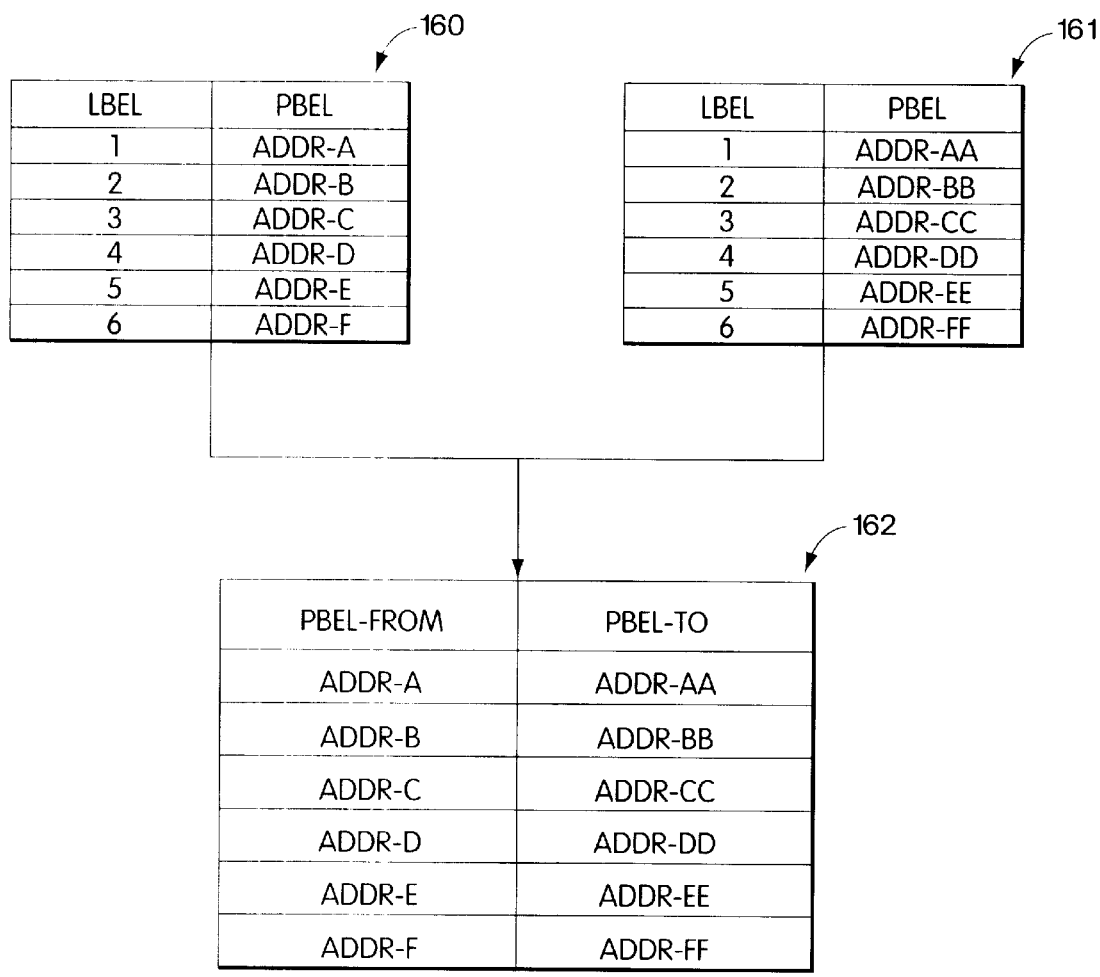
FIG. 16 illustrates one example of combining two forms of metadata for a logical object into a remapping table for restoring the logical object to a new area of memory.

FIG. 16 illustrates an example of creation of a re-mapping table. Of courses many variations on the creation of re-mapping table are possible, depending on how the metadata is formulated and stored for the abstract block sets.

In FIG. 16, metadata 160 is provided for the abstract block set that is serving as the source for the restore. This table corresponds to the metadata 133 of FIG. 13.

FIG. 16 also illustrates dummy metadata 161 for the allocated memory that will receive the restored logical blocks of the restored logical object. In this embodiment, the format is the same as that for the metadata 160, except that different addresses (potentially on a completely different storage element) are provided. Thus, for the first row in metadata 161, the first logical data block should be stored at the physical location specified at ADDR-AA.

A simple merging of these two tables can result in a re-mapping table 162. The re-mapping table 162 specifies the physical location from the data in the abstract block set and the destination for the that logical data block.

Of course, other formats may result in other tables. For example, it would be possible not to specify any physical addresses in the re-mapping table 162. The re-mapping table could simply map the sequential location in the abstract block set being restored from to the physical address or to the sequential location on the receiving storage element.

In other embodiments, each entry in the metadata remapping table may correspond to extents in the physical memories restored from and to.

Physical Backup Segment Granularity

In the discussion with respect to FIGS. 13–16, it was assumed that the backup, copy and restore was performed at the data block level. Thus, the physical backup segment corresponded in size to the size of a data block. Those data blocks that are part of the logical object, and only those data blocks were copied for backup and were restored.

Granularity of the physical backup segments need not, however, correspond to the granularity of the data blocks. For example, a track may store a number of physical data blocks. In some instances, not all of the data blocks within a track are necessarily a part of the same logical object. Thus, in a track that stores four data blocks, only two of those data blocks maybe a part of a logical object, the other two data blocks being unused or part of a different logical object. Backing up of data in a logical object may, however, be performed at the track level rather than the physical data block level. The result would be an abstract block set that includes some data blocks that are not a part of the logical object.

Thus, in the preceding example, the physical backup segment size corresponds to the size of a track. The actual physical data blocks that may store the data of a logical object are smaller, e.g., four data blocks per physical backup segment of one track.

Figure 17:
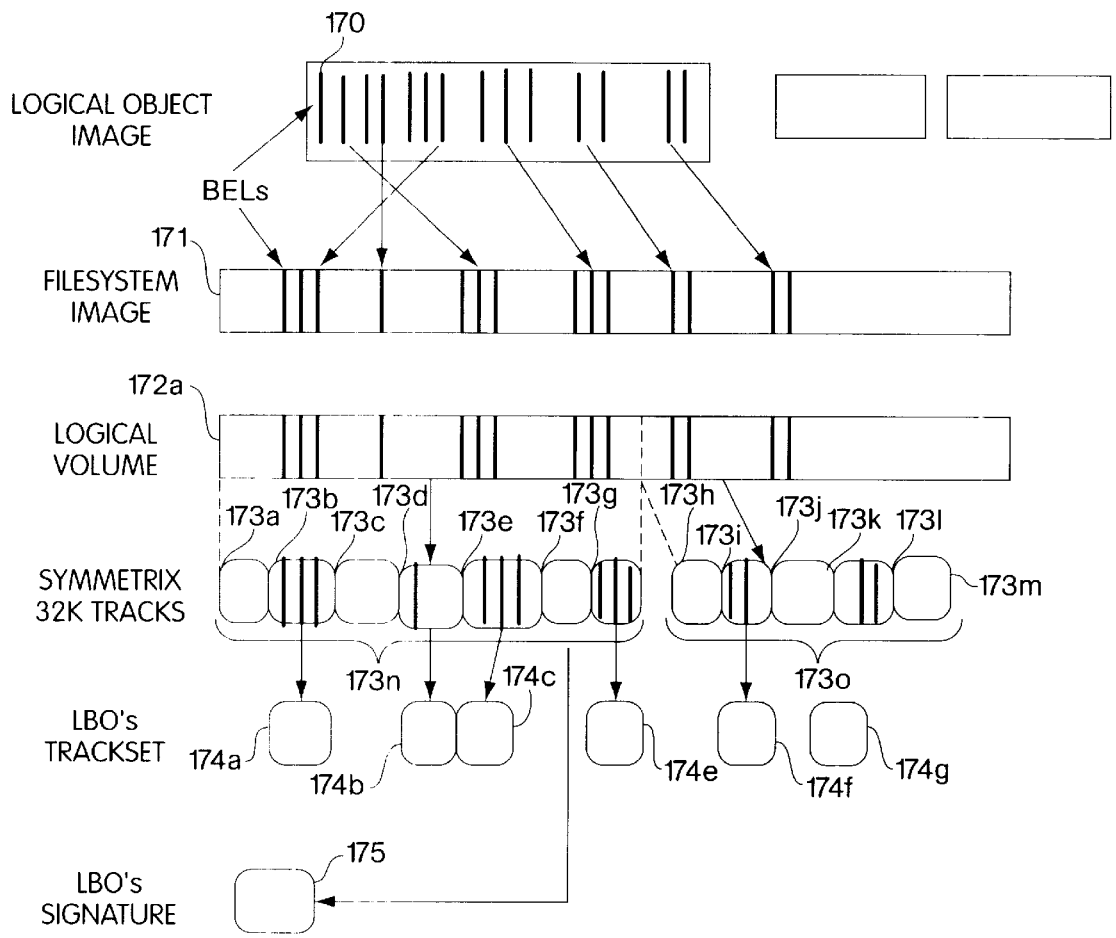
FIG. 17 illustrates one example of storage of a logical object across a computer system and formation of an abstract block set using physical backup segments corresponding to track size, according to one embodiment of the present invention.

FIG. 17 illustrates the concept of a physical segment size (here, a track) that is larger than the size of the physical data blocks. In the example of FIG. 17, a logical object 170 is stored on a physical device that includes tracks. Each track holds (in this example) up to three data blocks.

At the application level, the logical object 170 is viewed as a continuous file. This file may be partitioned into a number of logical data blocks, shown in FIG. 17 as vertical bars within the logical object 170.

At the file system level, a file system image 171 holds that data in each of the logical data blocks of 170. As shown in the file system image 171, the order of the logical data blocks at the file system level may not correspond to the order of their appearance within the logical object 170. As described above, a mapping process maps the logical data blocks to appropriate locations within the file system image 171.

The file system image 171 may be mapped to a logical volume of hypervolume level 172a–172b.

The logical volumes 172a–b are then stored on a physical storage device in hypervolumes 173n and 173o. As shown in FIG. 17, the hypervolumes may not be physically adjacent. (Of course, as described above, other techniques for mapping the logical data blocks of the logical object 170 to the physical storage device are possible and within the scope of the present inventions.)

The first hypervolume 173n stores data across seven tracks 173a–173g. These tracks may, but need not, be contiguous segments of memory.

In this example, the entire track 173b contains physical data blocks that are part of the logical object 170 (given the assumption that only three data blocks are stored per track). The track 173d, however, includes only one data block that is a part of the logical object 170—the other data blocks in the track 173d either being unused or containing data belonging to a different logical object. In addition, some of the tracks within the hypervolume 173n do not contain any data from logical object 170, e.g., tracks 173a, 173c and 173f. The hypervolume 173o similarly contains some tracks that include data from the logical object and some tracks that do not.

Given that the physical backup segment granularity is chosen to be track size in this example, the physical segments that would be part of a backup process would include tracks 173b, 173d, 173e, 173g, 173i, and 173k. These tracks make up the physical backup segment set (here, a "trackset") that would be copied when the logical object is backed up. Since, in the example of FIG. 17, the physical backup segment granularity is by tracks, this may be referred to as a track set.

Thus, the track set for a backup of logical object 170 would include tracks 174a–174g, which in turn correspond to those of the physical tracks 173a–173m that include data blocks from the logical object 170.

The backup process using a physical backup segment size that is different than the data block size can proceed generally as described with reference to FIG. 14. At step 142, however, identification of the physical backup segments includes not just identifying the logical block elements but using the identified logical block elements and their physical data block locations to determine the physical backup segment set, e.g., the track set 174a–174g of FIG. 17.

In addition, the copying of the available backup segments at step 146 would involve copying the larger granularity segment (e.g., a complete track rather than just the particular physical data blocks on the track). As in FIG. 14, the physical backup segments (e.g., tracks) may be copied in any order.

Returning to FIG. 17, an abstract block set signature track 175 may be stored. This signature track includes the metadata for the abstract block set. In this embodiment, specification of the metadata for the abstract block set may include a specification of the particular data blocks in the abstract block set and their location within the logical object 170.

Figure 18:
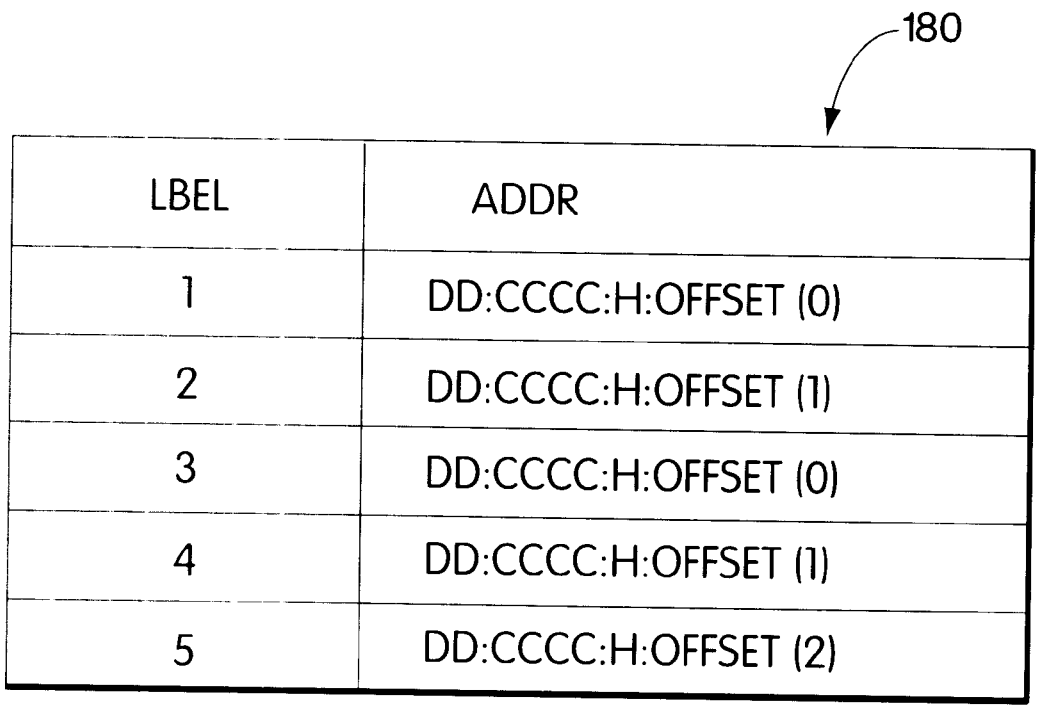
FIG. 18 illustrates an example of one embodiment of metadata for an abstract block set that has a physical backup segment granularity larger than the size of a datablock.

FIG. 18 shows one example of metadata 180 for an abstract block set that has a physical granularity greater than the size of the physical data block. In this example, the location of each data block is specified. The first column is a specification of the data block within the logical object— e.g., first, second, third, fourth data block.

The second column of the metadata 180 specifies the physical address of that logical object. In this example, that physical address includes a specification of where within the physical backup segment the applicable data block is located. For example, this information may be included as an offset within the physical backup segment. Thus, an address of dd:cccc:h:offset includes a specification of the physical backup segment (dd:cccc:h), which in this example specifies a track and a location within that physical backup segment (track), and an offset. For example, the first row of metadata 180 corresponds to the first logical data block in the logical object. It also happens to appear as the first data block in the specified physical backup segment address, e.g., as an offset from the beginning of the physical backup segment (here, a track) of just zero. The second row of the metadata 180 specifies the same address, but has an offset of 1—it is a data block appearing in that physical backup segment (track) immediately following the data block corresponding to the first logical data block of the logical object.

In this example, it may be assumed that the track that includes the first two logical data blocks (first two rows of metadata 180) has additional room within the track, but that those additional data blocks in the track are not a part of the logical object. Accordingly, there is no entry in the metadata table 180 specifying a corresponding logical data block for that portion of the track. (In an alternative embodiment, of course, an entry could be made which indicates that that portion of the track is unused in this abstract block set.)

As described above with reference to FIG. 13, many other forms and formats for storing metadata may be applied.

Restoring (or copying) from an abstract block set that has a physical backup segment granularity larger than the data block size may proceed as generally prescribed above with reference to FIG. 15. At step 157, however, the locations of the logical data blocks within the backup segment are identified—including determining whether any portions of that backup segment may be omitted. At step 158, only those data blocks that are actually used in the logical object are restored.

Selecting a physical backup granularity larger than the size of data block can require transfer of more memory than if the physical backup segment size is the same as the data block—some unused data blocks are included as a part of the copy or backup process.

A larger physical granularity size can, however, result in certain advantages. For example, less overhead may be required in the copying process—fewer segments for copying need to be specified. In addition, other resources may be preserved. For example, if high demand memory is used for storing information identifying the physical backup segments to be copied, less such memory is required. In the event that the physical data blocks of logical objects are prevented form being updated during a copy or backup process, this can be done by protecting updates at the physical backup segment level rather than the data block level—again requiring less overhead. In some systems, this can reduce the complexity of avoiding updates. Some embodiments of the invention employing different physical backup granularity than data block size may achieve some or all of these advantages, depending on the context and system in which it is implemented. None of these advantages is intended to limit the scope of the invention, which is defined by the claims below.

Concurrent Copy or Snapshot Facility

As described above with reference to FIG. 12, certain systems embodying one or more aspects of the present invention will allow copying or backup, of a logical object at a specified point in time. To do this, updates to the logical object need to be prevented during the copying or backup process. There are many ways to do this, including taking the application that uses the logical object off-line until the backup process is complete. While certain embodiments of the present invention will use this and other techniques, it may be advantageous to be able to continue processing during the backup.

Figure 19:
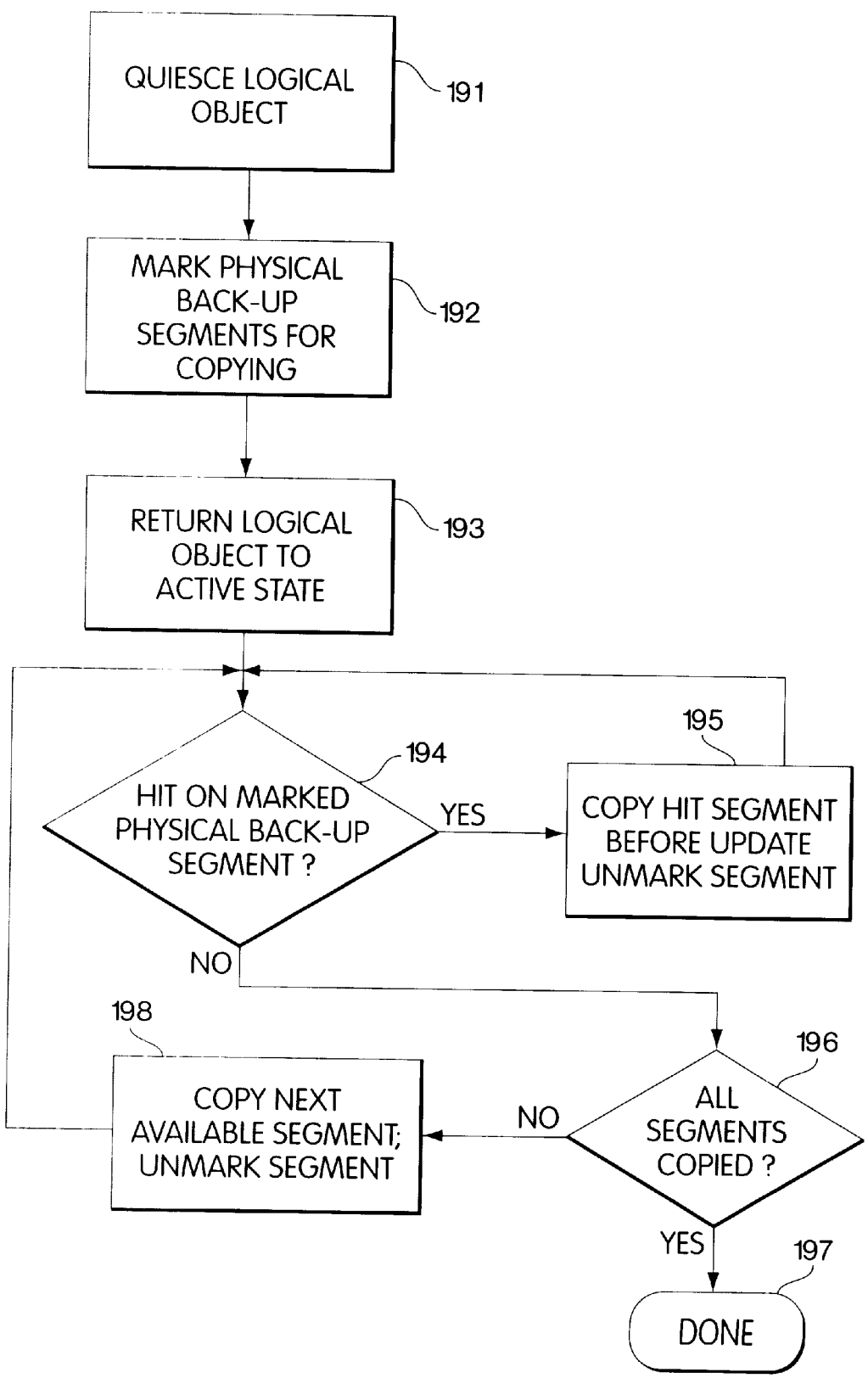
FIG. 19 illustrates one embodiment of a method for backing up a logical object while preventing updates to the logical object during the backup.

FIG. 19 illustrates one embodiment of a method for performing a backup while preventing updates to those physical data blocks that are part of the logical object being backed up.

At a step 191, the logical object (or system using the logical object) is quiesced. There are at least two ways to quiesce the system. One way is to take the application off-line, and update the logical object off-line. This prevents any further updates (or reads) to the applicable logical object. Taking the application off-line can be undesirable— resulting in loss of time and system availability.

An alternative way of quiescing a system is to place the application in on-line backup mode. For example, if the application is using an oracle database, writes to the database can be stored in a re-do log, rather than actually writing the data to a physical storage system. When the application is brought back to on-line mode, the updates to the logical object that are stored in the re-do log may then be applied to the current copy of the logical object.

At a step 192, those physical backup segments that contain data from the logical object are marked for copying. This may be done in a number of ways. For example, a bit may be associated with each potential physical backup segment in the system. The bit may be set to a "one" if the corresponding physical backup segment is part of a logical object to be copied. Of course, the methods for identifying the physical backup segments that are part of the abstract block set being copied can be used. As just one example, a list of the physical backup segments could be maintained.

Figure 20:
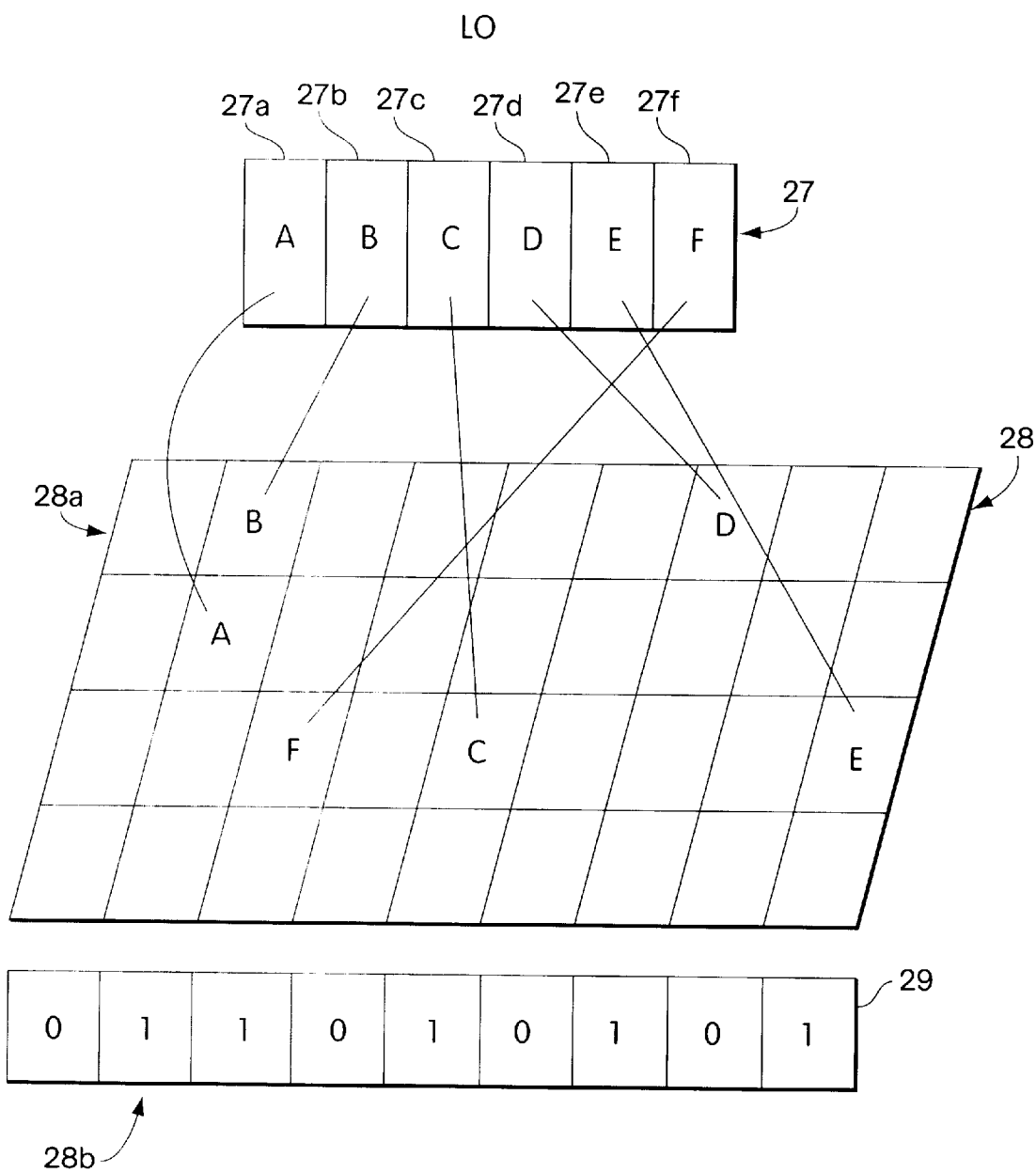
FIG. 20 illustrates one example of a system that includes markers for physical backup segments, permitting avoidance of updating information within a logical object during a backup process, according to one embodiment of the present invention.

FIG. 20 illustrates an example of a system having bits associated with physical backup segments. In the example of FIG. 20, the physical backup segment size is a track of the physical memory 28, such as column 28b. A logical object 27 is stored across the physical memory 28. A series of bits 29 is associated with the tracks of the physical memory 28. A one is set for those tracks (physical backed up segments) that are part of the track set for the logical object. Thus, the second bit of the bit set 29 is set at one, reflecting the fact that track 28b is included in the track set for the logical object 27. If the physical backup segment granularity were a data block, a bit could be associated with each data block—at higher overhead.

Returning to FIG. 19, the application using the logical object can be returned to the active state. This may, for example, involve the step of returning the application to on-line mode from off-line mode. If the application was held in on-line backup mode, any elements in the re-do log may be applied to updating the logical object.

An attempt to write to a physical backup segment included in this set of segments to be backed up will, however, momentarily stall. Before the write takes place, that segment is copied or backed up, e.g., according to the illustrative embodiment described below.

At a step 194, it is determined whether there is a hit on a physical backup segment that is included in the backup segment set in the abstract block set. If so, that segment is copied out of turn—and before the update is made. After the segment has been copied, that segment can be unmarked— further updates may be allowed for that segment. After the segment has been unmarked, the update may be performed.

Processing will then continue at step 194 in case there are additional hits (attempts to write to) a physical backup segment included in the abstract block set.

The copying of the segment may occur directly to the target (receiving primary storage element or receiving secondary storage element such as a tape) or may be copied to a cache for later copying to the target destination of the abstract block set.

If there are no pending hits on the physical backup segments of the logical object that remain to be copied, then processing may then continue at a step 196. At this step, it is determined whether all of the physical backup segments have been copied. If so, the formation of the abstract block set is complete and processing may conclude at step 197.

If there is additional copying to be done, the next available physical backup segment may be copied, at a step 198. Where abstract block sets are used, which permit the physical backup segments to be included in any order, the selection of the next segment may focus on whichever segment is next available, independent of order.

As before, after the segment has been copied, it may be unmarked. Accordingly, any incoming writes to that segment, which occur after the segment has been copied, may be performed—even if the backup process is continuing with other physical backup segments.

In situations where the physical backup segment granularity is larger than the physical data block size, a write may occur to a physical backup segment that does not correspond to a write to a logical object. For example, consider a physical backup segment that has one physical data block that is in the logical object that is being backed up and three other physical data blocks that belong to other logical objects. A write to one of the physical data blocks corresponding to different logical object would trigger backup of the physical data segment, even though the logical object being backed up is not being updated.

One alternative for handling such a circumstance is to examine each write to a marked physical backup segment to determine whether the write is to a physical data block that is a part of the logical object. While this method may be employed in some embodiments of the present invention, it can incur a heavy overhead penalty in the event of writes to physical backup segments.

In an alternative embodiment, the physical backups segments are treated the same whether or not a write occurs to a physical data block in the logical object being copied or the physical data block in a different logical object. The overhead associated with this alternative may not be great, particularly if implemented in a system where the copied physical backup segments are being stored in an abstract block set that permits physical backup segments to be transferred in any order.

In most cases, it will be easiest to mark and prevent updates to portions of physical memory based on physical backup segment granularity—e.g., using tracks on a disk for physical backup segment size and also for marking and preventing premature updates to the stored logical object. Other alternatives may be implemented. As just one example, in a disk system, tracks could be used as physical backup segments, but prevention of updates marked or tracked at the data block level (rather than the track level).

Differential Backups

Systems similar to FIG. 5 and FIG. 6 conventionally backup an entire logical construct or element ("logical object") specified by the user. For example, a user may specify a partition to be backed up. When this is done, the entire partition is copied to the backup storage system.

Similarly, the user may specify a database or file to be backed up. In this case, the entire database or file is copied to the backup storage system.

This can require a significant amount of time, which is ultimately unnecessary. For example, an extremely large file may be backed up at one point in time. A second backup may then be performed at a later time. Very little of the file may have been changed between the two backups. Generating a new backup of the complete file can, therefore, be wasteful.

Figure 21:
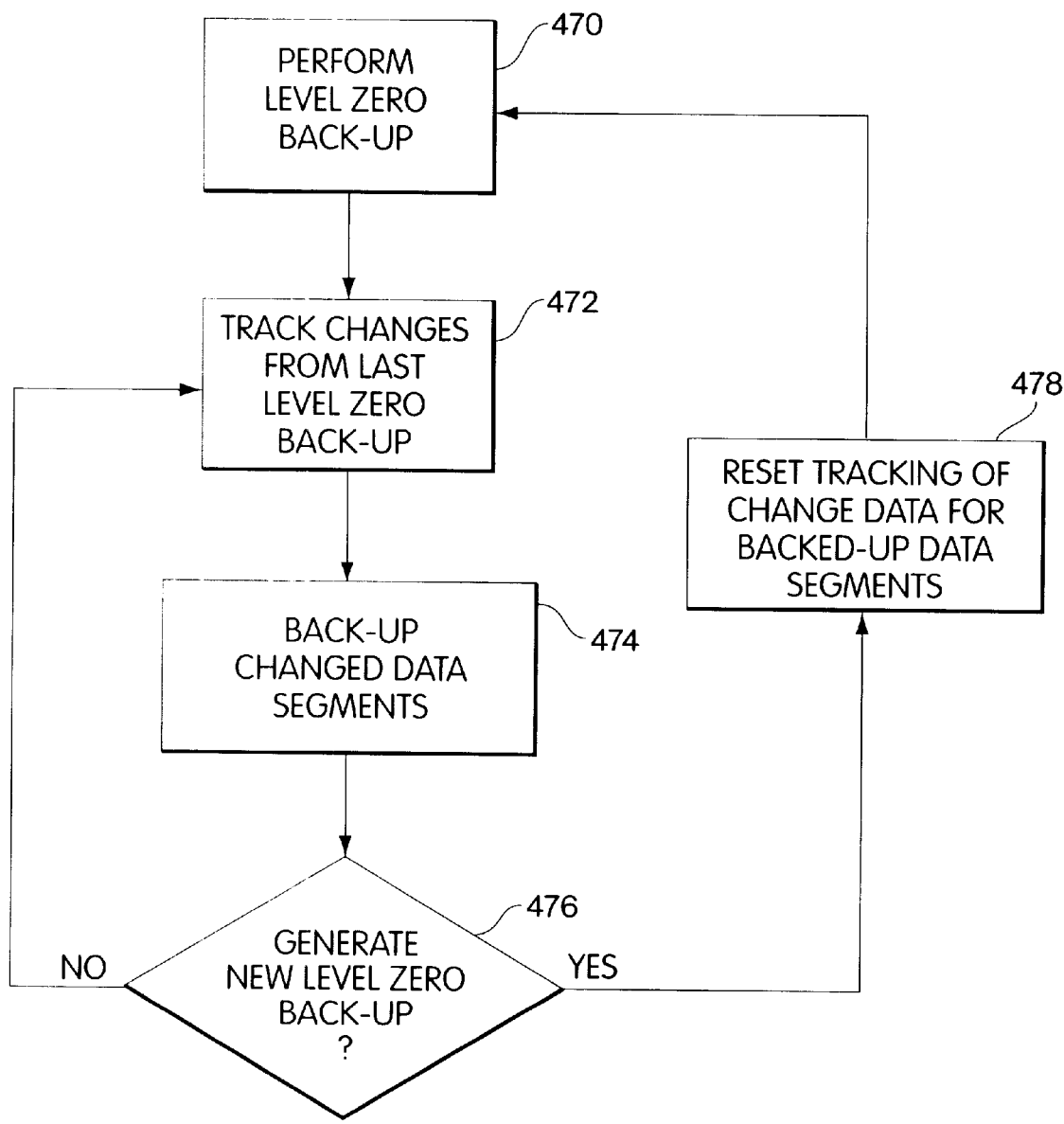
FIG. 21 illustrates one embodiment of a method for performing a differential backup.

FIG. 21 illustrates one embodiment of the present invention for creating a differential backup. A differential backup is a backup of only a portion of a logical object, based on what has been changed during operation of the computer system.

At a step 470, a level zero backup is performed. A level zero backup is a complete backup of the logical construct. For example, a level zero backup of a file backs up the entire file. A level zero backup of a (virtual) partition backs up this entire partition. Thus, a level zero backup can be used to restore the logical object without any further information.

At a step 472, the system tracks changes in data from the last level zero backup. For example, referring to FIG. 2B, the segments that included any changed data may be tracked. If segments 1, 3 and 5 include data that was changed, a corresponding bit or other record could be set indicating that these segments have changed (and not the others). As described more fully below, the segments may be defined by how the data is physically stored (e.g., by storage blocks) rather than based on logical level information, and may (but need not) correspond to the granularity of physical back-up segment of abstract block sets or the granularity of physical segments marked to prevent updates.

At a step 474, those data segments that have been changed are backed up. By backing up only changed data segments, rather than the entire file, the generation of the backup may be performed much more quickly. One embodiment of a method for storing and recovering files using records of just changed data segments is discussed below. This backup may be referred to as a "differential backup" because less than all of the logical data blocks are backed up, e.g., some data segments that have not been changed are not backed up.

At a step 476, it is determined whether a new level zero backup should be generated. If not, the system continues tracking changes from the last level zero backup, at step 472. In this embodiment, therefore, the differential backup generated at step 474 always records changed data from the last level zero backup—not from the last differential backup. An alternative embodiment is to track changes from the last differential backup.

If a new level zero backup is to be generated, at a step 478, the tracking of changed data is reset. This may be performed, for example, by resetting "change bits" associated with the data segments, described below. While this is done, the system may be taken off-line or placed in backup mode to assure that data is not changed while the change bits are being reset (and the level zero backup performed). When a new level zero backup is performed, future changes will be tracked from that level zero backup rather than an earlier one.

In another embodiment, resetting tracking of changed data may be performed after the step 474 of backing up changed data segments. In this case, each differential backup tracks changes only from the last differential backup. As discussed below, to restore data when this is done, multiple differential backup files may need to be examined, rather than just the one differential backup performed at the time of interest.

The complete or level 0 backup may be performed as described above. For example, an abstract block set may be created, using physical backup segments stored in any order, together with metadata as the level of backup.

The step 472 may be performed at either the logical or the physical level. At the logical level, the client 50 may track the segments that include changed data. At the physical level, the storage system 54 may track which segments of data have been changed. In either case, the segments of data may correspond to physical segments of data that are stored on the storage system, rather than units of data (e.g., files within a partition) determined at the logical level and associated with a logical construct.

The physical segment may be a 512 byte block that is written to or read from the physical storage device at one time. In another embodiment, the granularity of the physical segment may be the amount of data stored in a track of the physical storage devices used (particularly when the physical storage devices are disk drives). The size of this may depend on the particular format for storing data in applicable operating system. For example, in a fixed block architecture environment, the track may be 32 kilobytes (64 SCSI blocks). On IBM main frames implementing a count-key-data ("CKD") system, the segment size may be the size of one CKD track. As above, the granularity of the physical segments for which changes are recorded may, but need not, correspond to the physical backup segment size or the granularity at which updates are prevented during the copying or backup process. In many cases, however, it will be most efficient to use the same granularity for each of these functions, e.g., using a physical track on a disk for the granularity of the entire system.

In certain embodiments, the changed segments may be tracked at the physical storage level. Thus, whenever a physical segment is written to a physical storage device, the fact that the segment was changed can be recorded. This may be done using a single bit associated with each physical segment. When the system is initiated, all of the bits are set to zero (for example). When a physical segment is changed (or written), the associated bit may be set.

Thus, referring again to FIG. 2B, data changes may be tracked at the level of the actual physical storage devices 204–206. When data is changed in one of the data segments, a bit may be set (or some other mechanism used) to track that that segment has been changed. For example, if data is changed within the first segment of the application file at the application level, e.g., 203a, the data in actual physical storage device at 208 will be modified. A bit (or other mechanism) associated with data segment 208 will be set when this write is performed.

Figure 2A:
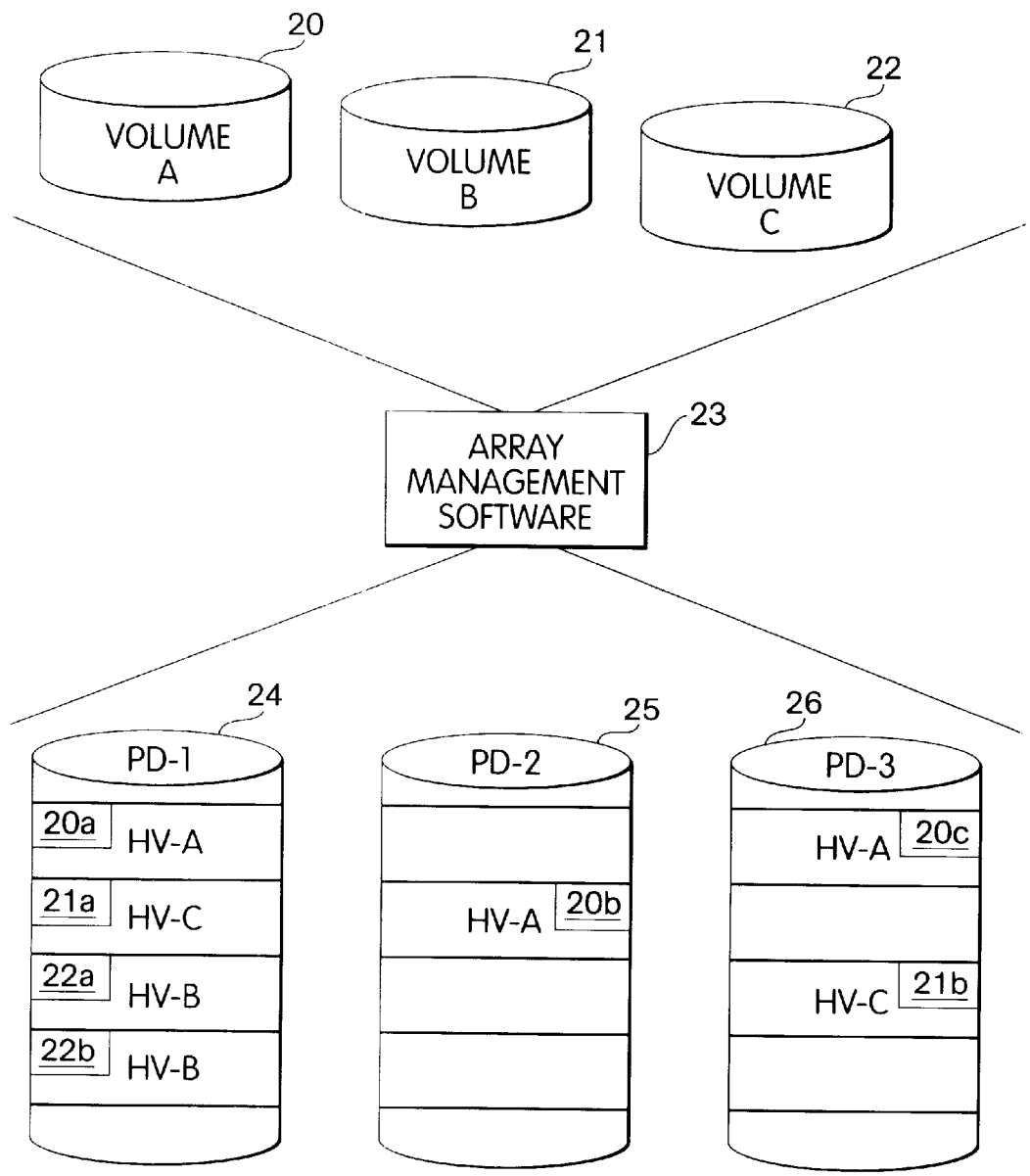
FIG. 2A illustrates an example of the relationship between logical volumes and physical storage devices.
Figure 2B:
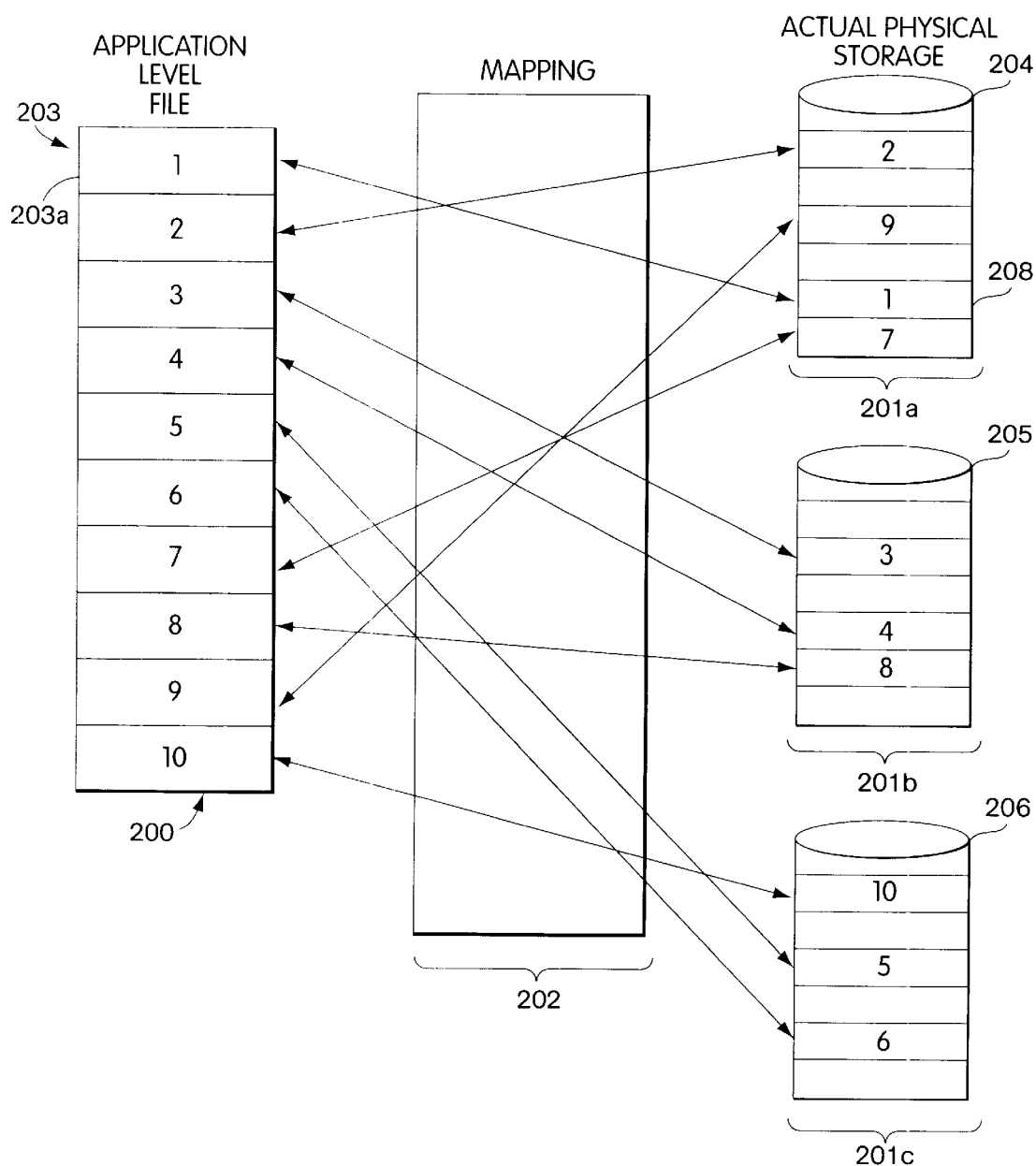
FIG. 2B illustrates an example of mapping a logical file onto a physical storage system.
Figure 2C:
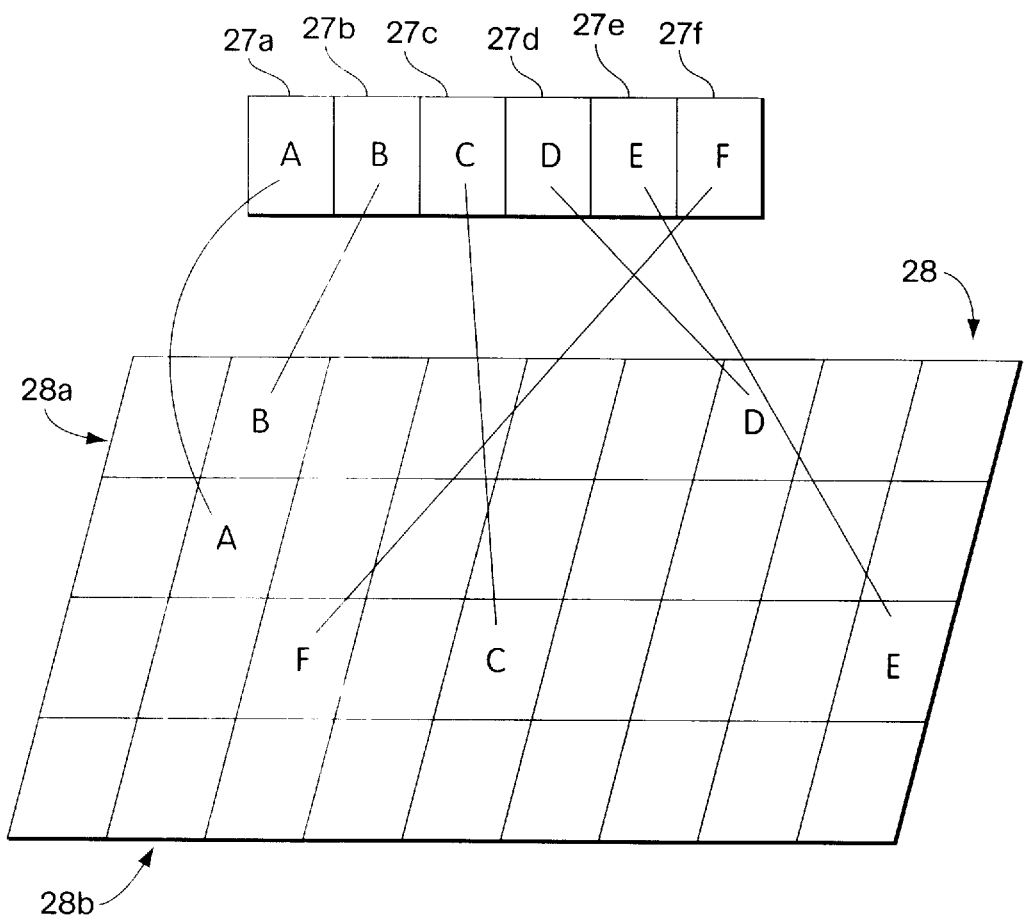
FIG. 2C illustrates another example of mapping a logical object onto a physical storage device.
Figure 3A:
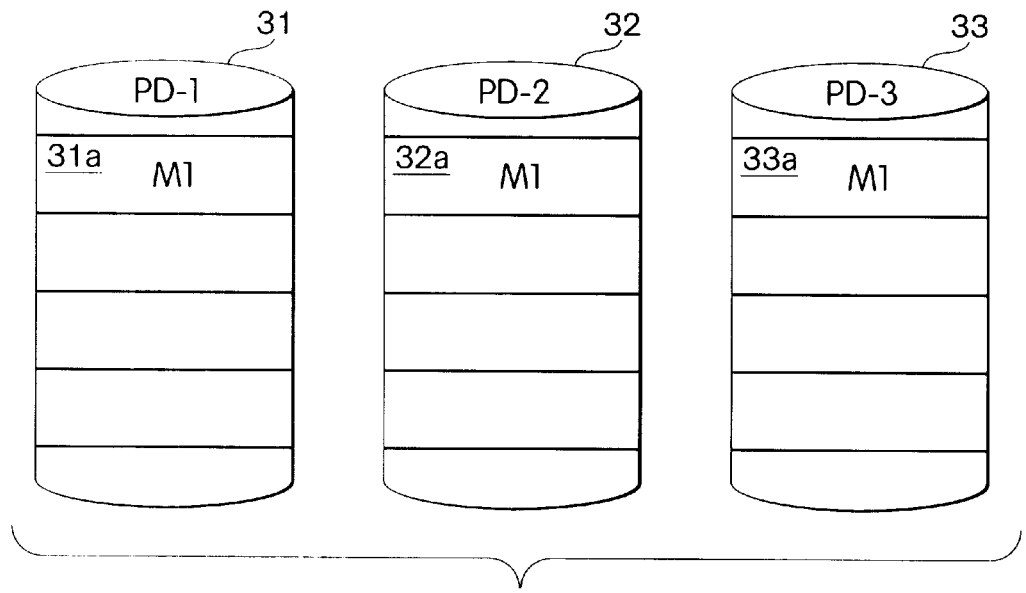
FIG. 3A illustrates an example of mirroring on different physical storage devices.
Figure 3B:
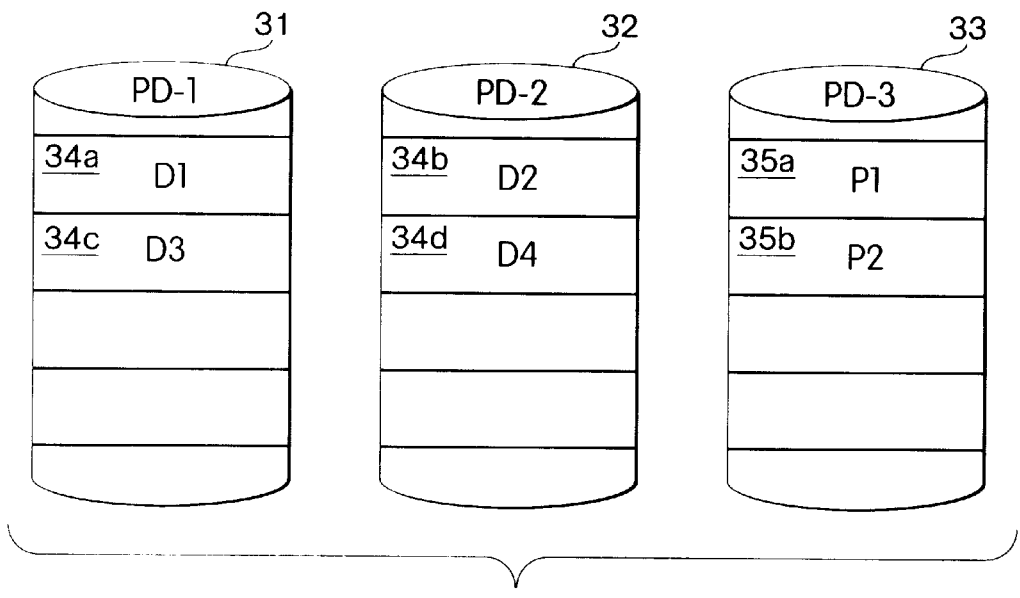
FIG. 3B illustrates an example of redundant parity information on physical storage devices.
Figure 4:
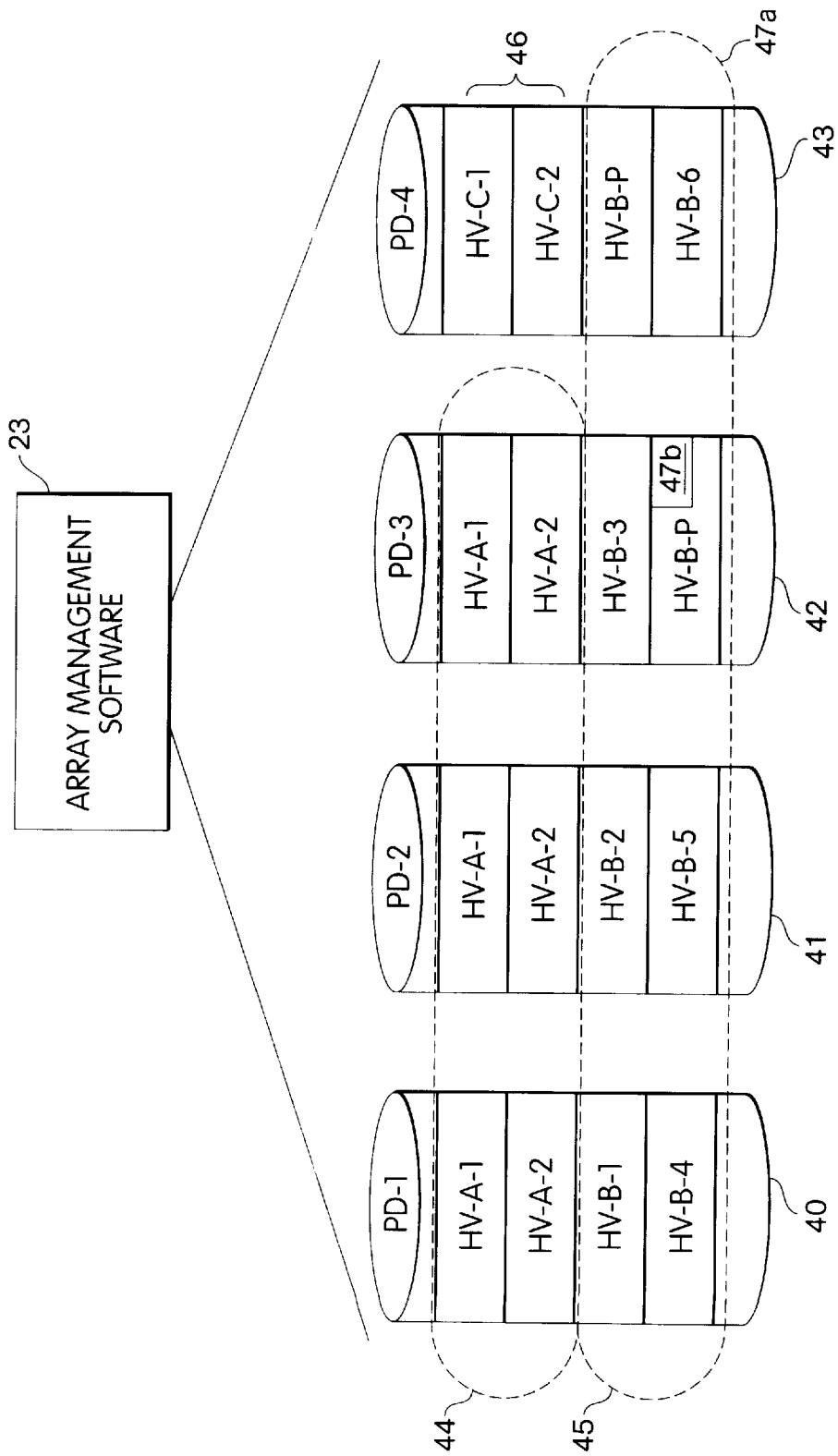
FIG. 4 illustrates an example of multiple redundancy groups within a single array of storage devices.

FIG. 2 illustrates one example of a system that includes a bit associated with physical storage segments. For example, physical storage device 201a includes six physical segments. An associated physical bit mask 412 sets a bit for each physical segment that has been changed. In this example, segments 114a and 114b have been changed. Accordingly, the associated bits 412a and 412b of the physical bit mask 412 have been set to one. On inquiry, the physical bit mask may be read and output to a client (e.g., client 50 of the system illustrated in FIG. 5).

The actual physical storage devices 204–206 may, but need not, have any idea of what is being done at the application level. In this embodiment, the physical storage devices need only be aware that data within the applicable segment of data (e.g., 208) is being modified.

(While many of the embodiments described herein use bit masks to represent changes in data, e.g., a physical bit mask or a logical bit mask, other mechanisms (lists being just one example) may be used.)

Figure 1:
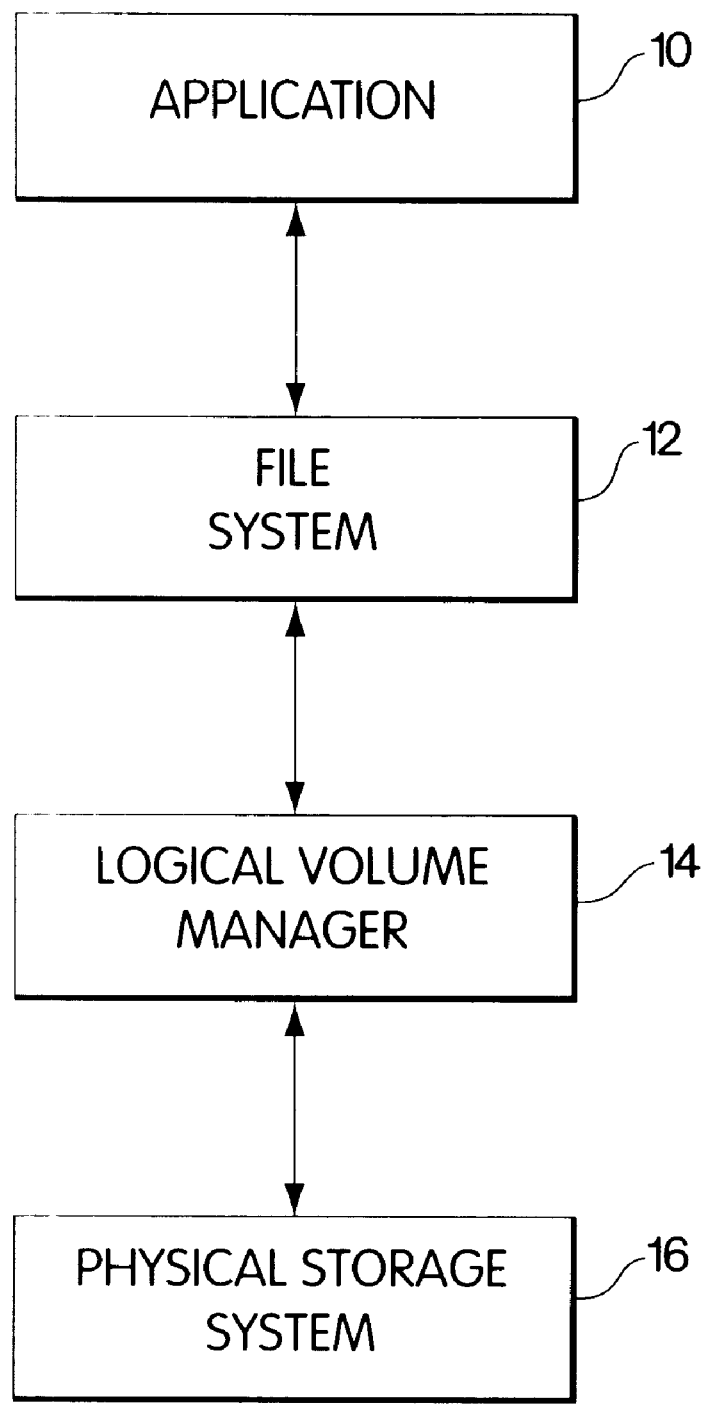
FIG. 1 illustrates an example of conversion of application level data to storage in a physical system and vice versa.

In the embodiment described above, the changes to data segments are tracked at the physical storage level (although, in alternative embodiments, the changes could be tracked at any of the other levels, e.g., the application level, file system level, logical volume or logical volume manager level, as illustrated and discussed with respect to FIG. 1).

In one embodiment of performing a "differential" backup, data about changes at the physical level is converted to correspond to changes at the logical (e.g., application file) level.. The differential backup then stores the data at the logical level.

Figure 22:
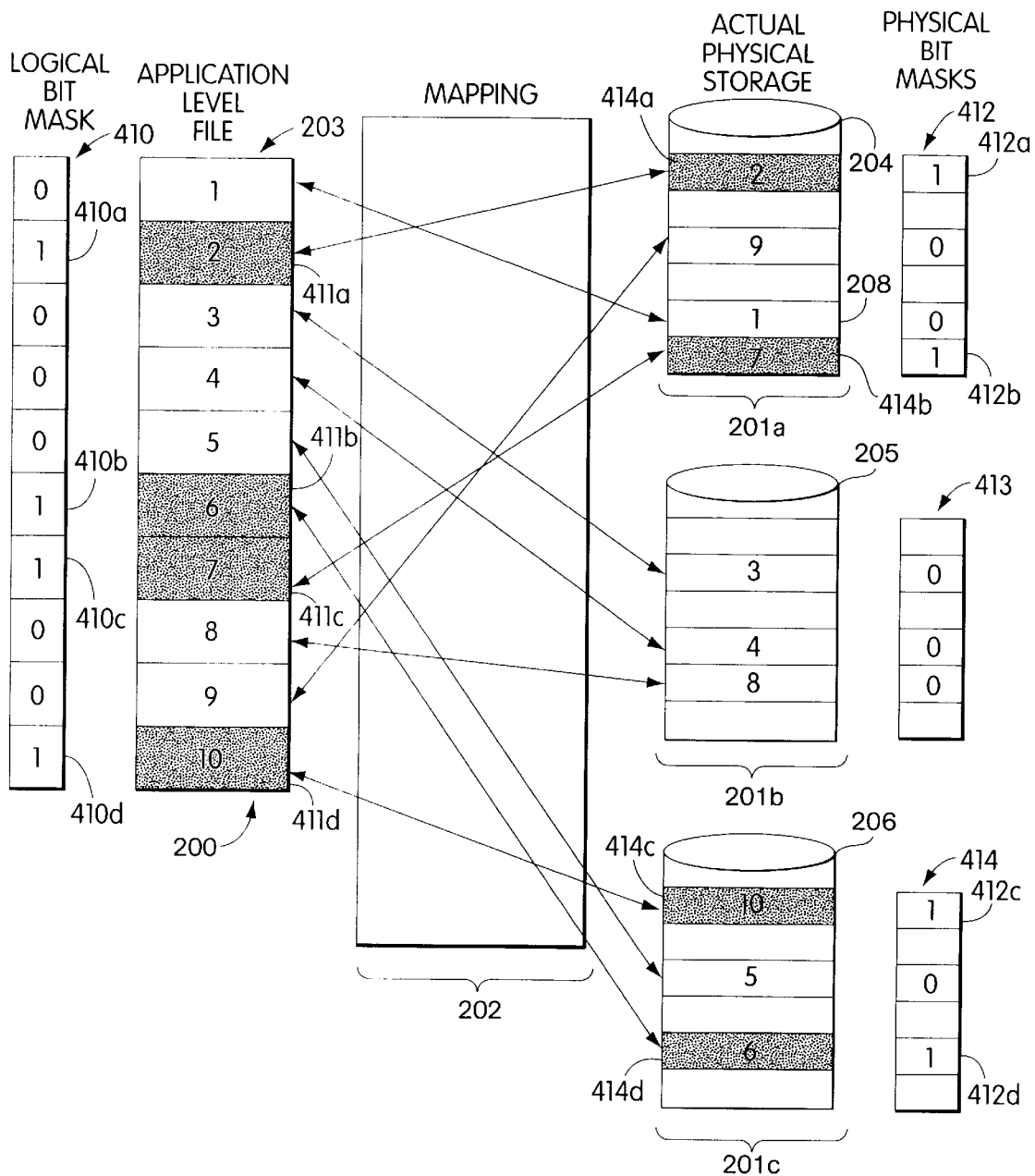
FIG. 22 illustrates one embodiment of tracking changes at the physical level of a system, and converting those changes to logical information.

FIG. 22 illustrates one way of tracking changes at the physical level and converting that to the logical level. In this embodiment, a bit mask 412, 413 and 414 is associated with each actual storage device 204–206.

When data is written to a data segment, a corresponding bit and the corresponding physical bit mask is changed from a zero to a one. Accordingly, at any point in time, the physical bit masks indicate all of the data that has been changed since the last backup. As described above, the actual physical storage devices 204–206 may not know how this corresponds to logical objects at the application level. Indeed, the actual physical storage devices may have no way to determine what data segments are associated with each other. As indicated in FIG. 22, in this embodiment, data segments 114a–114d have been changed. Accordingly, corresponding bits 412a, 412b, 412c, 412d in bit masks 412, 113 and 114 have been set to one. (Other data segments in the actual physical storage devices may also have been changed, but are not shown in FIG.11).

A logical bit mask 410 may be constructed, which indicates what data segments within the application level file have been modified. Thus, logical bit masks 410 may include entries 410a–410d indicating that the corresponding data segments 411a–411d have been altered. (In an alternative embodiment, the segment changes may be tracked at the logical level, even though the segment size corresponds to a physical storage amount, such as block or track size.)

The logical bit mask 410 can be constructed using mapping 202. In particular, the mapping 202 may convert the application level object to a group of data blocks in the actual physical storage (as this needs to be done to store the application level file in physical storage in the first place). Thus, the mapping 202 may be performed using the same mechanisms for mapping application level data into physical storage devices (through, e.g., levels 10, 12, 14 and 16 of FIG. 1). The physical bit masks associated with these data segments on actual physical storage may then be examined. A logical bit mask can be constructed by setting each entry in the logical bit mask to a one only where the actual physical storage device indicates that that data segment has been changed.

Figure 23:
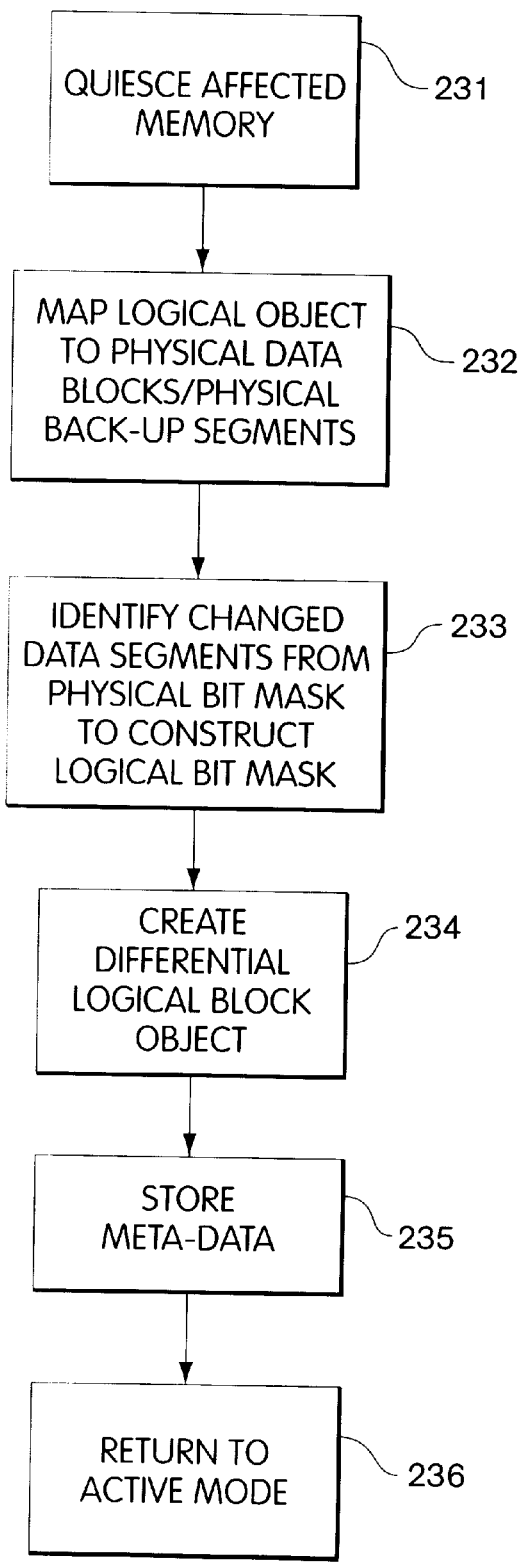
FIG. 23 illustrates an example of performing a differential backup on a logical object, according to one embodiment of the present invention.

FIG. 23 illustrates one embodiment of the method for performing a differential backup of an abstract block set. In this embodiment, the affected memory in the actual physical storage devices is first quiesced, at a step 231. Quiescing the memory assures that no additional data is modified within the application level file. Quiescing may be performed as generally described above, e.g., by taking the application off-line or placing the application in on-line backup mode.

At a step 232, a logical to physical mapping is performed to determine which physical data segments within the physical storage device are of interest. The step 232 may be performed as generally described above. That is, using the application, file system and logical volume manager (where present, and additional levels of mapping if present) to map all of the data segments within the application file onto physical storage. As described above, this may map the object all the way down to actual physical storage. In other embodiments an additional level of mapping may occur before reaching the actual physical devices storing data; for example, in a Symmetrix product as described above, the Symmetrix product may present what appears to be a three volume storage device. This Symmetrix product could present change data based on that three volume set. On the other hand the way the data is actually physically stored within the Symmetrix may not correspond to that three volume set provided to the application or operating system level. Thus, an additional level of mapping for both data segments and bit masks may be performed within the storage device.)

The granularity at which the changes to data is tracked may be based on the size of the data blocks or on a different granularity, such as the size of physical backup segments. For example, change data may be tracked corresponding to physical tracks, when the physical data block size is less than an entire track.

At a step 233, the physical data segments that have been changed since the last time mark are identified. This may be done by examining the physical bit masks associated with the physical storage devices. Any entry marking changed data in the physical bit mask that corresponds to a physical backup segment within the application that includes a physical data block in the applicable logical object corresponds to data that may have been changed. At step 232, a logical bit mask may be constructed, such as the logical bit mask 410 of FIG. 22.

At a step 234, a differential abstract block set is created. This step involves copying only those physical backup segments that may include changed data. In one embodiment, as for the abstract block sets above, the abstract block set may record the physical backup segments in any order.

Accordingly, at a step 234, metadata for the differential abstract block set is also stored. This metadata records information sufficient to identify the applicable location of the physical data blocks stored in the differential abstract block set within the logical object being backed up or copied.

Finally, at a step 236, the application is returned to active mode. That is, the system is allowed to continue updating the physical data blocks on the actual physical storage devices.

As described above, before returning the system to active mode, the bits corresponding to the backed up data segments on the actual physical storage device may be reset to zero. This is only done if the differential backups are being performed with respect to the last differential backup. Otherwise, the bits may only be reset after the construction of the real (or merged, as described below) level zero backup.

Figure 24:
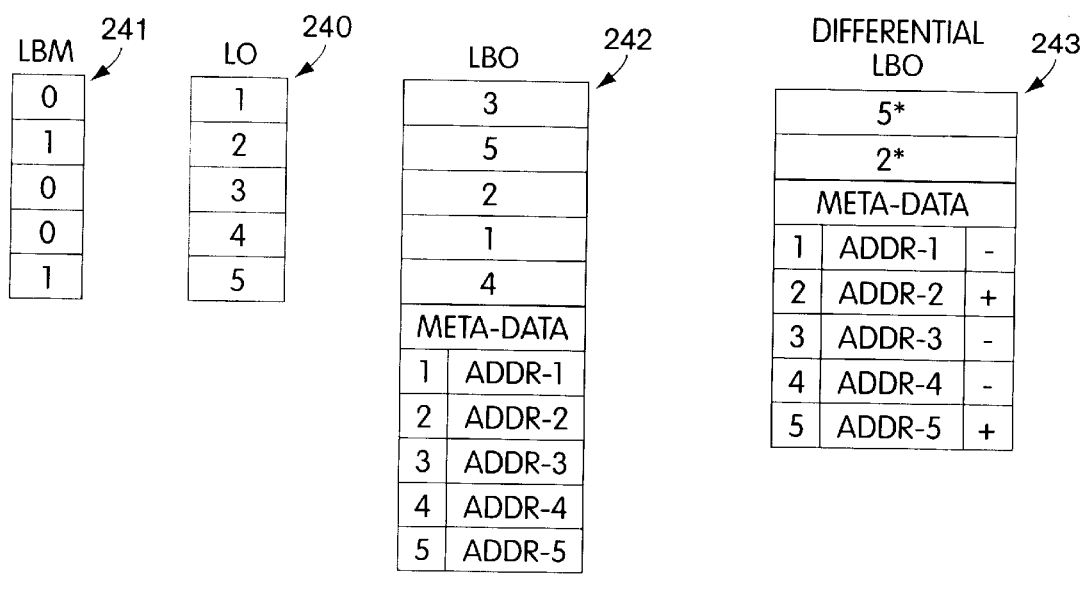
FIG. 24 illustrates one example of forming full and differential logical backup objects for backup of a logical object, according to one embodiment of the present invention.

FIG. 24 illustrates an example of creation of a differential abstract block set according to the method of FIG. 23. The logical object 240 includes five physical data blocks. (For simplicity, the physical backup segment and physical data block size are assumed to be the same in FIG. 24. As above, however, the physical backup segment size may be a size that is larger than the physical data blocks.)

At an earlier point in time, an abstract block set 242 was formed. As above, the abstract block set stores each of the logical data blocks of logical object 240, but in any order. The abstract block set 242 may include metadata, specifying the locations of the data blocks within the logical object.

After the abstract block set 242 was formed, additional changes may have been made to the data within the logical object 240. In this example, logical bit mask 241 reflects those changes. In particular, logical bit mask 241 indicates that the second and last logical data blocks within logical object 240 have been changed.

The differential abstract block set 243 stores those data blocks that have been changed (the second and the fifth). As described above, these may be stored in any order. The differential abstract block set may include metadata for the differential abstract block set. In the example of FIG. 24, the metadata is of the same general format as the metadata for the full abstract block set 242. The metadata includes an extra column, however, that specifies which of the logical blocks have been changed since the last backup (again, the second and the fifth, in this example).

To restore a logical object from a full abstract block set backup and a differential abstract block set, the two may be combined or merged. In fact, an abstract block set and one or more differential abstract block sets may be merged at any point in time, off-line. This permits formation of a synthetic full abstract block set that reflects the state of the logical object at the point in time when the differential abstract block set was formed.

Figure 25:
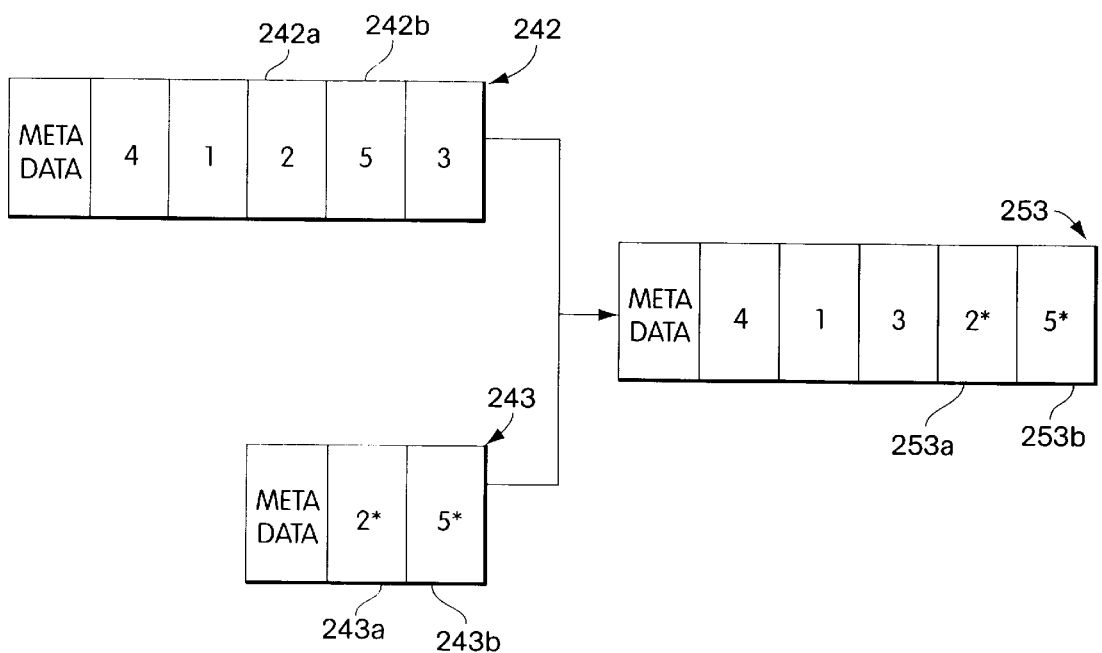
FIG. 25 illustrates one example of combining an abstract block set and a differential abstract block set into a single full abstract block set, according to one embodiment of the present invention.

FIG. 25 illustrates an example of this merging process, using the example of FIG. 24. As can be seen, the original data blocks 242*a–b* of the whole abstract block set 242 have been updated in the differential abstract block set 243. Accordingly, in the merged abstract block set 253, these data blocks have been replaced with the updated version.

Figure 26:
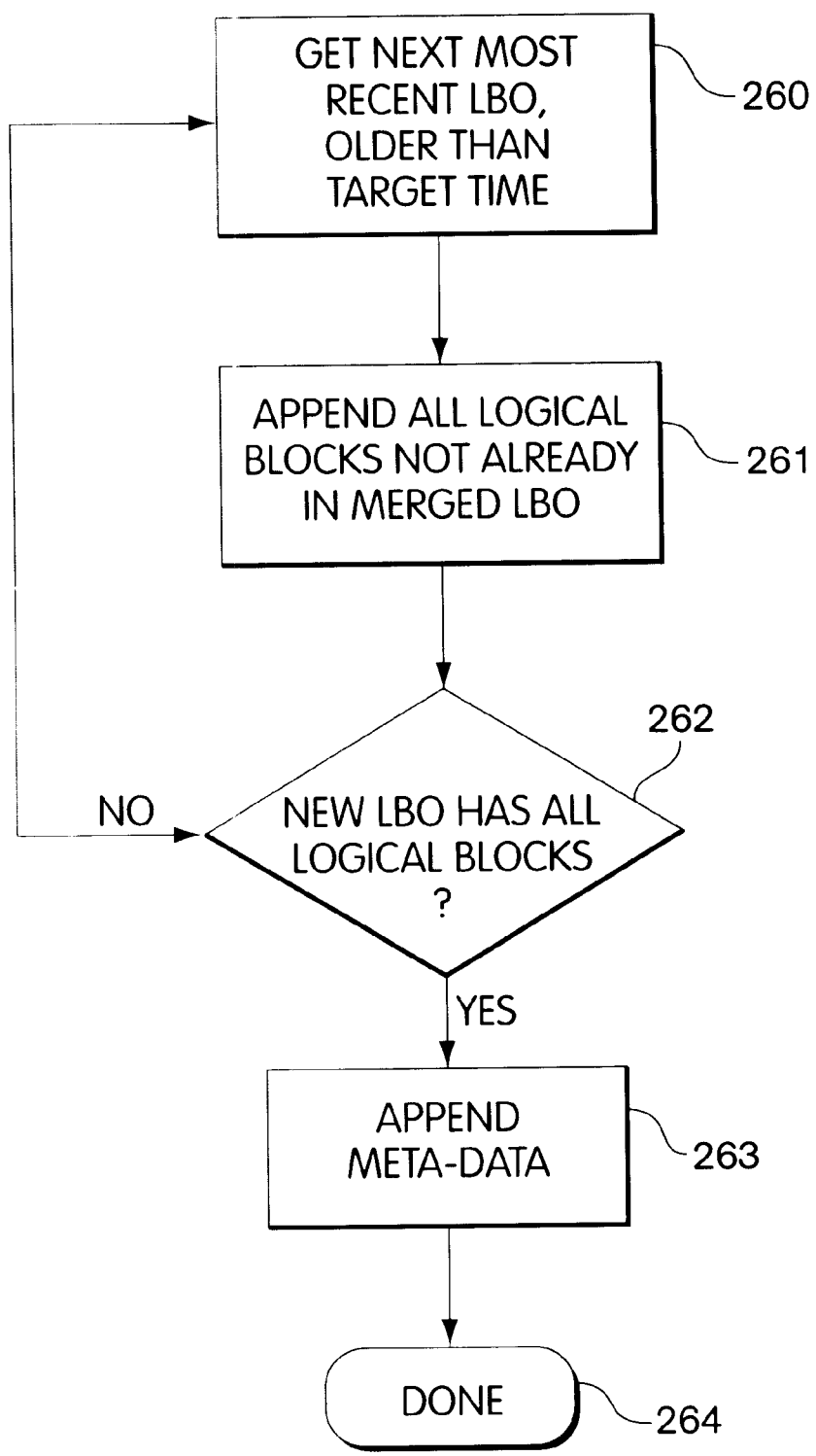
FIG. 26 illustrates one embodiment of a method for combining differential abstract block sets with a full abstract block set to produce a new full abstract block set.

FIG. 26 illustrates one embodiment of a method for performing this merging process. In the embodiment of FIG. 26, one or more differential abstract block sets may be present. More than one differential abstract block set may be present if, for example, differential abstract block sets are formed reflecting changes since the last differential abstract block set was created (rather than forming differential abstract block sets to reflect all changes since the last full backup). Of course, this method will work with only one differential abstract block set as well.

At a step 260, the most recent full or differential abstract block set is selected. Of course, this selection is made from those logical objects that were recorded before the target restore time (differential abstract block sets more recent than the target restore time reflect more recent data than should be restored.) At a step 261, all of the logical data blocks that are not in the merged abstract block set are appended to the merged abstract block set.

Referring to FIG. 25, the first abstract block set selected at step 260 is the differential abstract block set 243. As there are no blocks in the merged abstract block set yet, the two data blocks of differential abstract block set 243 are added to the merged abstract block set 253—corresponding to the first two data blocks 253*a–b*.

At a step 262, it is determined whether all of the differential and full abstract block sets have been examined. If not, processing continues at a step 260.

Returning to the example of FIG. 25, the next abstract block set to be selected is the full abstract block set 242. At step 261, those logical data blocks that are already in the merged LBO may be added. This corresponds to each of the data blocks, other than. 242*a* and 242*b*.

At this point, once all of the abstract block sets have been examined, processing continues at a step 263. At step 263, the metadata for the merged abstract block set is created. Using the example of FIGS. 25 and 24, the metadata may be of the same format—the physical address of the logical block elements has not changed. Accordingly, the metadata is the same. In other embodiments for formatting metadata, the metadata table may be updated and correspondence with its format.

The merged abstract block set may be used for copying and restore in the same manner as an original, level zero abstract block set.

Primary to Secondary Storage Node Transfers, Example of One Secondary Storage Node As described above with respect to FIGS. 11A and 11B, one aspect of storage systems involves transfer of data from primary storage elements or nodes to secondary storage elements or nodes.

Figure 27:
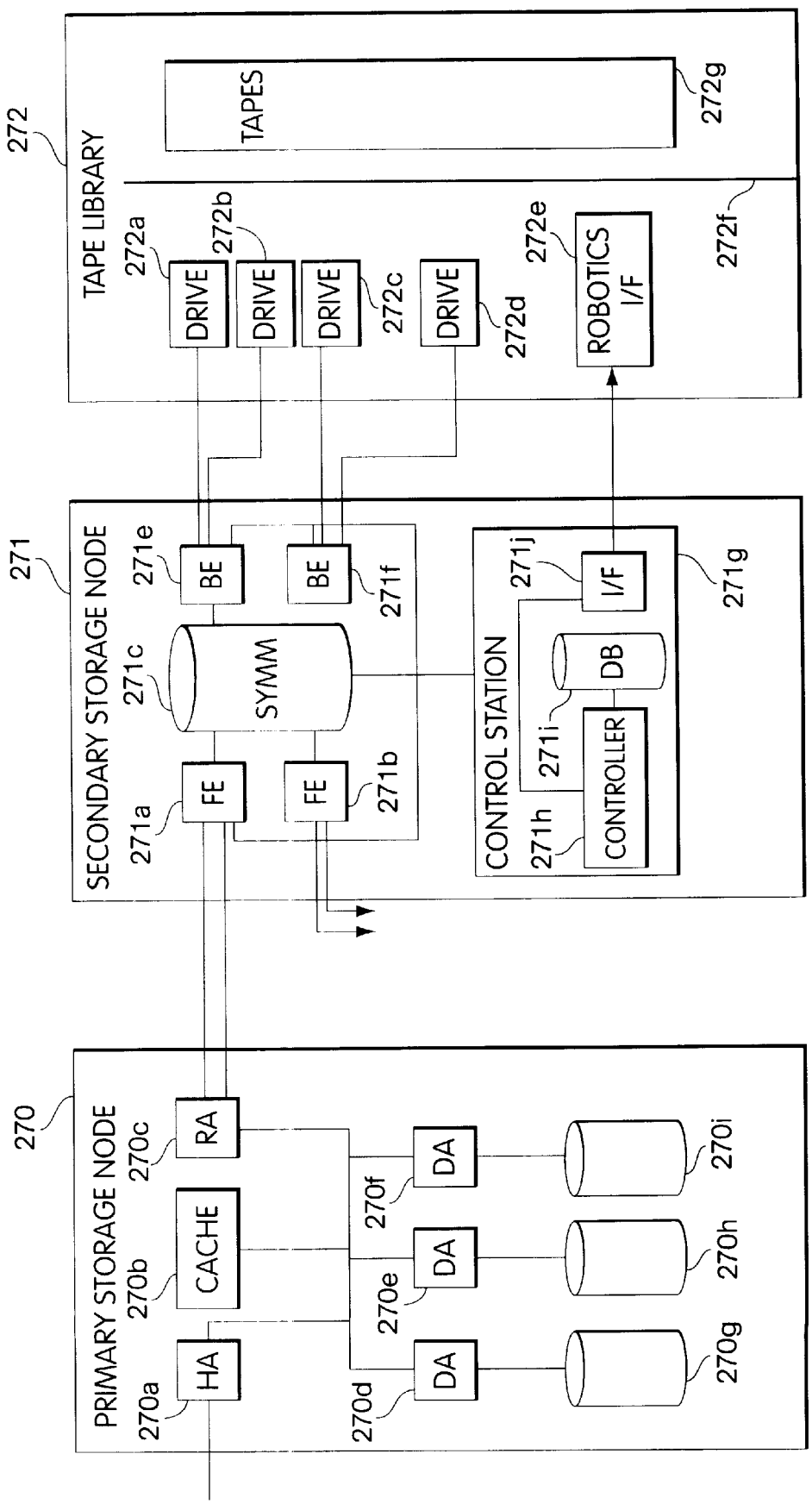
FIG. 27 illustrates one example of a system for backing up data on a primary storage node, using a secondary storage node, according to one embodiment of the present invention.

FIG. 27 illustrates one example of a particularly advantageous mechanism for transferring data from a primary storage node to a secondary storage node for storage on tape. This example embodiment and the components of FIG. 27 are useful both in the context of the other inventions described above (although not limiting with respect to those inventions), as well as useful for systems implemented independent of those inventions.

FIG. 27 includes a primary storage node 270. This may be, for example, a Symmetrix storage system as described above. In such a system, a host adapter 270*a* may be provided for communication with a host. Disk adapters may provide an interface with the disks. A remote adapter 270*c* may handle communications with remote devices, whether through a SCSI link, an ESCON link, a fiber channel, a switched network, or some other communication channel. In addition, a cache 270*b* may be provided for caching received and transmitted data.

FIG. 27 also illustrates a secondary storage node 271. In this embodiment, the secondary storage nodes has a plurality of data moving elements 271*a*, 271*b*, 271*e* and 271*f*. In this embodiment, the data moving elements are arranged in pairs—a front end and back end pair. For example, data mover 271*a* may be a front end data mover—primarily responsible for receiving data from a primary storage node. The front end data mover 271 a may be paired with a back end data mover 271*e*. The back end data mover is responsible for moving data from the secondary storage node to the backup media.

As shown in FIG. 27, more than one pair of front end and back end data movers may be provided for parallel transfer of data. In this example, two pairs are shown—271*a*–271*e*, and 271*b*–271*f*.

The actual backup media in the example of FIG. 27 is a tape library 272 (other backup media may be used in other embodiments). The tape library may include a plurality of tape drives 272*a–d*, each of which is capable of reading and writing data from a tape (and which may include an appropriate communications adapter, e.g., a SCSI adapter). The tape library 272 may also include robotics 271*f* capable of selecting tapes from a tape library 272*g* and inserting those tapes into the drives 272*a*–272*d*. A robotics interface 272*c* may control the selection process.

Returning to the secondary storage node 271, the secondary storage node may include an internal storage device 271*c* for buffering data received from the front end data mover (e.g., 271*a*), before being written to tape by the back end data mover (e.g., 271*e*) during a backup (or, conversely, for buffering data during a restore by placing the data in the internal memory 271*c* (by a backbend data mover 271*e*) and forwarding the data to a primary storage node (by front end data mover 271*a*).

The data movers 271*a*, 271*b*, 271*e* and 271*f* may be Intel based personal computers, running software permitting the data movers to transfer data from the primary storage node to the tape library unit during backup, and vice versa during a restore.

As described above, the data movers are configured in pairs, e.g., front end data mover 271a and back end data mover 271e. Each pair of data movers may be used to define one or more virtual circuits or streams.

The front end data mover (e.g., 271a) may be connected to the primary storage node 270 using any of a variety of connections. For example, in the example of FIG. 27, two ESCON cables are used to connect each front end data mover to the ports of a remote adapter of a single primary storage node (e.g., a Symmetrix storage device).

In the example of FIG. 27, the back end data movers 271e, 271f are connected to the tape library unit 272 using SCSI cables. In this example, each SCSI connection goes to a single read/write drive 272a–272d of the tape library 272. Of course, the SCSI connections may be daisy chained, permitting more than one drive to be connected to each back end data mover port. Other connections could be used, including other links or even a switched network.

The internal storage memory 271c may itself be an iterative cached disk array, such as a Symmetrix. Thus, a Symmetrix product may be included as an internal caching memory for movement of data from the front end to the back end. The internal memory device 271c may include a service processor, such as a laptop personal computer for local control of the internal storage device 271c. The internal storage device may also store the operating system and application programs running on the data movers 271a, 271b, 271e, 271f and the control station 271g.

The control station 271g may be an Intel machine, running any of a number of operating systems, such as SCO UNIX. The control station 271g may also include a keyboard and screen for local operation of the control station 271g.

The control station 271g controls operation of the data movers 271a, 271b, 271e and 271f. The control station 271g includes controller software 271b to perform this function. The controller 271b also is used for system configuration and monitoring system performance. The control station 271g includes a database 271i (which may, in the alternative, be stored on the internal memory 271c). The database 271i stores information about all pending backup streams or sessions, the contents of tapes in the tape library unit and other control information for managing the backup process and backup media.

The control station 271g may also include an interface 271j for manipulating and controlling the robotics of 272c, 272f of the tape library unit 272.

As described above, the primary storage node 270 may be used as the interface between host connectors (e.g., host computers connected to host adapter 270a) and secondary storage node, 271. In these embodiments, and where the storage management application resides primarily on the host computer, the primary storage node 270 may be used to pass commands from the host computer to the secondary storage node 271. Such commands may include instructions directed to mounting and dismounting tapes, reading and writing tape headers and trailers and other commands.

The primary storage node 270 may simply pass appropriate commands to the secondary storage node 271. In the alternative, the primary storage node 270 may perform some functions based on those commands, such as format checking.

As described above, the backup restore process can be performed by establishing a virtual channel between a primary storage node 270 and the tape library 272, through the secondary storage node 271. As described above, this may involve formulating a connection through a network between primary storage node 270 and secondary storage node 271. This may also involve establishing a connection with a tape drive 272a and applicable tapes 272g.

Figure 28:
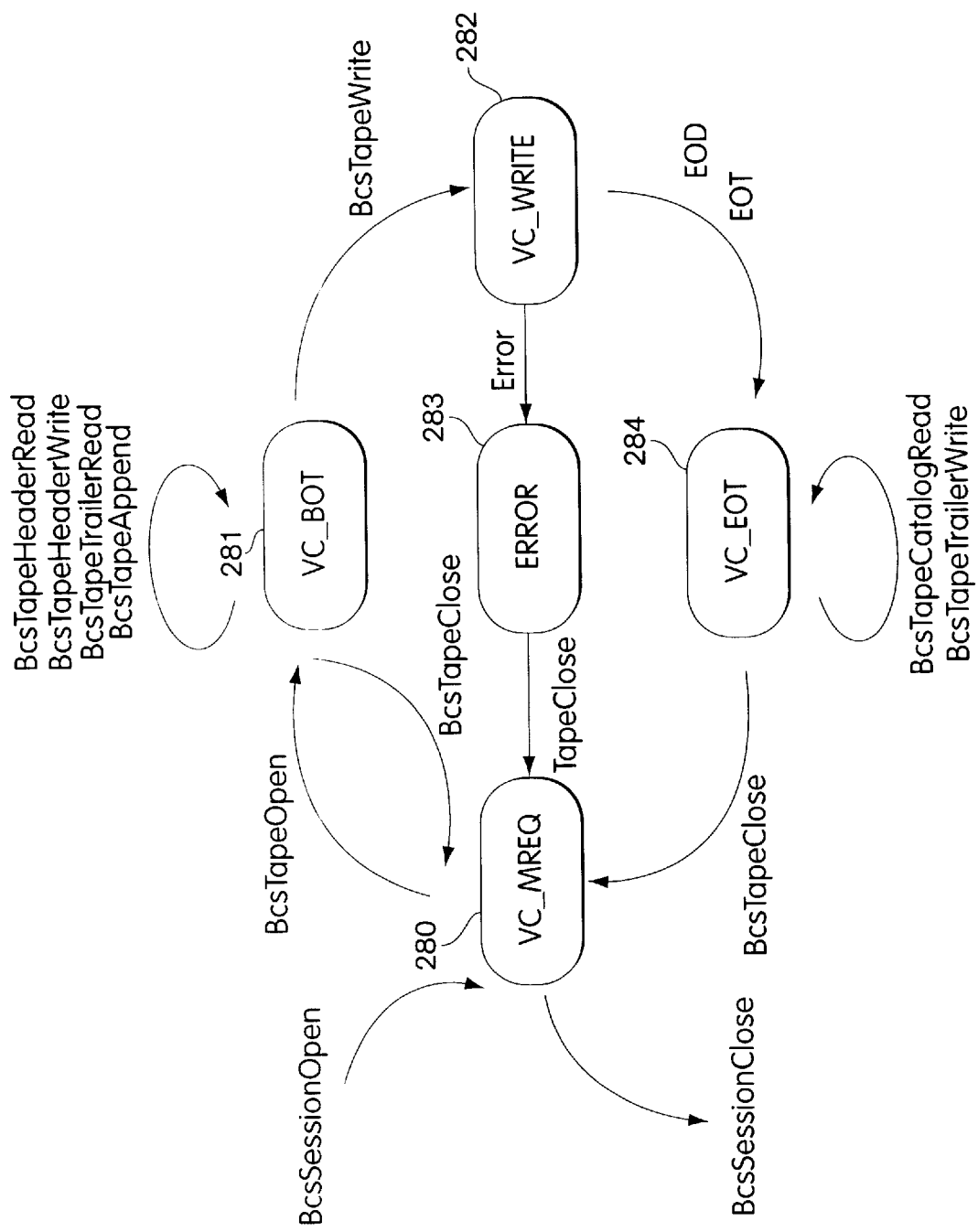
FIG. 28 illustrates one embodiment of a state diagram for any synchronous transfer of data for copying or backup.

FIG. 28 illustrates one example of a state diagram for a secondary storage node, such as node 271, for establishing and maintaining a virtual channel. At state 280, a backup control stream session (or virtual channel) is requested by the storage management application (e.g., on the host computer). Establishment of the virtual channel may involve selecting an appropriate front end and back end data mover pair, e.g., front end data mover 271a and back end data mover 271e.

A function to be performed by the storage management application may require opening a tape. The result would be to place the secondary storage node 271 into state 281—virtual channel beginning of tape. This transition would involve mounting the appropriate tape, using similar techniques to what is known in the art. At the beginning of tape state 281, tape headers and trailers may be read or written, as a part of the tape management process.

When it is time to record information on the tape, the secondary storage node 271 (or at least the applicable data movers within the secondary storage node) enter the virtual channel write state 282. When in this state, the recording part of a backup is performed, such as writing one or more abstract block sets, or portions of an abstract block set, to tape.

If the end of a tape is encountered, the applicable data movers in the secondary storage node 271 enter the virtual channel end of tape state 284. In this state, the applicable catalog information may be read and an appropriate tape trailer written. When the end of the tape is encountered (or end of data), the applicable virtual channel needs to close that tape, returning the data movers and the secondary storage node to the initial state when the channel was formed—state 280.

If an error is encountered, during writing from state 282, the virtual channel can enter into an error state 283. The tape may be closed (returning to state 280), an error log created, and a system operator notified.

As discussed above, the storage management application is responsible for issuing the appropriate commands to change the state of the secondary storage node 271. The storage management application may be resident on the host computer, primary storage nodes, separate network storage controller or even on the secondary node 271.

Figure 29:
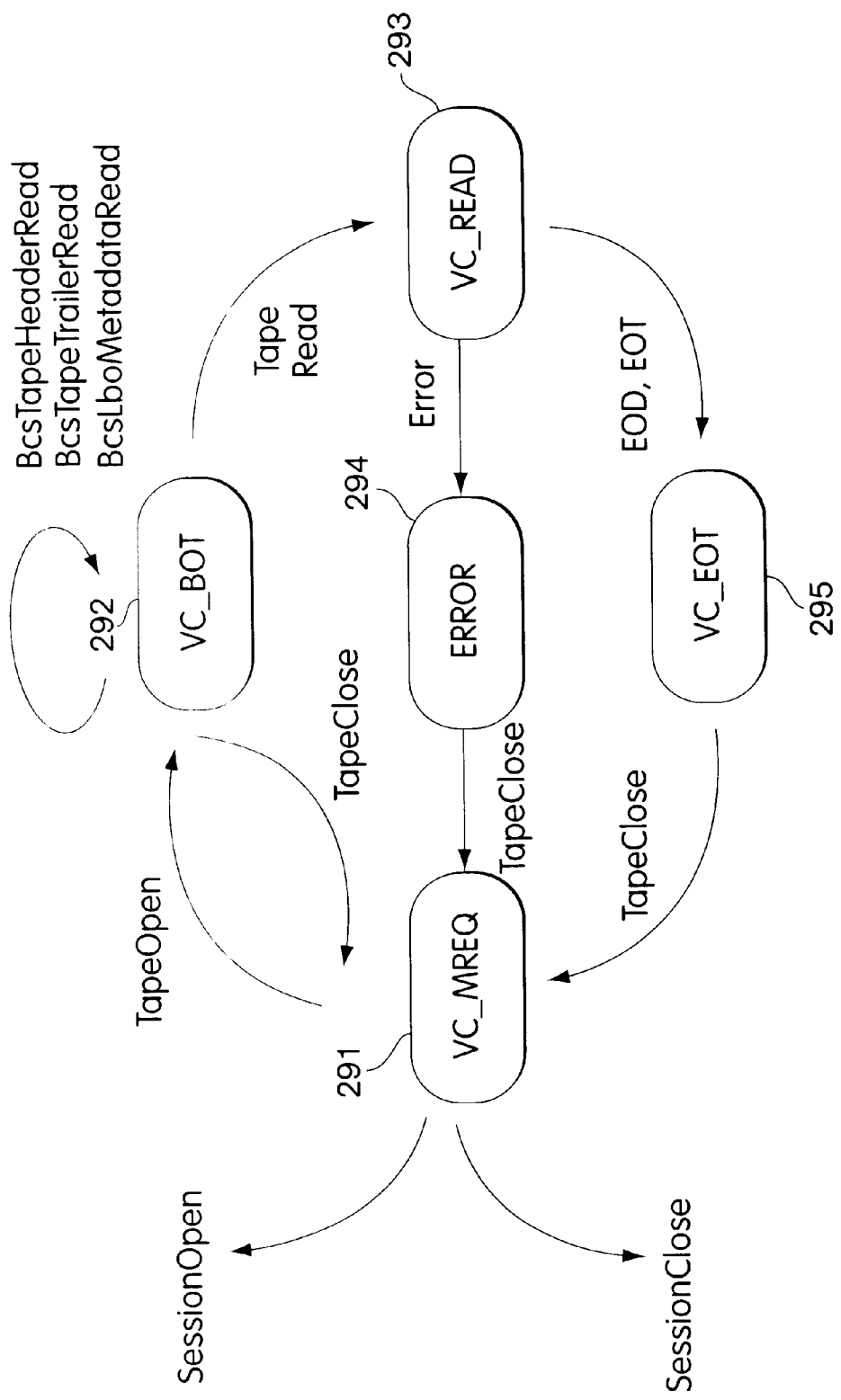
FIG. 29 illustrates one embodiment of a state diagram for asynchronous restore of a backed up logical object.

FIG. 29 illustrates a state diagram for the secondary storage node 271f or restoring information from tape. The state diagram begins at state 291, where a request to open a virtual channel has been received. The storage management application handles the opening of tapes, for example by requesting a tape open for the backup channel stream. This results in entering the virtual channel beginning of tape state 292. As before, this can include tape header and trailer reads as well as reading of abstract block set metadata, for systems using abstract block sets.

The actual reading of data can be controlled using a tape read command, causing the secondary storage node 271 to enter into the virtual channel read state 293. At end of tape (or data) or log-out, the secondary node may return to the virtual channel end of tape state 292. The tape may then be closed, returning the secondary storage node 271 to the virtual channel opened state.

If an error is encountered during reading, the node 271 may enter the error state 294, similar to the error state described above with reference to FIG. 28. When an error occurs, the tape may be closed, an error log created, and the system operator notified.

For both backup and restore, the cataloging and identification of tapes can be handled by the storage management application, as is done for other mechanisms for formatting data stored on a storage system. The control station 271g of the secondary storage node 271 assists in identification and mounting and dismounting of the appropriate tapes, using the control station database 271i.

The backup and restore state diagrams of FIGS. 28 and 29 constitute example embodiments of placing the system (e.g., the primary storage node and/or the secondary storage node) in an asynchronous transfer state. In particular, the nodes of the storage domain enter a state where data is transferred independent of control from any host computer or host domain element, even when much of the storage management application process (and software) is being performed on the host computer.

Certain embodiments of this facet of the invention allow the advantage of independent control and transfer of copying, backup and restore. In certain embodiments of the invention, this can alleviate the dependence on particular host platforms and conserve host resources. Certain embodiments of this aspect of the present invention also allow for increased scalability—allowing addition of memory, with less dependence on host configuration.

One Embodiment of Data Transfer

Figure 30:
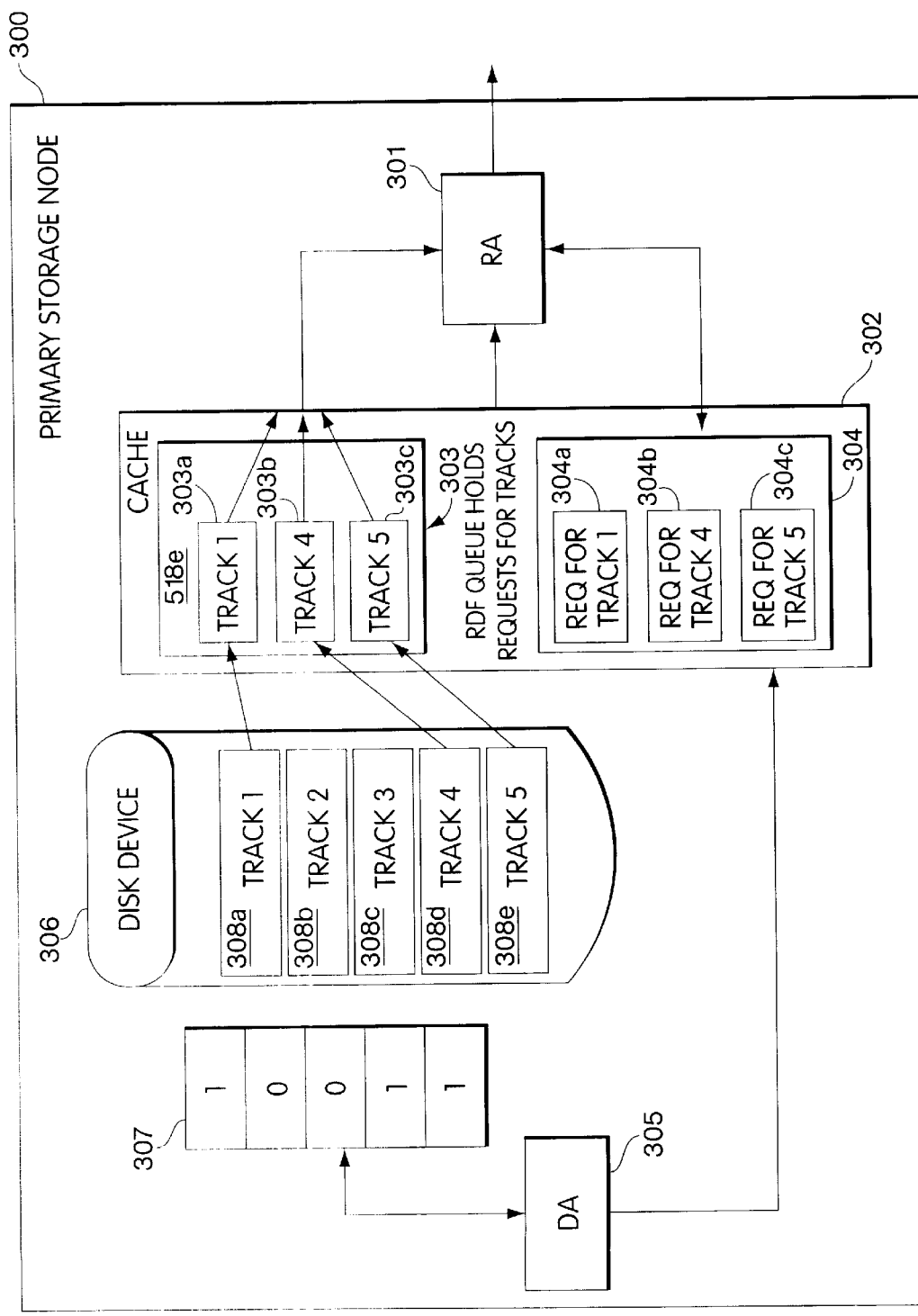
FIG. 30 illustrates one embodiment of a system and data flow within a system for sending copy of backup information from a primary storage node.

FIG. 30 illustrates one embodiment of an architecture for a primary storage node that facilitates transfer of data to a secondary storage node or to another primary storage node. This embodiment (as well as others) may be used to implement one or more of the above inventions.

FIG. 30 illustrates a primary storage node 300. The primary storage node 300 includes a remote adapter 301, as generally described above with reference to FIG. 7. The primary storage 300 also includes a disk adapter 305, also configured as generally described above with respect to FIG. 7.

Data is stored among a plurality of disks within the primary storage node 300, one of which is shown in FIG. 30—disk 306.

The disk 306 may include protection bits, as described above with reference to FIG. 20. These protection bits may be used to designate tracks to be copied—and also tracks which should not be updated before they are copied. The protection bits 307 may be stored, in one embodiment, on a cylinder header for the disk device 306. The disk device 306 may also include a physical bit mask (not shown) as generally described above with reference to FIG. 22. Other mechanisms may be used for marking or recording, which tracks are protected.

In the embodiment of FIG. 30, the disk adapter 305 receives instructions from the storage management application as to what physical backup elements (here, which of the tracks 308a–e) are part of the backup process. The disk adapter may then write the protection bits at the time of backup is initiated.

Those physical backup segments (e.g., tracks 308a, 308b and 308e) that were designated as part of a backup process may then be copied to a side file 303 in a cache 302 of the primary storage node 300. Thus, the side file 303 may receive the designated tracks 308a, 308b and 308e for copying to another storage node. The side file, therefore, may contain copies 303a–c of these tracks.

In addition, the disk adapter 305 may post, to a request queue, a request that the physical backup segments that have been copied to the side file 303 be transferred to another node. Thus, requests 304a–c may be posted in the request queue 304, corresponding to those physical backup segments in the side file 303.

The remote adapter 301 may pickup requests from the queue and transfer copies of the applicable track to the receiving storage node, e.g., a secondary storage node.

The applicable storage backup segments held in the side file 303 may be part of more than one copy of backup process being performed. For example, more than one abstract block set may be in the process of being backed up over more than one virtual channel connected to the remote adapter 301. In this case, the applicable metadata for the abstract block set can be used to identify a specific abstract block set and virtual channel for the copying or backup process.

In an alternative embodiment, the receiving storage node may classify physical backup segments based on the abstract block set to which they belong. For example, the front end data movers described above could receive physical backup segments corresponding to tracks, including a physical address for the track. The front end data move may be aware of the metadata for the abstract block set, which was formulated by the storage management application (which identified all of the physical locations for the applicable logical object being backed up). This would permit the front end data mover to classify the physical backup segment based on its physical address.

Of course, a variety of alternative structures and methods could be employed for transfer through a side file. As just one example, the physical backup segments could be sorted into separate side files for each abstract block set (or other structure) being copied or backed up. In addition, side files may be used to accumulate segments of data for transfer. For example, a side file could be created that includes at least ten megabits of data before transfer through the remote adapter 301 to a secondary, or other, storage node.

Figure 31:
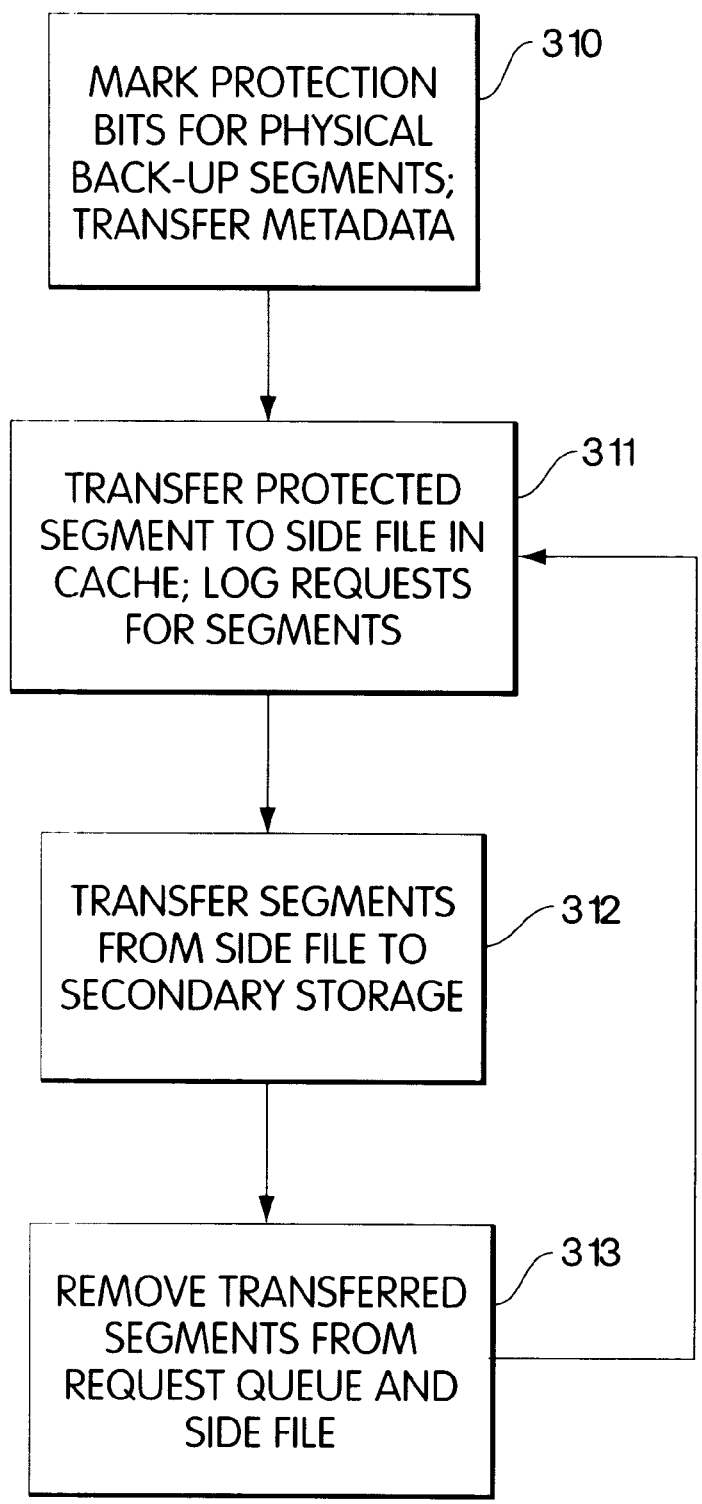
FIG. 31 illustrates one embodiment of a method for sending data from a primary storage node.

FIG. 31 illustrates one embodiment of a method for using the structure shown in FIG. 30. At a step 310, the protection bits (307 of FIG. 30) are marked for physical backup segments being copied. As described above, this may include marking the bits for more than one logical backup object.

In addition, metadata for the applicable logical object may be transferred to the receiving storage node, e.g., the secondary storage node. Thus, if the metadata is of the form shown at 133 of FIG. 13, this metadata may be specified and advance the backup process. This metadata may (or may not) be reformulated during backup for incorporation into the logical backup object, such as reformulation into the form shown at 134 of FIG. 13. In any event, this metadata may be used by the disk adapter 305, remote adapter 301 and/or the receiving storage node to accumulate and organize the applicable physical segments associated with the logical object being copied or backed up.

At a step 311, the protected segments are transferred to a side file in a cache. As this is done, requests for the transfer of the physical backup segments are logged into a request queue. As described above, this may be performed by a disk adapter of the primary storage node. At this point in time, the disk adapter 305 may also reset the applicable protection bit of the protection bits 307 of the disk device 306, allowing future updates of the data.

The segments in the side file can then be transferred to another storage node by the remote adapter 301, such as transfer to a secondary storage node. This may be done be reading requests for transfer from the requests queue 304.

After the transfer (e.g., after the transfer has been acknowledged) the applicable entries for the segment in the request queue in the side file may be removed. Of course, this can simply be done by allocating the storage as unused.

Figure 32:
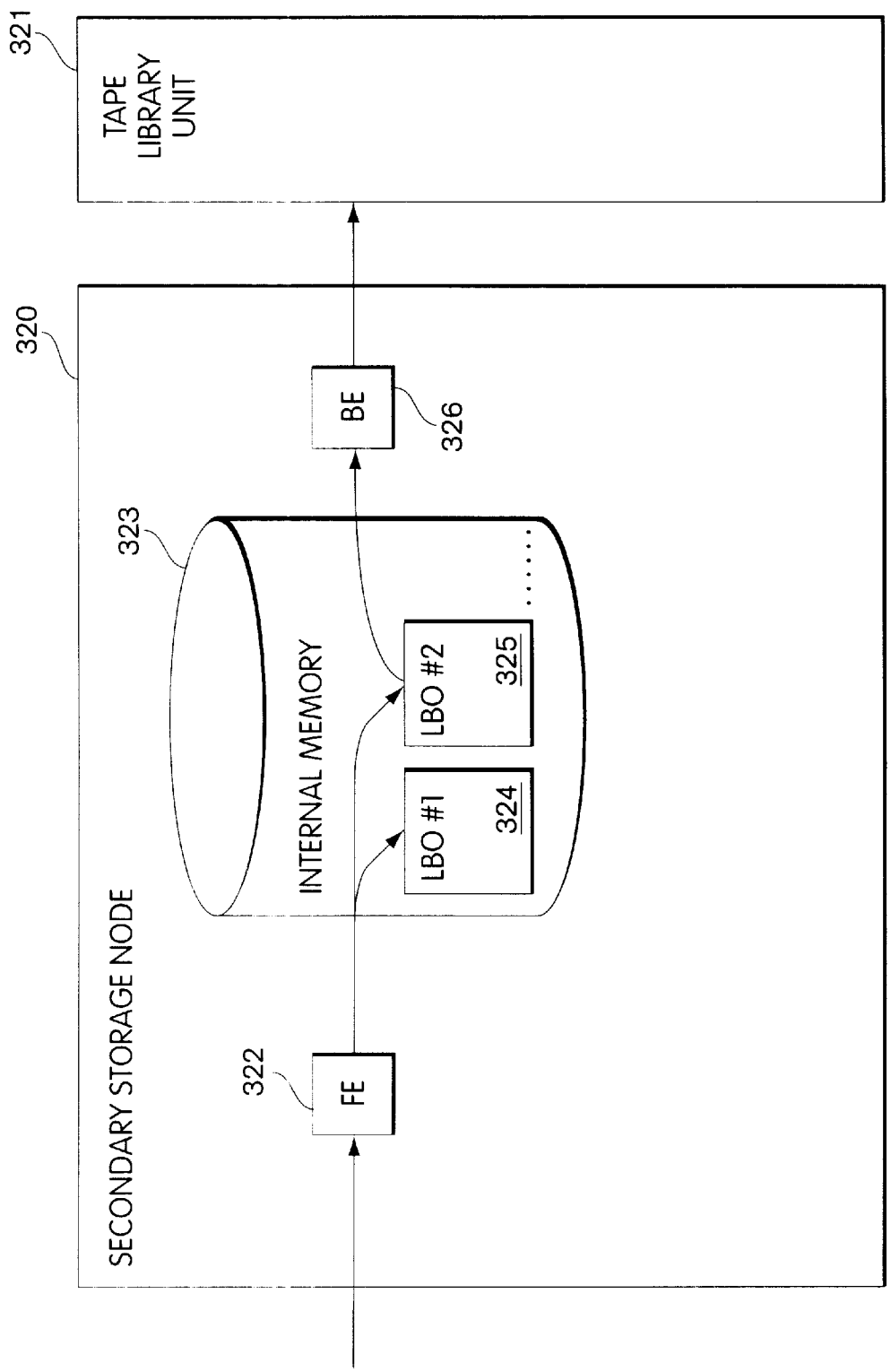
FIG. 32 illustrates one embodiment of a structure and data flow for control of writing information to a backup media.

FIG. 32 illustrates one example of data flow in a backup process through a secondary storage node 320. In this embodiment, the data is initially received by front end processor 322. The front end processor may be as generally described above with reference to FIG. 27.

The front end processor 322 stores the received physical backup segments in internal memory 323 in files associated with the applicable entity being backed up. For example, if an abstract block set LBO #1 is being backed up, the physical segments are stored in a file 324 associated with that abstract block set. Where more than one abstract block set is being transmitted at the same time over a virtual channel, the front end processor may sort the applicable physical data segments into the appropriate file, e.g., files 324 and 325.

When a file reaches a certain threshold size, for example 10 megabits, the front end processor 322 may notify the back end processor 326 that a segment of the abstract block set is ready for copying to tape. The back end data mover 326 may then copy that portion of the abstract block set from the internal memory 323 to the tape library unit 321.

In the event that the internal memory 322 is an iterative cached disk array, such as a Symmetrix, the physical back up segments may be copied from the applicable file 324, 325 by the back end data mover 326 in last-in-first-out order. This may be done to increase the chance that the data is copied from a cache within the internal memory 323, rather than from disk within the internal memory 323.

As described above, more than one abstract block set may be backed up at one point in time over a virtual channel. In addition, the segments of an abstract block set may be written in fixed sized pieces. For example, if an accumulation file 324, 325 accumulates physical back up segments until a threshold size (for example 10 meg) is reached, the abstract block set may be stored in interleaved segments of a tape. The controller and control station (271$h$ and 271$g$) can maintain a database for this information. In addition, the applicable information can be written to appropriate headers and trailers on the tape.

Figure 33:
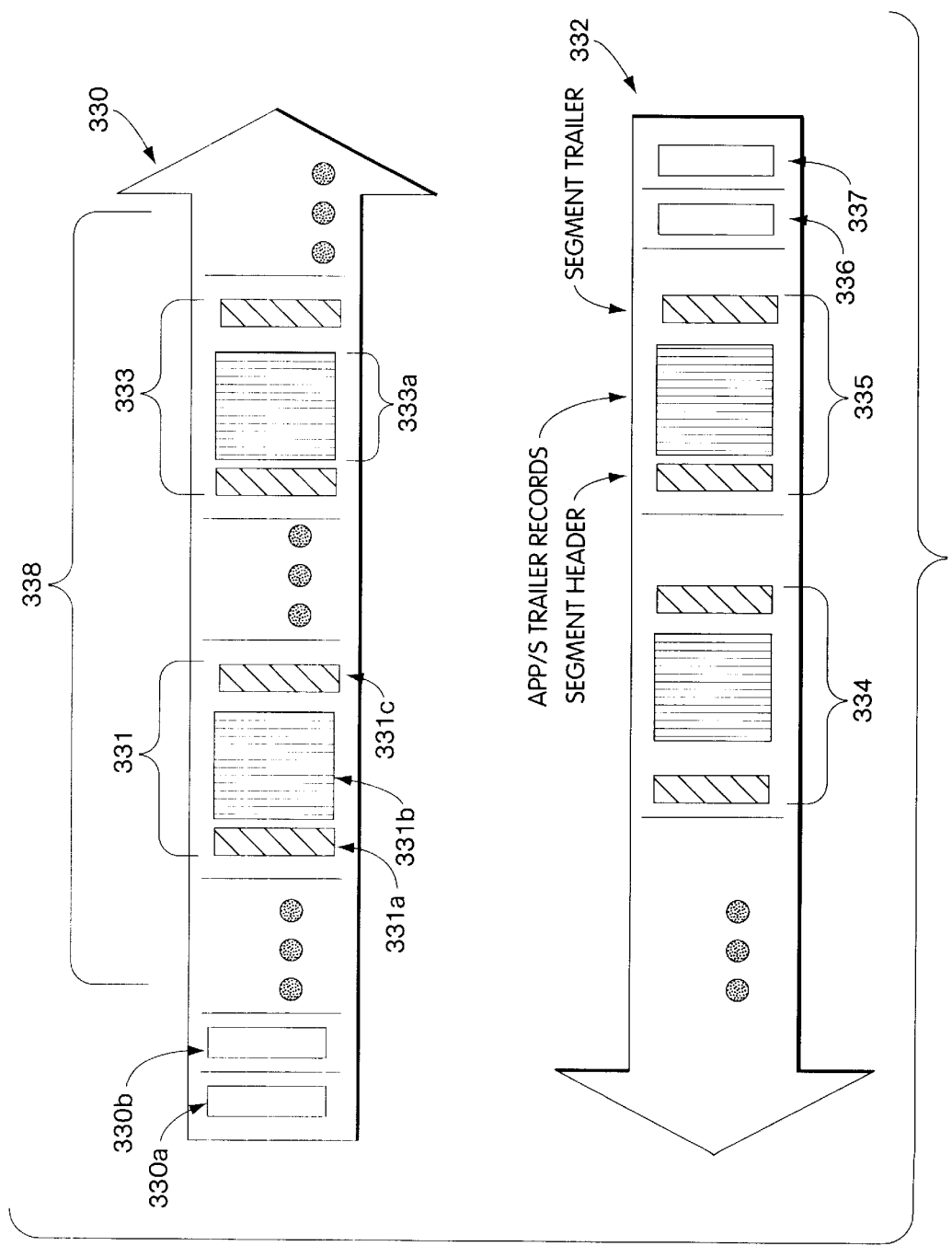
FIG. 33 illustrates one example of a tape media written with backup abstract block sets.

FIG. 33 illustrates one example of a tape containing backup information written by a device according to one embodiment of the present invention.

In FIG. 33 the tape has a beginning portion 330 and an ending portion 332. The beginning portion 330 includes the usual tape header 330$a$, and perhaps a specific tape header for the secondary storage node 330$b$. After the tape headers 330$a$, 330$b$, the tape includes interleaved segments of abstract block sets (including metadata) 338, separated with file marks. For example, the interleaved segments may include a record 331 that includes a series of copies of physical backup segments 331$b$. A segment header 331$a$ and segment trailer 331$c$ may identify and separate this portion of the abstract block set from other portions of the tape.

Interleaved with the portion of the abstract block set that includes data blocks 331 may be other abstract block set physical backup segment records for this and other abstract block sets. In addition, a record 333 may be written that includes abstract block set metadata. This metadata 333$a$ may be of any of the forms described above, or other formats. As a part of the segment header information 331$a$ and 333$a$, the applicable abstract block set can be identified, for example, using an abstract block set identifier uniquely assigned to each abstract block set. This permits identification and coordination of the records interleaved on the applicable tape 330, 332.

At the end of the tape 332, a tape directory 334 may be written. Similarly, server tape trailer information 335 may be written. At the end of the tape, a tape catalog 336 and a secondary storage device tape trailer marking the end of the tape 337 may be written.

Using a database of tapes, the applicable information may be retrieved from a backup tape. Because abstract block sets may include data blocks written in any order, a restore process can efficiently retrieve and write the portions of an abstract block set being restored, in any order. This permits the storage management application to identify each of the tapes that include portions of an abstract block set and to mount (and read all of the applicable portions of) those tapes only once. Of course, the first tape to be mounted may be the tape that includes the metadata records for the abstract block set being restored. For this reason, it may also be preferable to record the metadata at one end of all of the segments of an abstract block set written on the tape holding the metadata—making the reading of metadata at the beginning process simpler. This permits formation of the appropriate mapping table, described above, for the restoration process to proceed independent of the order in which data blocks are retrieved.

For the reasons described above, the reading and restoring of data blocks within an abstract block set can be done in any order. As a result, where tapes are used and as a component of the secondary storage element, the tapes can be mounted and dismounted in any order for both storing and retrieving data. As a result, where more than one tape drive is present in the secondary storage element, it is shown in the embodiments described above, data blocks can be written during backup and read during restore and parallel using multiple drives.

Referring to FIG. 14, parallel writing of data may be performed as followed. In this example, the updating of metadata (step 147) may be performed entirely in advance. In this example, the metadata may be the physical addresses of the data being read in a primary storage element. Accordingly, all of the metadata can be determined in advance of the actual backup process. Since this is the case, the steps 144, 146 and 147 may be performed in parallel. That is, after the physical backup segments have all been identified and the metadata determined (e.g., at step 142), all of the data blocks may be read in parallel and written to multiple tapes in parallel. In one embodiment, the last tape (which may be randomly selected) can store the metadata at the end of all of the data blocks that are part of the abstract block set on that tape.

One example of a parallel restore operation may be described with reference to FIG. 15. As described above, at steps 150–153, the mapping for the restore of the logical object is determined. Where this restore is coming from a tape, the metadata for the abstract block set can be retrieved in advance. As described above, after this has been done, the abstract block sets can be restored in any order. Accordingly, the abstract block sets may also be retrieved in parallel using multiple tape drives for a restore. In this case, the steps 154–158 may be performed in parallel using multiple tapes (or other media) for retrieving data blocks of the abstract block set being restored.

In embodiments employing virtual channels, a separate virtual channel may be established for each of the parallel paths for transfer of data. For example, a separate virtual channel may be established for each tape drive. In another embodiment, a single virtual channel may be established, but permitting multiple tape drives to channel data into that virtual channel. This may be particularly advantageous where the speed of reading data from the tape drive is slower than the ability to transfer data from the secondary storage node to a primary storage node. Allowing parallel reading of tape drives permits the speed of the restore to approach the ability of the connections to transfer data and the primary storage element to receive that data.

While many of the above embodiments have been described with respect to backup and restore operations between a primary storage element and a secondary storage element, many aspects of the invention have much broader application. As just one example, an abstract block set can be used for any transfer of data. As another example, the application of a secondary storage node can be greater than simply backup and restore operations. Such storage nodes may also be used for hierarchical storage management applications, operation of virtual disks, and other applications.

The various methods above may be implemented as software on a floppy disk, compact disk, or other storage device, for use in programming or controlling a computer. The computer may be a general purpose computer such as a work station, main frame or personal computer, that performs the steps of the disclosed processes or implements equivalents to the disclosed block diagrams. The software may be included on a diskette as a complete system or as enhancements to an existing system, permitting the system to perform the methods described herein.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of copying a logical object to a primary storage device, the method comprising steps of:
   providing a copy of the logical object, the copy including data blocks of the logical object;
   allocating physical blocks of memory in the primary storage device to store the logical object;
   identifying respective locations of the physical blocks;
   creating an abstract block set, including a map of the data blocks of the copy to the identified locations of the physical blocks of the primary storage device and information relating to an order of the data blocks in the logical object; and
   copying the data blocks to the physical blocks, based on the map.

2. The method of claim 1, wherein the primary storage device is a cached disk array.

3. The method of claim 1, wherein the step of providing comprises a step of reading the copy from a secondary storage device.

4. The method of claim 1, wherein the copy of the logical object is an abstract block set.

5. The method of claim 1, wherein the step of creating a map comprises a step of creating a table, the table including entries specifying physical addresses of the allocated physical blocks.

6. The method of claim 5, wherein the table entries specify extents of allocated physical blocks.

7. The method of claim 5, wherein each entry has corresponding information to identify one or more corresponding data blocks of the copy of the logical object.

8. The method of claim 7, wherein the corresponding information comprises a physical address of a primary storage device on which the logical object had been stored.

9. The method of claim 8, wherein the step of providing comprises a step of reading the copy from a secondary storage device.

10. A method of copying a logical object to a primary storage device, the method comprising steps of:
    providing an abstract block set copy of the logical object, the copy including data blocks of the logical object and information relating to an order of the data blocks in the logical object;
    allocating physical blocks of memory in the primary storage device to store the logical object;
    mapping the data blocks of the copy to the physical blocks of the primary storage device; and
    copying the data blocks to the physical blocks, based on the mapping.

11. The method of claim 10, wherein the primary storage device is a cached disk array.

12. The method of claim 10, wherein the step of providing comprises a step of reading the abstract block set from a secondary storage device.

13. The method of claim 10, wherein the step of mapping comprises a step of creating a table, the table including entries specifying physical addresses of the allocated physical blocks.

14. The method of claim 13, wherein the table entries specify extents of allocated physical blocks.

15. The method of claim 13, wherein each entry has corresponding information to identify one or more corresponding data blocks of the abstract block set.

16. The method of claim 15, wherein the corresponding information comprises a physical address of a primary storage device on which the logical object had been stored.

17. The method of claim 16, wherein the step of providing comprises a step of reading the abstract block set from a secondary storage device.

18. The method of claim 10, wherein the abstract block set comprises metadata including information sufficient to distinguish the location in the logical object of the data blocks of the abstract block set.

19. The method of claim 18, wherein the metadata comprises
    a plurality of labels, each label associated with one or more of the data blocks and
    a table associating the labels with a relative position in the logical object.

20. The method of claim 18, wherein the metadata comprises physical memory addresses corresponding to the location of logical data blocks of the logical object stored in a primary storage device.

21. The method of claim 20, wherein the metadata comprises
    a physical address associated with an extent of physical data blocks storing the logical data blocks, and
    a table specifying the relative position of the extents in the logical object.

22. A computer storage device, comprising:
    a memory including a plurality of physical data blocks;
    means for receiving a mapping of data blocks of an abstract block set to a set of the physical data blocks, the abstract block set including information relating to an order of the data blocks in a logical object; and
    means for storing the data blocks on the physical blocks, based on the mapping.

23. The computer storage device of claim 22, further comprising means for mapping the data blocks of the abstract block set to the set of the physical data blocks.

* * * * *

UNITED STATES PATENT AND TRADEMARK OFFICE
CERTIFICATE OF CORRECTION

PATENT NO.    : 6,385,706 B1
DATED         : May 7, 2002
INVENTOR(S)   : Yuval Ofek, Zoran Cakeljic and Philip Tamer It is certified that error appears in the above-identified patent and that said Letters Patent is hereby corrected as shown below:

<u>Title page,</u>
Item [73], Assignee information should read as follows:
-- Assignee: EMC Corporation, Hopkinton, MA (US) --

Signed and Sealed this

Twenty-fourth Day of September, 2002

Attest:

Attesting Officer

JAMES E. ROGAN
Director of the United States Patent and Trademark Office